(12) United States Patent
LeFranc et al.

(10) Patent No.: US 11,532,092 B2
(45) Date of Patent: Dec. 20, 2022

(54) METHOD FOR CHARACTERIZING THE GEOMETRY OF SUBTERRANEAN FORMATION FRACTURES FROM BOREHOLE IMAGES

(71) Applicant: SCHLUMBERGER TECHNOLOGY CORPORATION, Sugar Land, TX (US)

(72) Inventors: Marie Emeline Cecile LeFranc, Cambridge, MA (US); Michael David Prange, Somerville, MA (US); Laure Pizzella, Ermont (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 289 days.

(21) Appl. No.: 16/614,239

(22) PCT Filed: May 15, 2018

(86) PCT No.: PCT/US2018/032616
§ 371 (c)(1),
(2) Date: Nov. 15, 2019

(87) PCT Pub. No.: WO2018/217488
PCT Pub. Date: Nov. 29, 2018

(65) Prior Publication Data
US 2021/0217192 A1    Jul. 15, 2021

Related U.S. Application Data

(60) Provisional application No. 62/510,865, filed on May 25, 2017.

(51) Int. Cl.
*G06K 9/00* (2022.01)
*G06T 7/60* (2017.01)
(Continued)

(52) U.S. Cl.
CPC .......... *G06T 7/60* (2013.01); *G01V 8/02* (2013.01); *G01V 11/00* (2013.01); *G06K 9/628* (2013.01);
(Continued)

(58) Field of Classification Search
None
See application file for complete search history.

(56) References Cited

U.S. PATENT DOCUMENTS

2009/0119082 A1    5/2009 Fitzpatrick et al.
2009/0235729 A1*   9/2009 Barthelemy ........... G01V 11/00
                                                 73/152.05

(Continued)

OTHER PUBLICATIONS

Özkaya et al, Fracture Length Estimation from Borehole Image Logs, Mathematical Geology, 2003, 35(6), pp. 7 53., furnished via IDS.*

(Continued)

*Primary Examiner* — Guillermo M Rivera-Martinez

(57) ABSTRACT

Methods may include creating a fracture set from a collection of intersecting fractures in a borehole image log recorded within a subterranean formation; classifying the fracture set into groups of fully and partially intersecting fractures; calculating one or more of the elongation ratio and the rotation angle of the partially intersecting fractures; determining a probability of full intersection of fractures from the fracture set; and determining a fracture size or a parametric distribution of fracture sizes from the fracture set using the calculated one or more of the elongation ratio and the rotation angle and the determined probability of full intersection of formation fractures within the borehole.

16 Claims, 42 Drawing Sheets

(51) Int. Cl.
 G01V 8/02 (2006.01)
 G01V 11/00 (2006.01)
 G06K 9/62 (2022.01)
(52) U.S. Cl.
 CPC .............. G01V 2210/646 (2013.01); G06T 2207/10032 (2013.01); G06T 2207/20076 (2013.01); G06T 2207/30181 (2013.01)

(56) References Cited

U.S. PATENT DOCUMENTS

| | | | | |
|---|---|---|---|---|
| 2009/0262603 | A1* | 10/2009 | Hurley | G01V 11/00 367/86 |
| 2010/0250216 | A1* | 9/2010 | Narr | G06F 30/23 703/10 |
| 2011/0064277 | A1* | 3/2011 | Duncan | G01V 3/20 382/109 |
| 2011/0091078 | A1* | 4/2011 | Kherroubi | G01V 11/00 382/109 |
| 2012/0173216 | A1* | 7/2012 | Koepsell | E21B 49/00 703/6 |
| 2014/0122037 | A1* | 5/2014 | Prange | G01V 99/005 703/2 |
| 2016/0003039 | A1* | 1/2016 | Etchecopar | E21B 47/002 702/11 |
| 2016/0282502 | A1 | 9/2016 | Sharma et al. | |
| 2017/0038489 | A1 | 2/2017 | Pandey et al. | |
| 2017/0058669 | A1* | 3/2017 | Lakings | G01N 3/40 |
| 2017/0096886 | A1* | 4/2017 | Chuprakov | E21B 43/26 |
| 2018/0003841 | A1* | 1/2018 | Souche | G01V 1/282 |
| 2018/0016895 | A1* | 1/2018 | Weng | E21B 41/0092 |
| 2018/0164468 | A1* | 6/2018 | Kuesperf | G01T 1/20 |
| 2018/0203146 | A1* | 7/2018 | den Boer | G01V 1/307 |
| 2019/0277124 | A1* | 9/2019 | Yarus | E21B 43/16 |

OTHER PUBLICATIONS

Berkowitz, B. et al., "Stereological analysis of fracture network structure in geological formations", Journal of Geophysical Research, 1998, 103(B7), pp. 15339-15360.
Bertrand, L. et al., "A multiscale analysis of a fracture pattern in granite: A case study of the Tamariu granite, Catalunya, Spain", Journal of Structural Geology, 2015, pp. 52-66.
Billaux, D. et al., "Three-Dimensional Statistical Modelling of a Fractured Rock Mass—an Example from the Fanay-Augères mine", International Journal of Rock Mechanics and Mining Sciences & Geomechanics Abstracts, 1989, 26 (3-4), pp. 281-299.
Bonnet, E. et al., "Scaling of Fracture Systems in Geological Media", Reviews of Geophysics, 2001, 39(3), pp. 347-383.
Bounoua, N. et al., "Applied Natural Fracture Characterization Using Combination of Imagery and Transient Information: Case Studies from Cambro-Ordovician Tight Sandstones of Algeria", SPE 112303, presented at the SPE North Africa Technical Conference and Exhibition held in Marrakech, Morocco, 2008.
Chilès, J. P., "Fractal and geostatistical methods for modeling of a fracture network", Mathematical Geology, 1988, 20 (6), pp. 631-654.
Darcel, C. et al., "Stereological analysis of fractal fracture networks", Journal of Geophysical Research, 203, 108 (B9, 2451), pp. 1-14.
Gao, M. et al., "Fracture size estimation using data from multiple boreholes", International Journal of Rock Mechanics & Mining Sciences, 2016, 86, pp. 29-41.
Gupta, A. K. et al., "Stereological Analysis of Fracture Networks Along Cylindrical Galleries", Mathematical Geology, 2006, 38(3), pp. 233-267.
Holický, M., "Functions of Random Variables", in Introduction to Probability and Statistics for Engineers, Springer Berlin Heidelberg, Berlin, Heidelberg, 2013, pp. 79-93.

Jin, W. et al., "Analytical expressions for the size distribution function of elliptical joints", International Journal of Rock Mechanics & Mining Sciences, 2014, 70, pp. 201-211.
Rohrbaugh, Jr., M. B. et al., "Estimating fracture trace intensity, density, and mean length using circular scanlines and windows", AAPG Bulletin, 2002, 86(12), pp. 2089-2104.
Kulatilake, P. H. S. W. et al., "Estimation of Mean Trace Length of Discontinuities", Rock Mechanics and Rock Engineering, 1984, 17(4), pp. 215-232.
Laake, A., "Detection and Delineation of Geologic Hazards From Seismic Data", SEG Conference Paper 2014-0137 presented at the 2014 SEG Annual Meeting, Denver, Colorado, U.S.A., pp. 1480-1484.
Laake, A., "Structural interpretation in color—a new RGB processing application for seismic data", Interpretation, 2015, 3(1), pp. SC1-8.
Laake, A., "Seismic processing and interpretation in colour", First Break, 2013, 31, pp. 81-85.
Lantuéjoul, C. et al., "Estimating the Trace Length Distribution of Fracture from Line Sampling Data", Geostatistics Banff 2004, No. vol. 14/1 in Quantitative Geology and Geostatistics, pp. 165-174.
La Pointe, P. R. et al., "Characterization and interpretation of rock mass joint patterns", Geological Society of America Special Paper, 1985, 199, pp. 1-38.
Laslett, G. M. et al., "Censoring and Edge Effects in Areal and Line Transect Sampling of Rock Joint Traces", Journal of the International Association for Mathematical Geology, 1982, 14(2), pp. 125-140.
Le Garzic, E. et al., "Scaling and geometric properties of extensional fracture systems in the proterozoic basement of Yemen. Tectonic interpretation and fluid flow implications", Journal of Structural Geology, 2011, 33, pp. 519-536.
Mauldon, M., "Borehole estimates of fracture size", ARMA-2000-0715 presented at the 4th North American Rock Mechanics Symposium, Seattle, Washington, U.S. A., 2000, pp. 715-721.
Mauldon, M. et al., "Fracture Sampling on a Cylinder: From Scanlines to Boreholes and Tunnels", Rock Mechanics and Rock Engineering, 1997, 30(3), pp. 129-144.
Odling, N. E. et al., "Variations in fracture system geometry and their implications for fluid flow in fractures hydrocarbon reservoirs", Petroleum Geoscience, 1999, 5(4), pp. 373-384.
Özkaya S. I., "Fracture Length Estimation From Borehole Image Logs", Mathematical Geology, 2003, 35(6), pp. 737-753.
Özkaya S. I. et al., "Fracture connectivity from fracture intersections in borehole image logs", Computers & Geosciences, 2003, 29, pp. 143-153.
Pahl, P. J., "Estimating the Mean Length of Discontinuity Traces", International Journal of Rock Mechanics and Mining Sciences & Geomechanics Abstracts, 1981, 18(3), pp. 221-228.
Peacock, D. C. P. et al., "Glossary of fault and other fracture networks", Journal of Structural Geology, 2016, 92, pp. 12-28.
Pedersen, S. I. et al., "Automatic Fault Extraction using Artificial Ants", Paper 2002-0512 presented at the 2002 SEG Annual Meeting, Salt Lake City, Utah, U. S. A., 4 pages.
Piggott, A. "Fractal relations for the diameter and trace length of disc-shaped fractures", Journal of Geophysical Research, 1997, 102(B8), pp. 18121-18125.
Pollard, D. D., "Progress in understanding jointing over the past century", Geological Society of America Bulletin, 1988, 100(8), pp. 1181-1204.
Priest, S. D., Determination of Discontinuity Size Distributions from Scanline Data, Rock Mechanics and Rock Engineering, 2004, 37(5), pp. 347-368.
Priest, S. D. et al., "Estimation of Discontinuity Spacing and Trace Length Using Scanline Surveys", International Journal of Rock Mechanics and Mining Science & Geomechanics Abstracts, 1981, 18(3), pp. 83-197.
Terzaghi, R. D., "Sources of Errors in Joint Surveys", Geotechnique, 1965, 15, pp. 287-304.
Thovert, J.-F. et al., "Trace analysis for fracture networks of any convex shape", Geophysical Research Letters, 2004, 31(L22502), pp. 1-5.

(56) References Cited

OTHER PUBLICATIONS

Dershowitz, W. et al., "Discrete fracture approaches for oil and gas applications", ARMA 1994-0019 presented at the 1st North American Rock Mechanics Symposium, Austin, Texas, U. S. A., 1994, pp. 19-30.

Wang, W. et al., "Using Borehole Data to Estimate Size and Aspect Ratio of Subsurface Fractures", ARMA-04-570, presented the Gulf Rocks 2004, 6th North America Rock Mechanics Symposium (NARMS), Houston, Texas, U. S. A., 6 pages.

Wang, X., "Stereological Interpretation of Rock Fracture Traces on Borehole Walls and Other Cylindrical Surfaces", Phd dissertation, Faculty of the Virginia Polytechnic Institute and State University, 2005, 123 pages.

Warburton, P. M., "Stereological Interpretation of Joint Trace Data: Influence of Joint Shape and Implications for Geological Surveys", International Journal of Rock Mechanics and Mining Science & Geomechanics Abstracts, 1980, 17, pp. 305-316.

Warburton, P. M., "A Stereological Interpretation of Joint Trace Data", International Journal of Rock Mechanics and Mining Sciences & Geomechanics Abstracts, 1980, 17(4), pp. 181-190.

Wilson, T. H. et al., "Developing a model discrete fracture network, drilling, and enhanced oil recovery strategy in an unconventional naturally fractured reservoir using integrated field, image log, and three-dimensional seismic data", American Association of Petroleum Geologists Bulletin, 2015, 99(4), pp. 735-762.

Zhang, L. et al., "Estimating the Mean Trace Length of Rock Discontinuities", Rock Mechanics and Rock Engineering, 1998, 31(4), pp. 217-235.

Zhang, L. et al., "Stereological relationship between trace length and size distribution of elliptical discontinuities", Geotechnique, 2002, 52(6), pp. 419-433.

Search Report and Written Opinion of International Patent Application No. PCT/US2018/032616 dated Oct. 11, 2018, 9 pages.

International Preliminary Report on Patentability of International Patent Application No. PCT/US2018/032616 dated Dec. 5, 2019, 6 pages.

R.A. Nelson, "Evaluating Fractured Reservoirs: Introduction" In: Geologic analysis of naturally fractured reservoirs, Second Edition, Chapter 1, Gulf Professional Publishing—Butterworth-Heinemann, Woburn, MA, 2001, 32 pages.

Silverman, B. W., "Density Estimation for Statistics and Data Analysis" Monographs on statistics and applied probability 26. Chapman & Hall/CRC, London, 1986, Published 1998, 22 pages, accessed Mar. 15, 2002; available at file:///e/moe/HTML/March02/Silverman/Silver.html.

John W. Tukey. Exploratory Data ANalysis. Addison-Wesley series in behavioral sciences. Addison-Wesley, Reading, Massachusetts, 1977, 711 pages.

* cited by examiner

FIG. 2.1
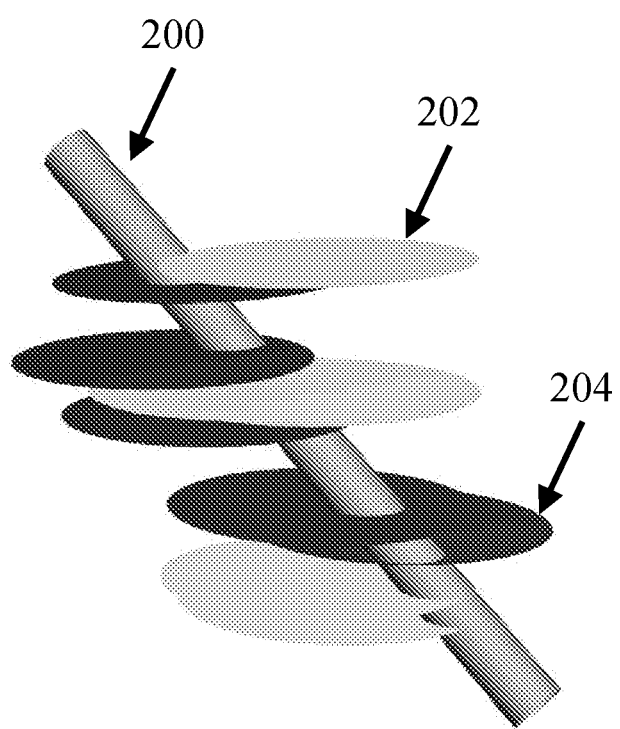

FIG. 2.2
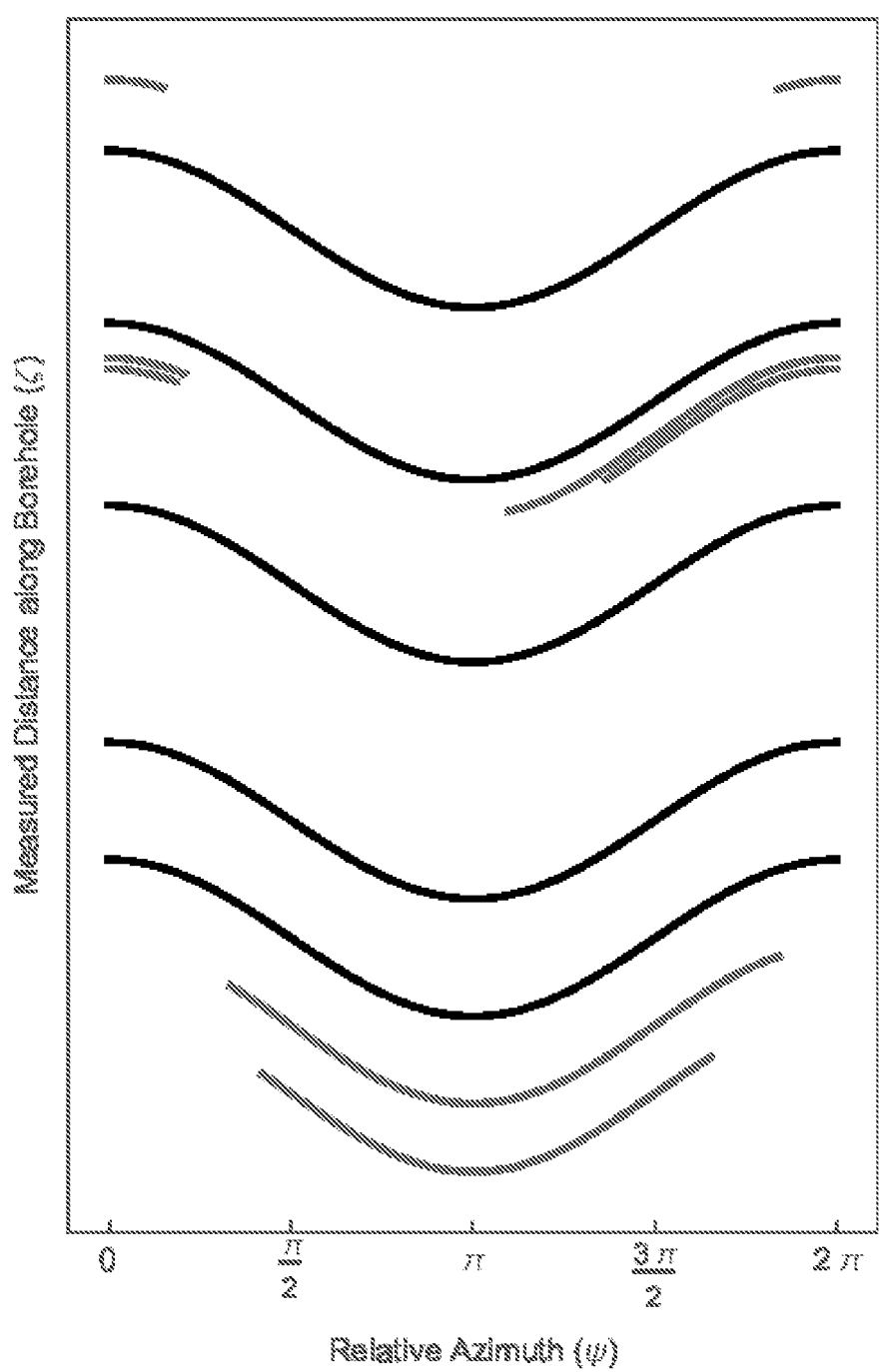

FIG. 4.1
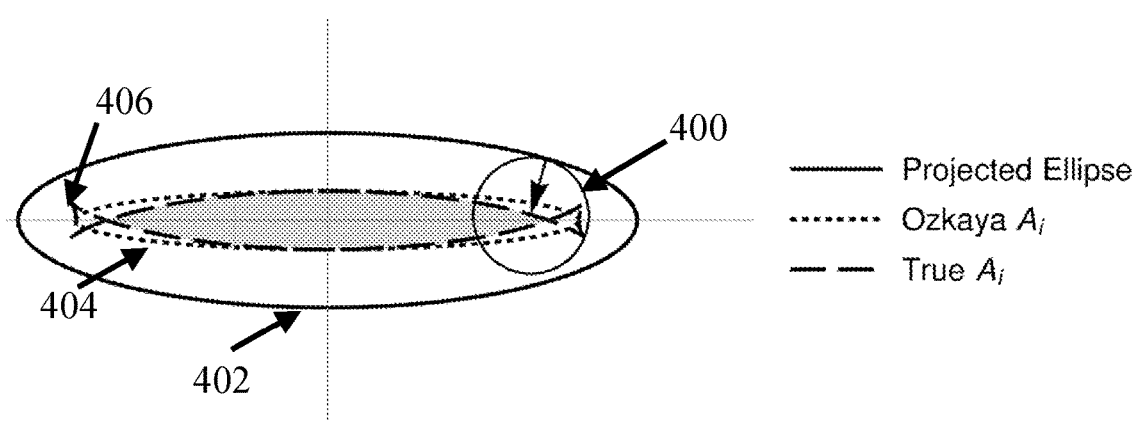
FIG. 4.2
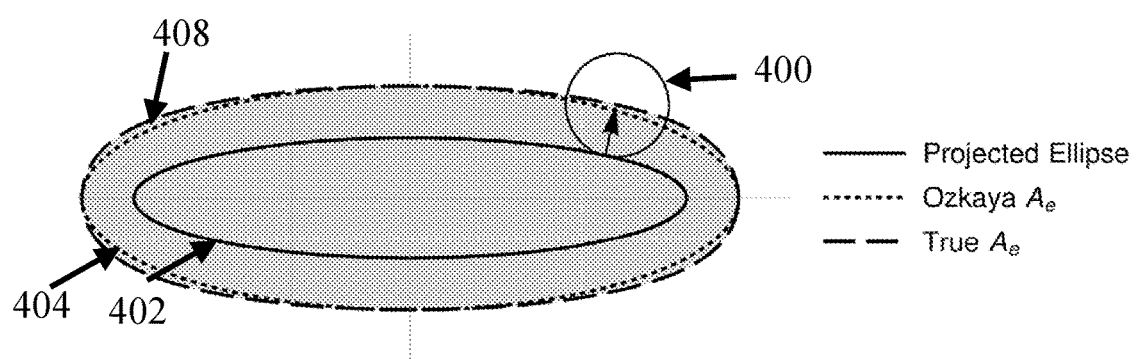

FIG. 5.1
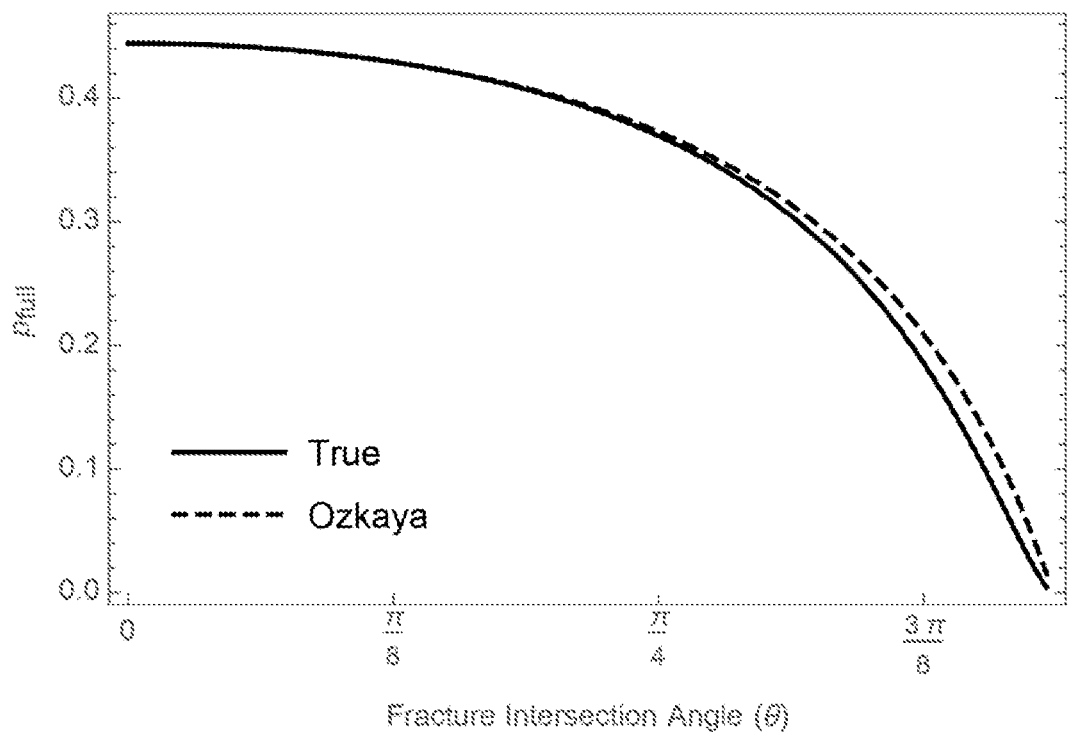

FIG. 5.2
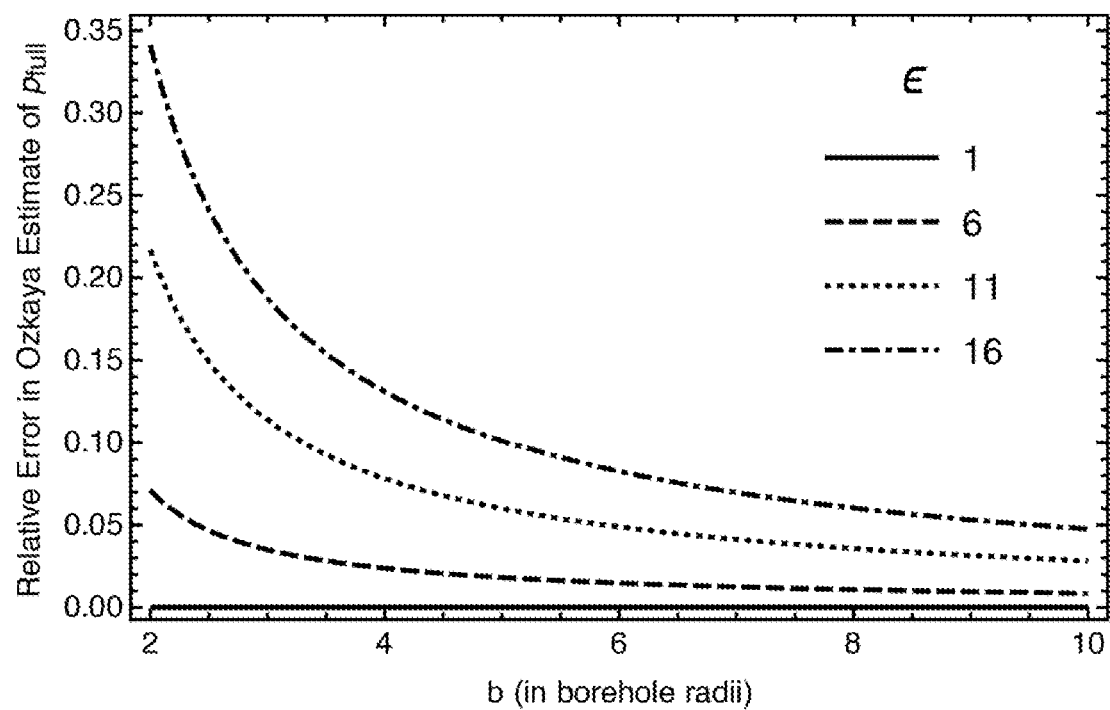

FIG. 6.1
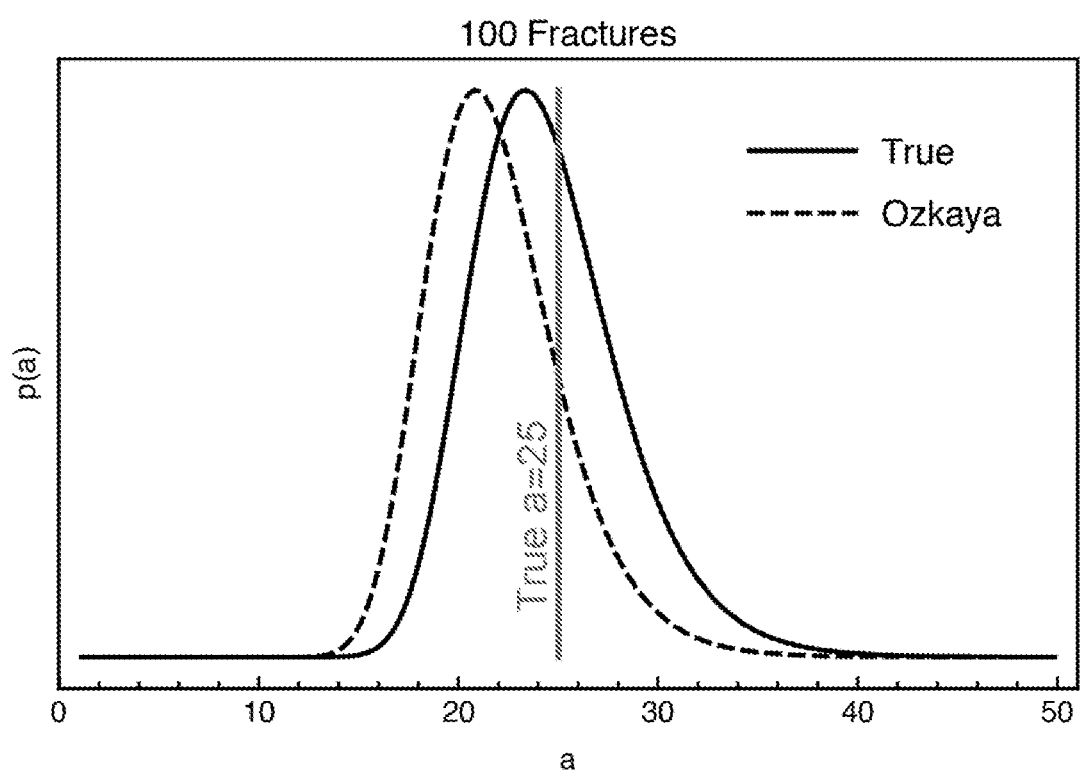

FIG. 6.2
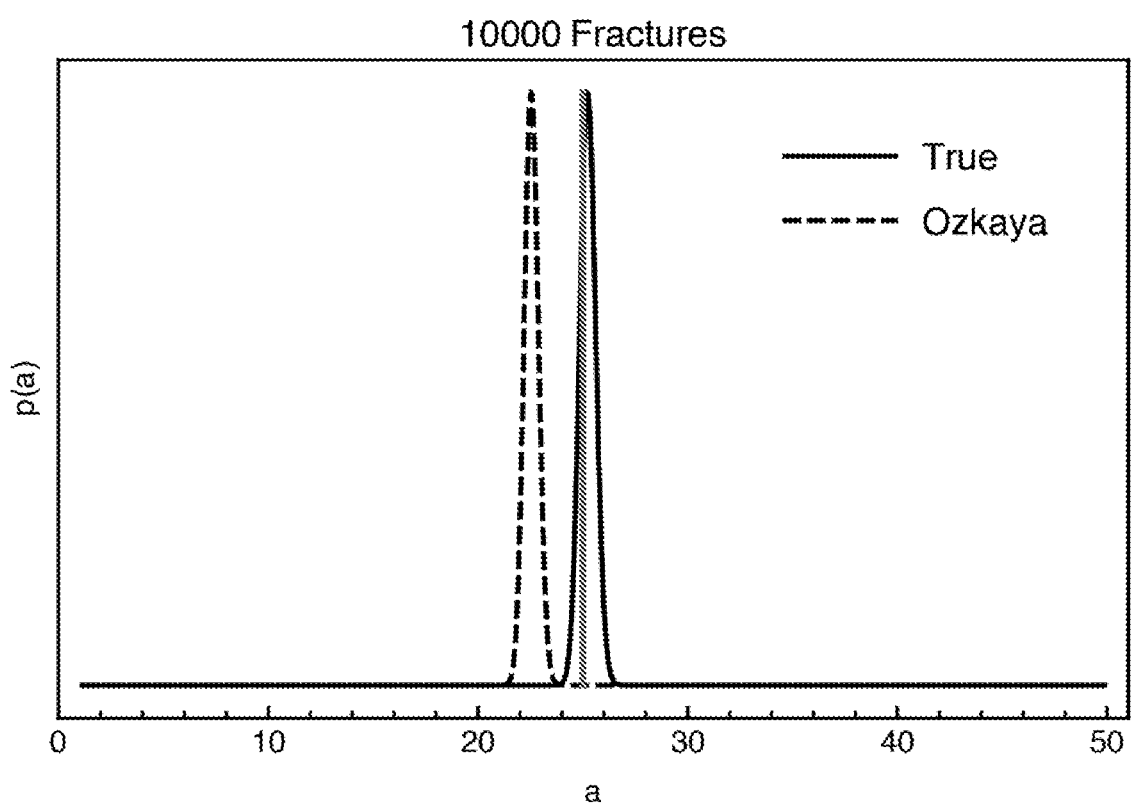

FIG. 7.1
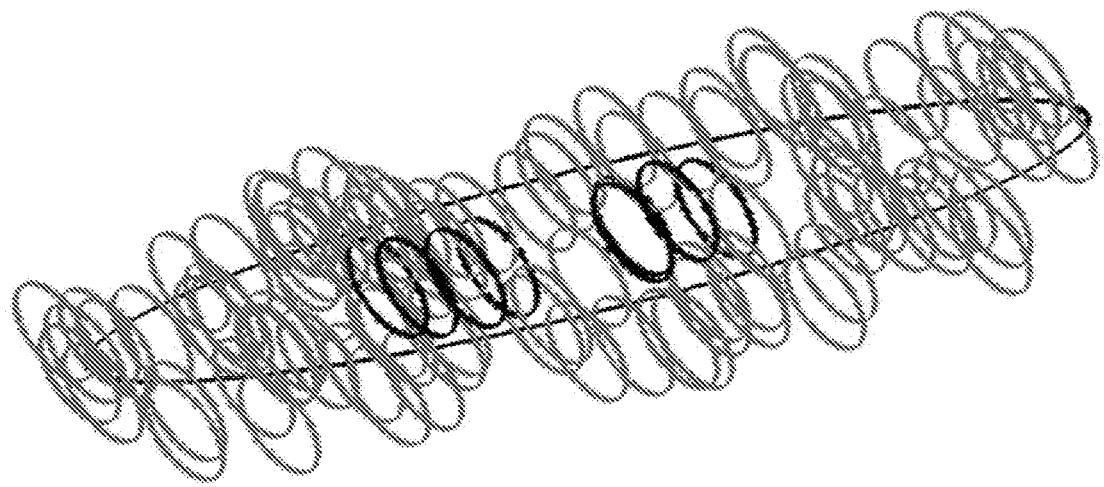
FIG. 7.2
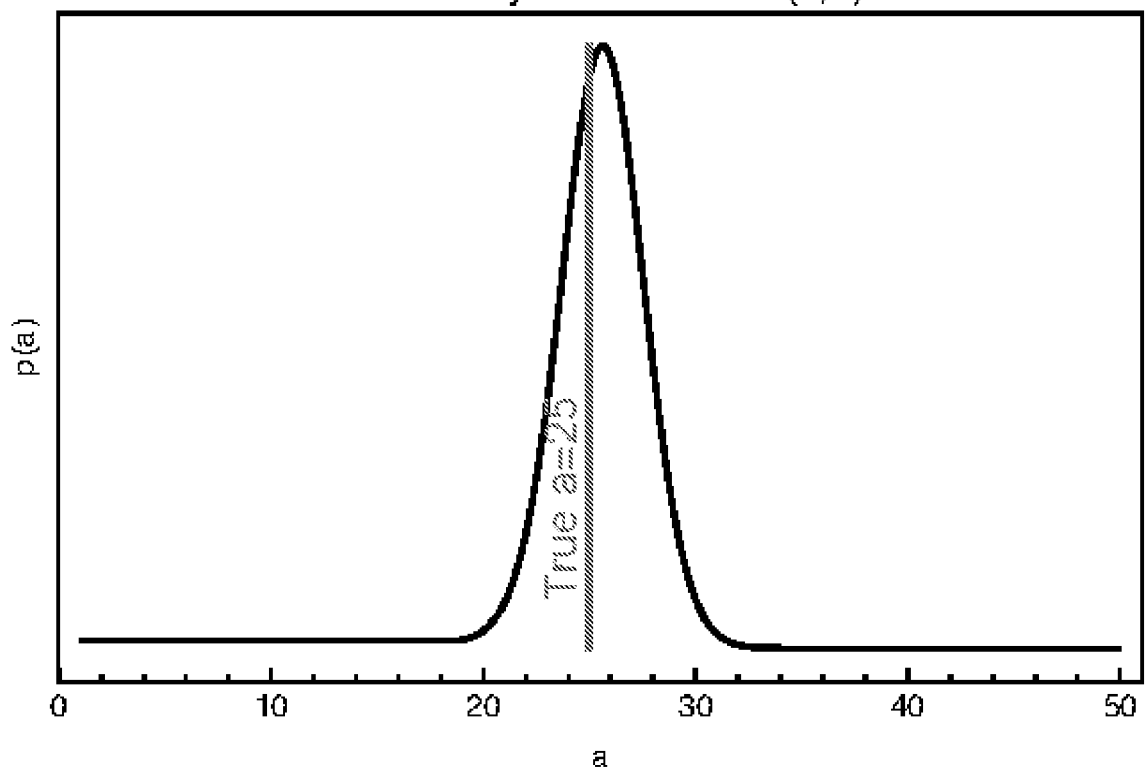

FIG. 7.3
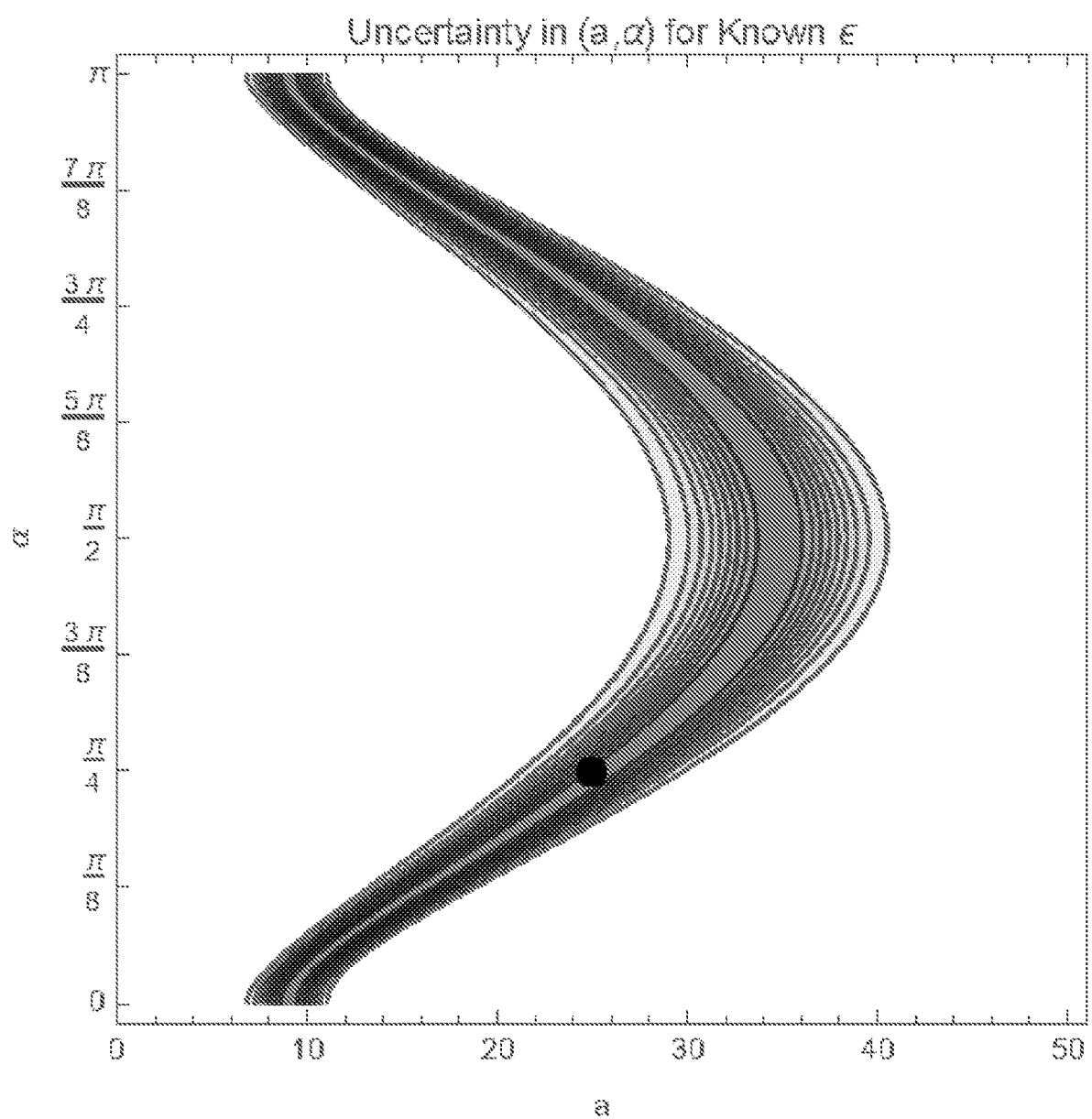

FIG. 7.4
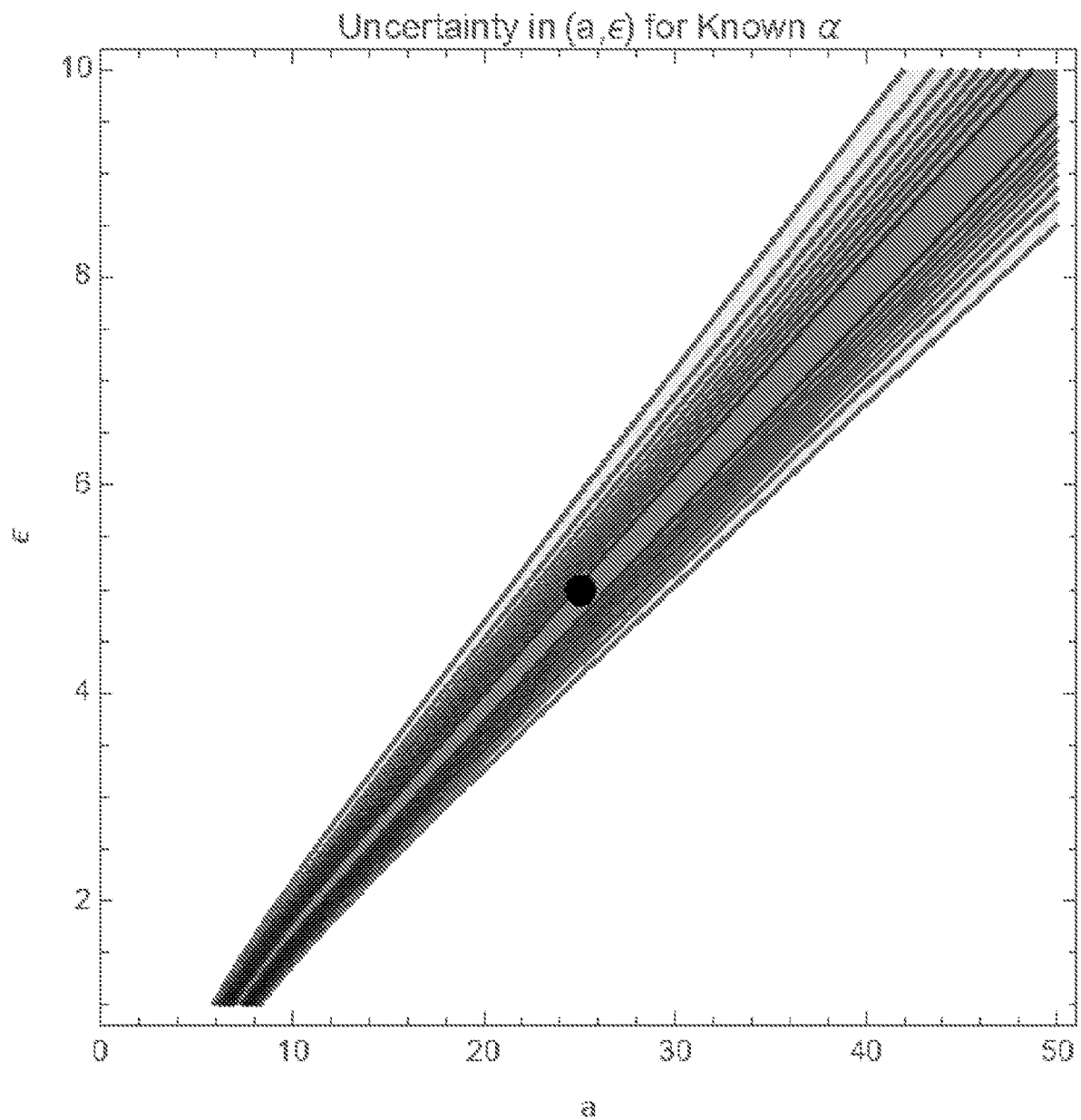

FIG. 7.5
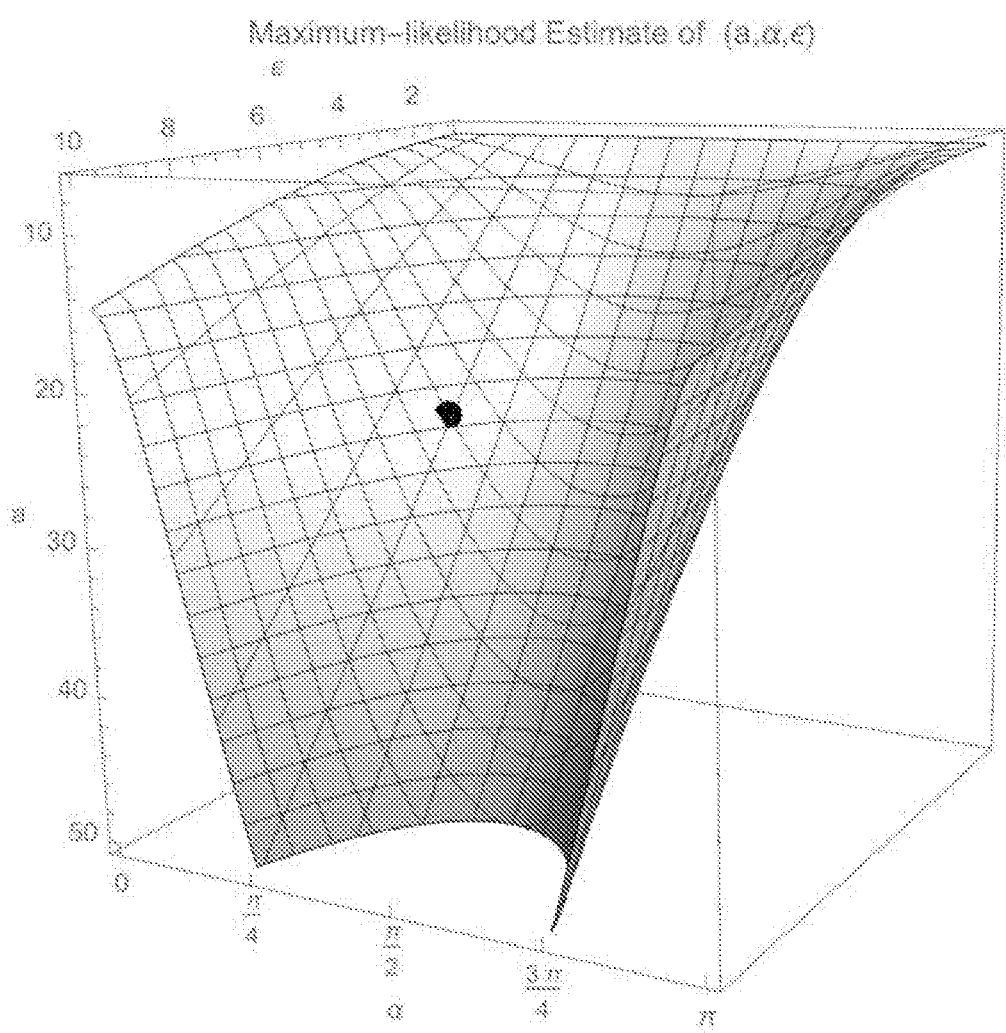

FIG. 8.1
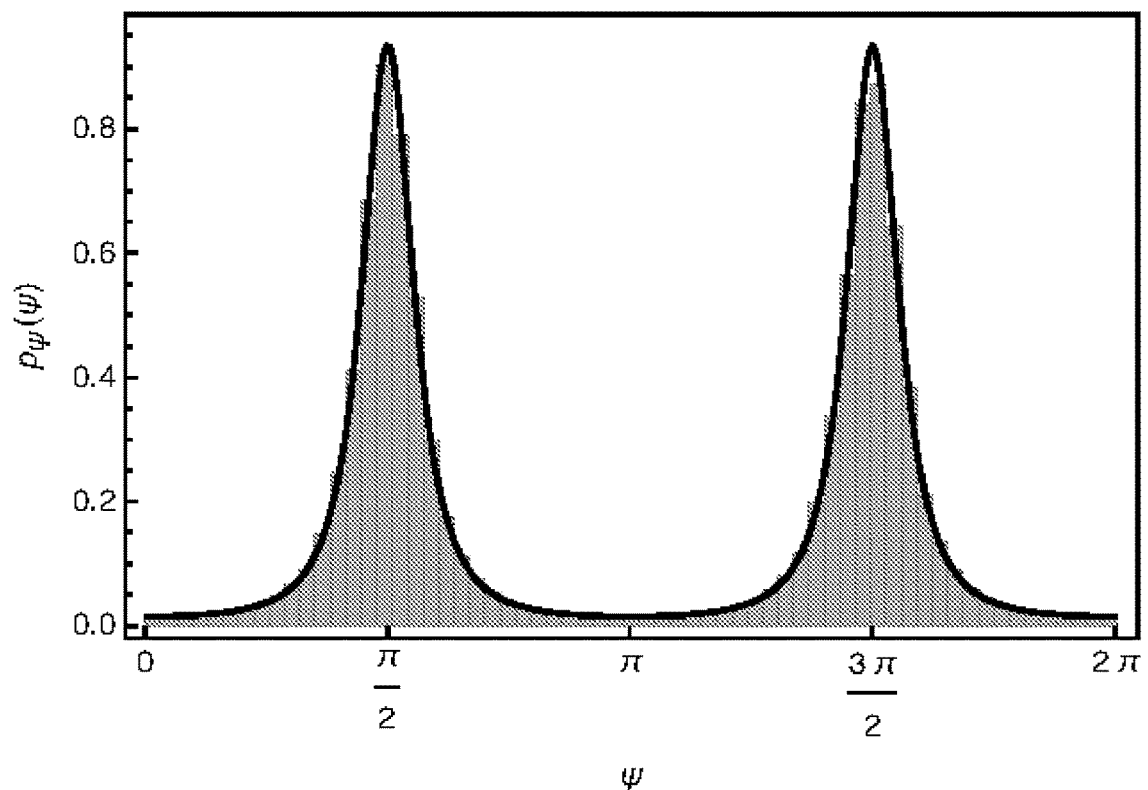
FIG. 8.2
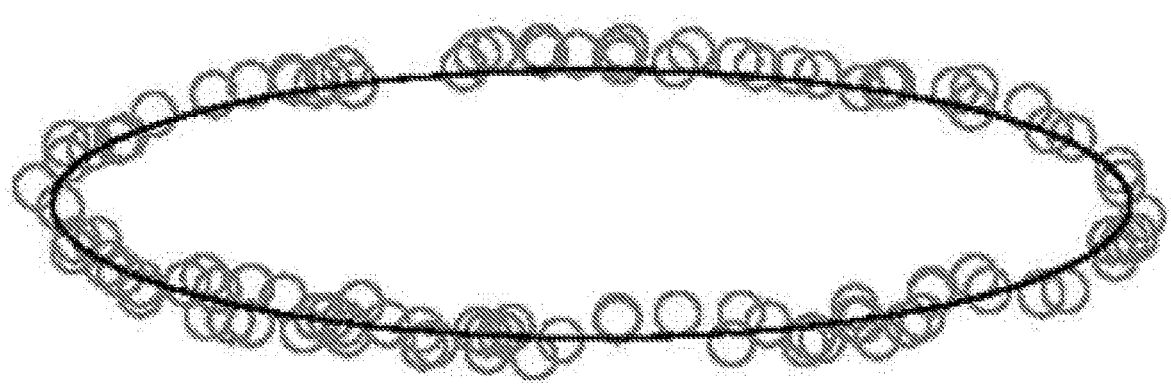

FIG. 8.3
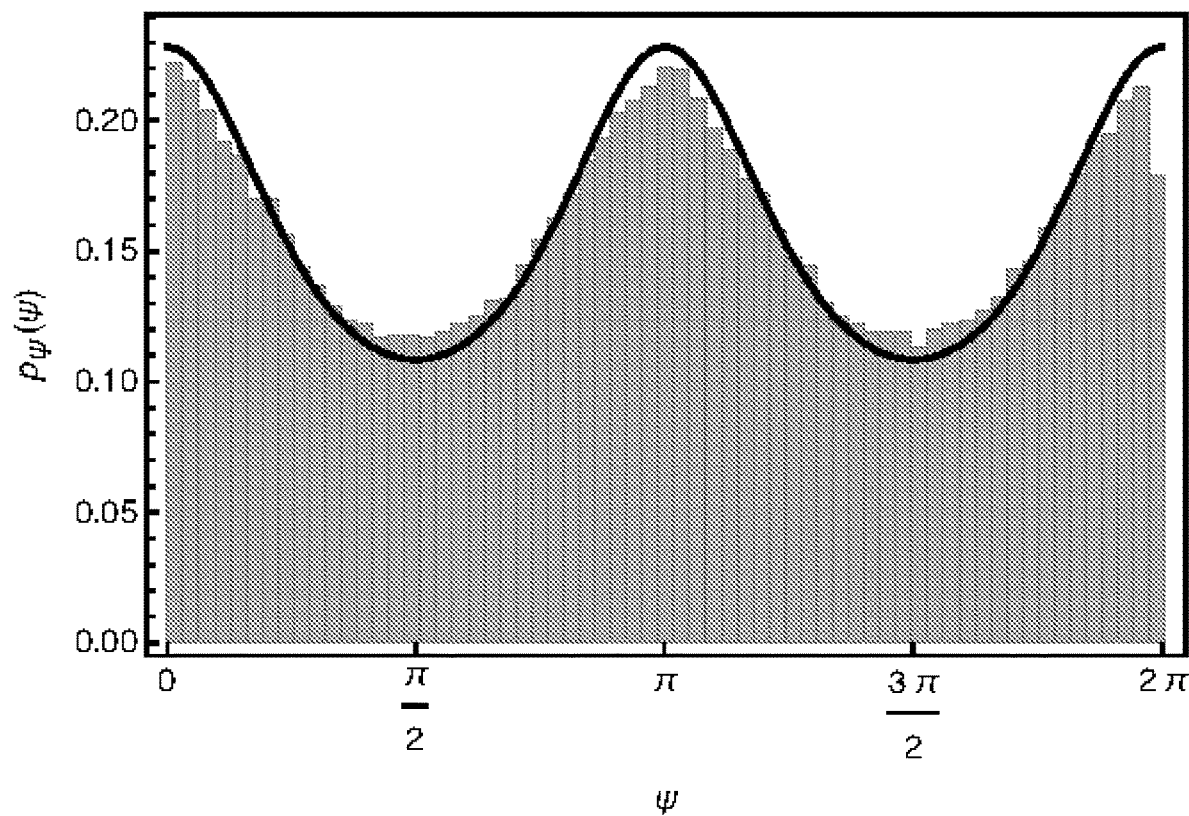
FIG. 8.4

FIG. 9.1
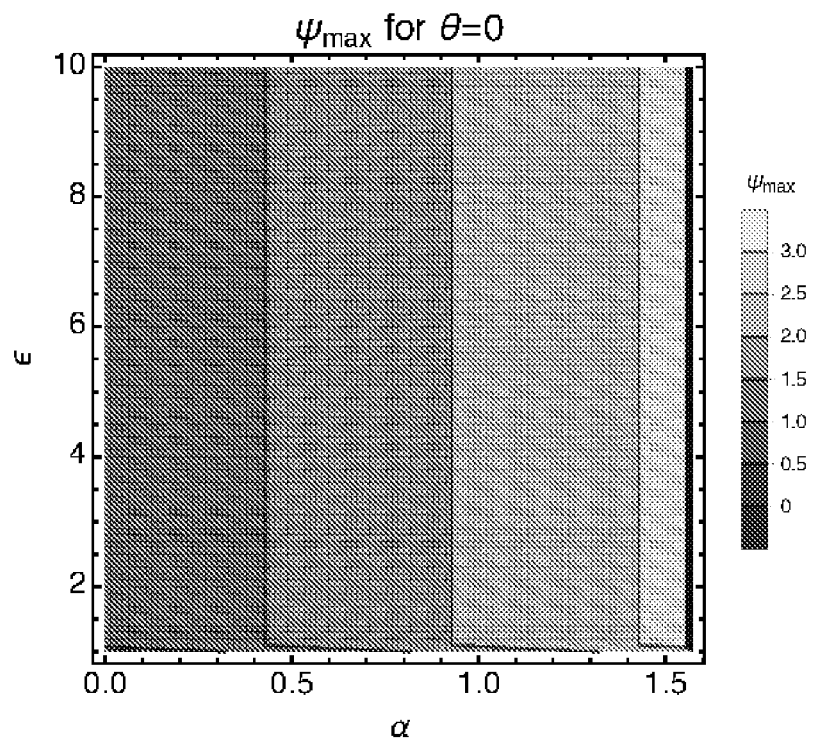
FIG. 9.2
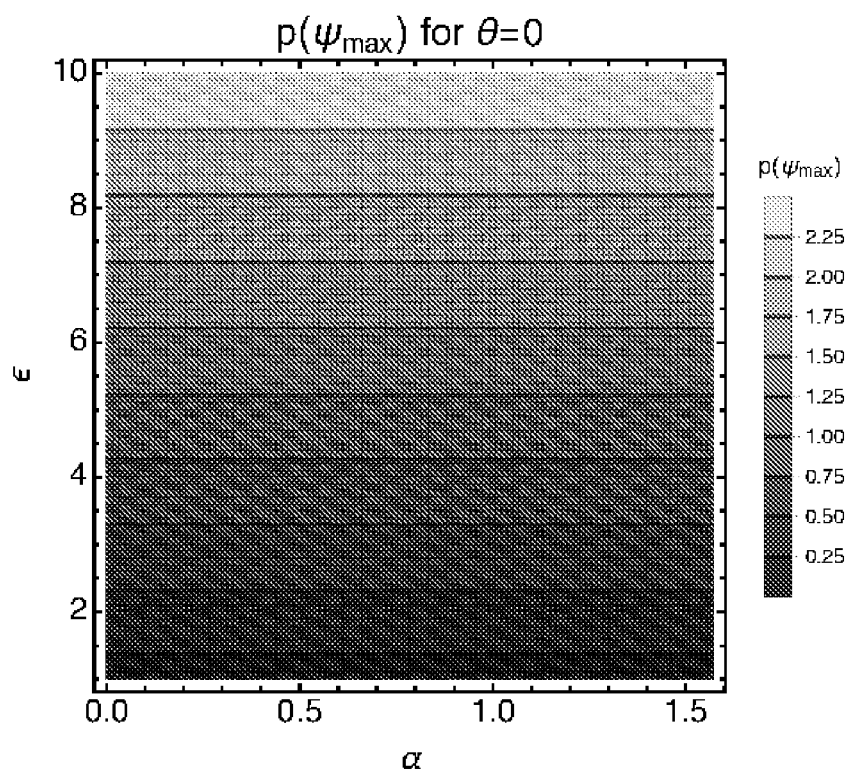

FIG. 9.3
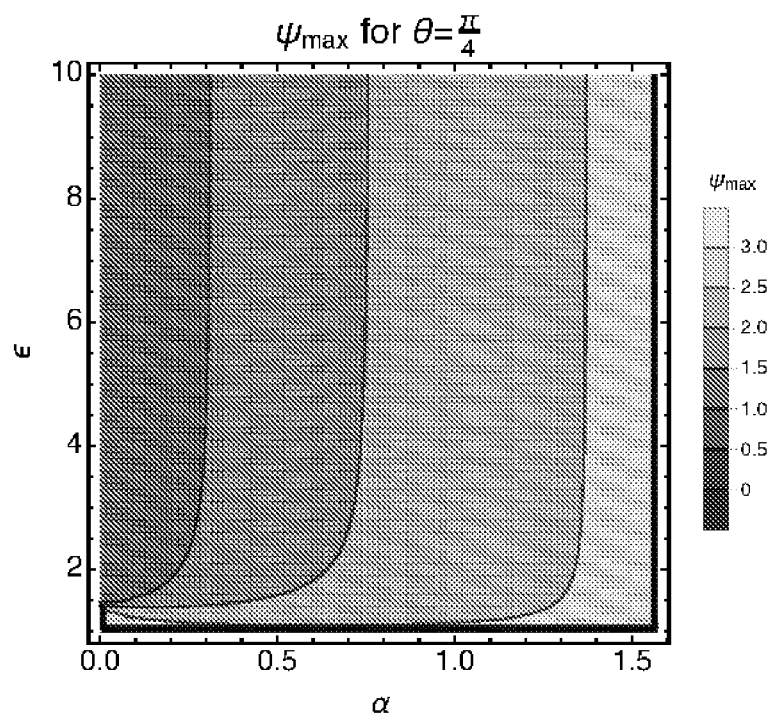
FIG. 9.4
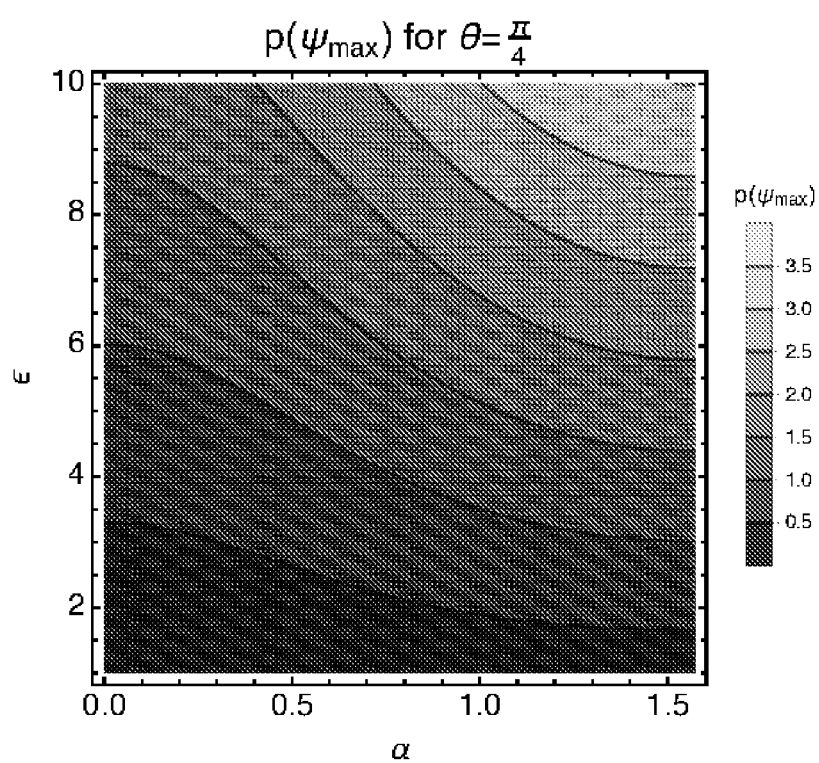

FIG. 9.5
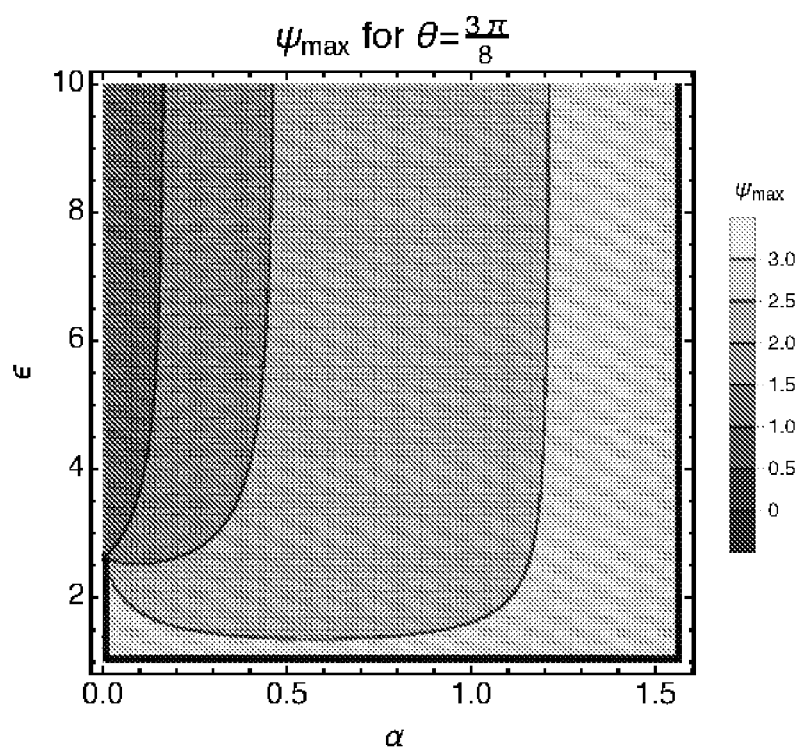
FIG. 9.6
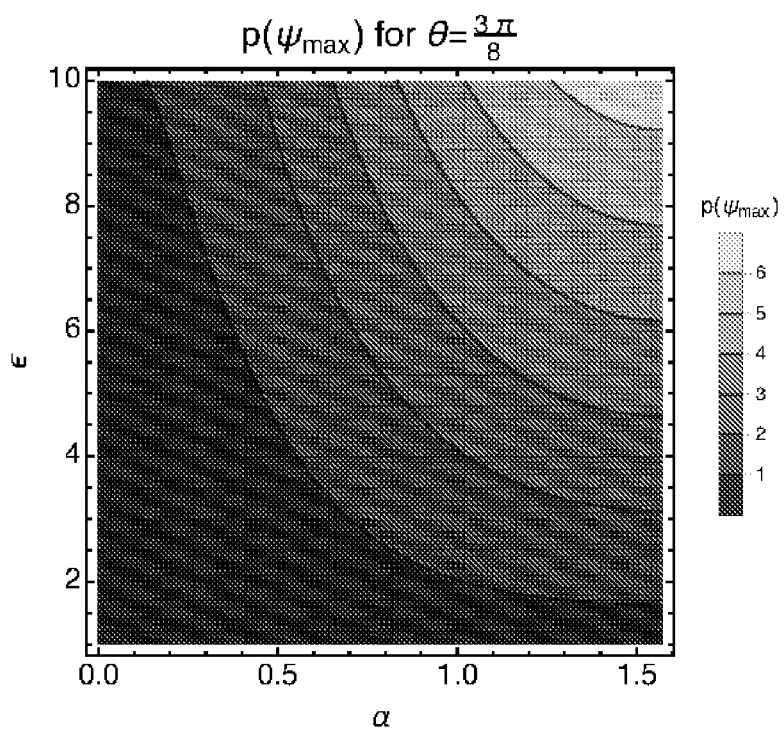

FIG. 10.1
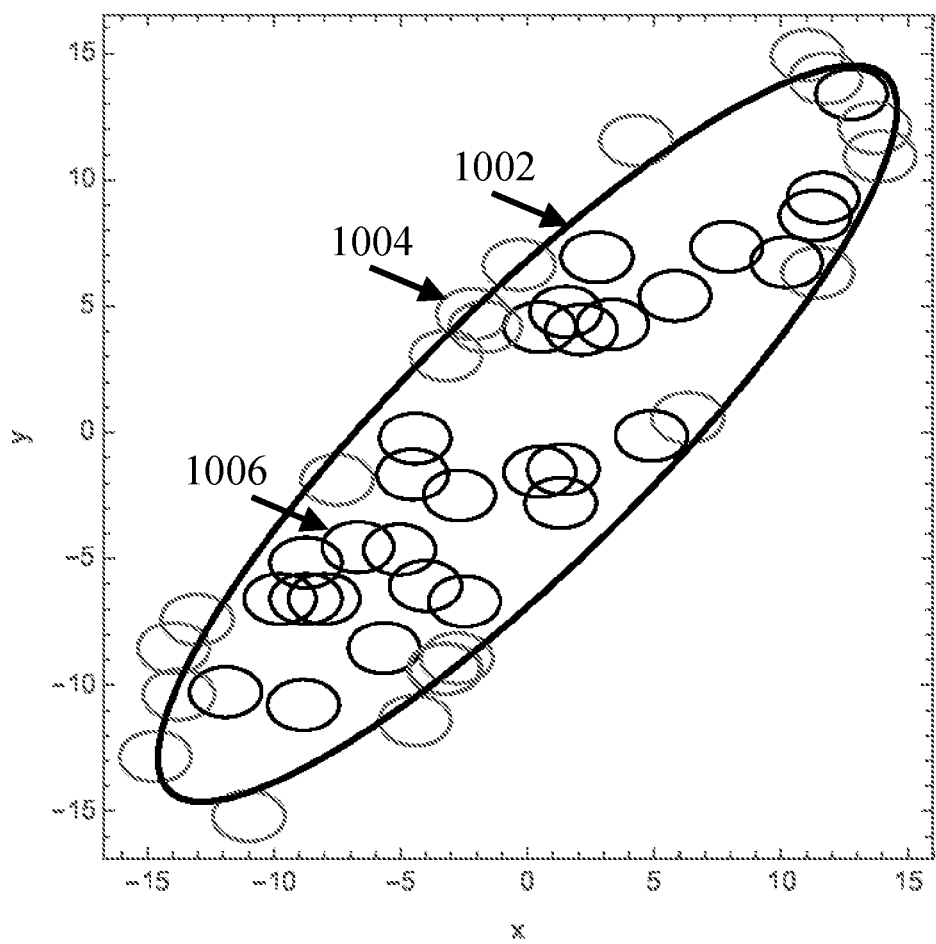

FIG. 10.2
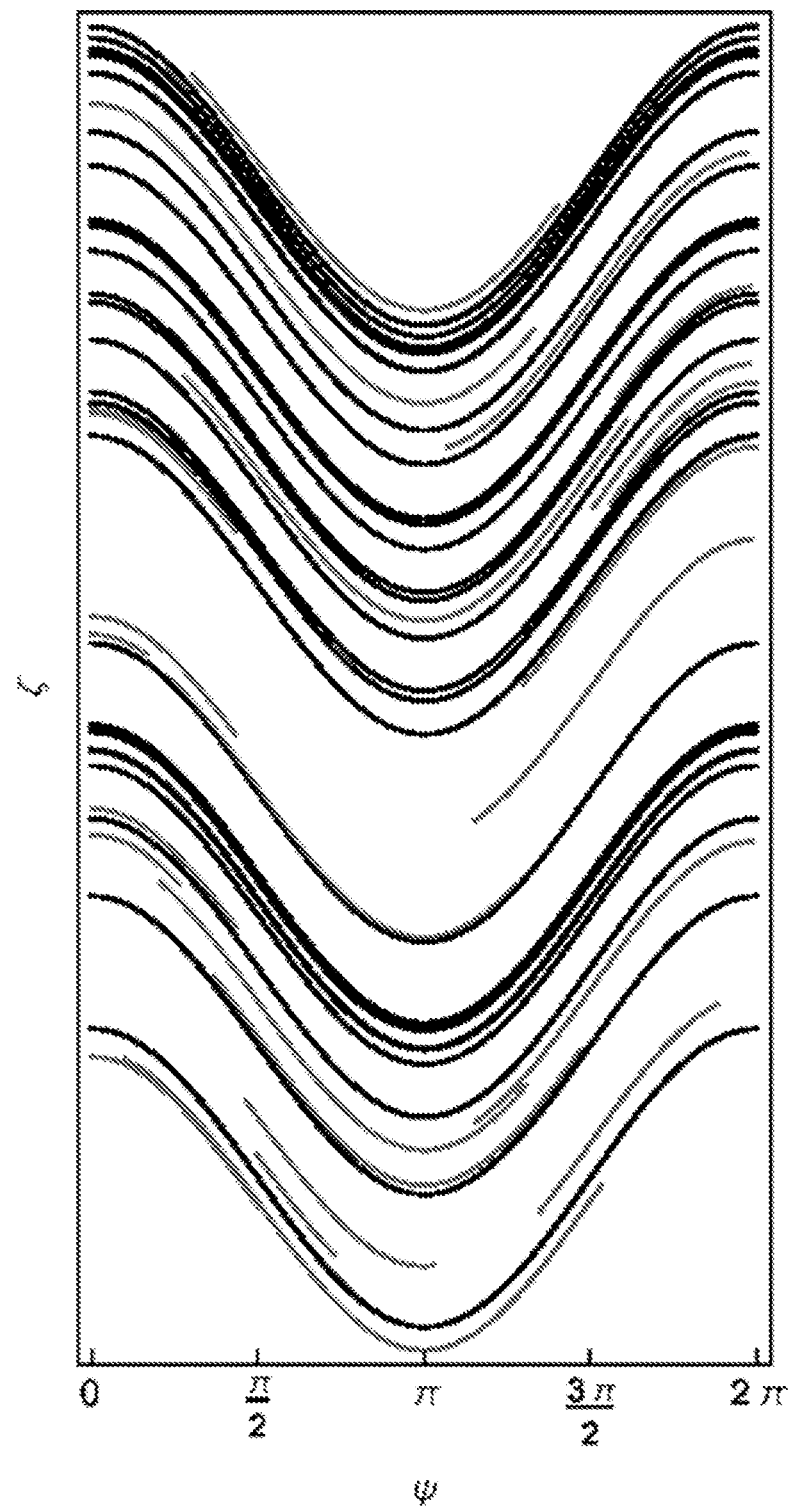

FIG. 12.1
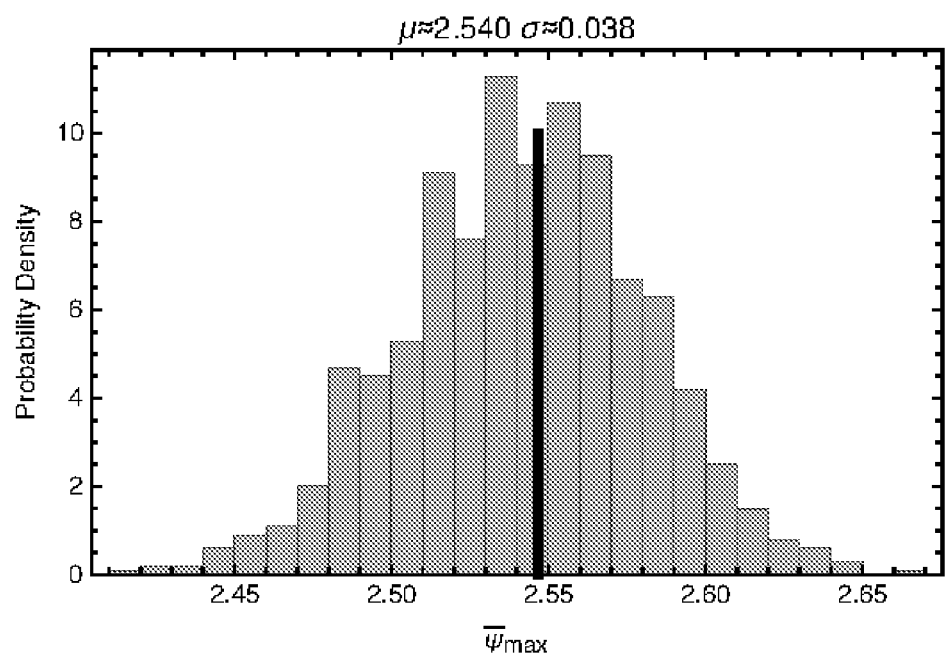
FIG. 12.2
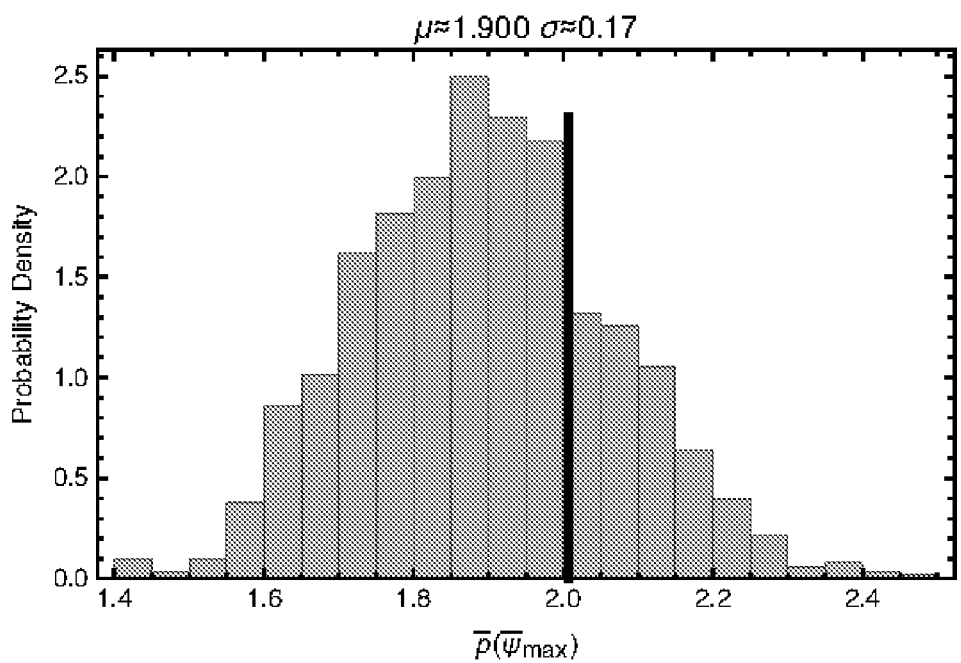

FIG. 13.1
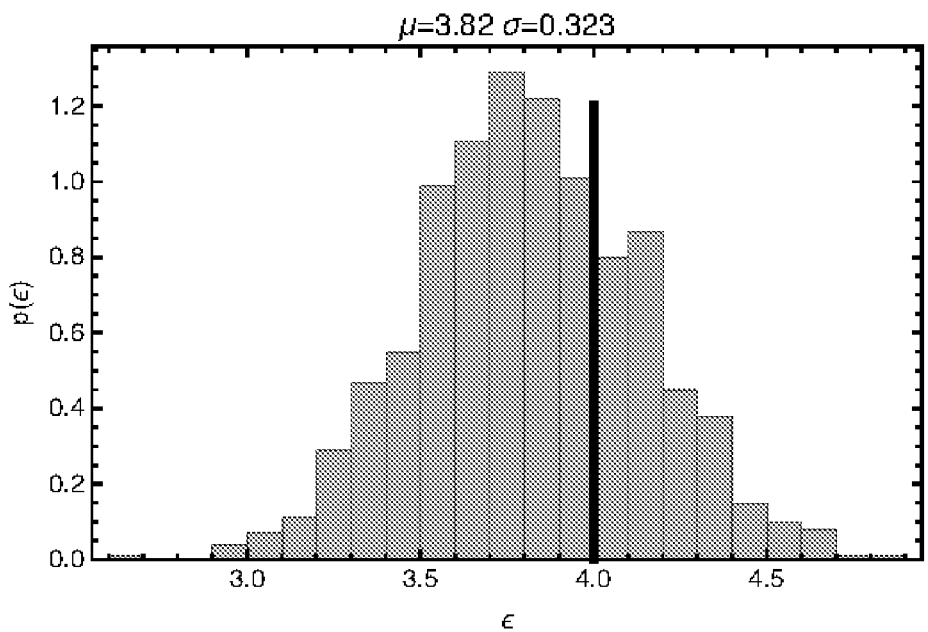
FIG. 13.2
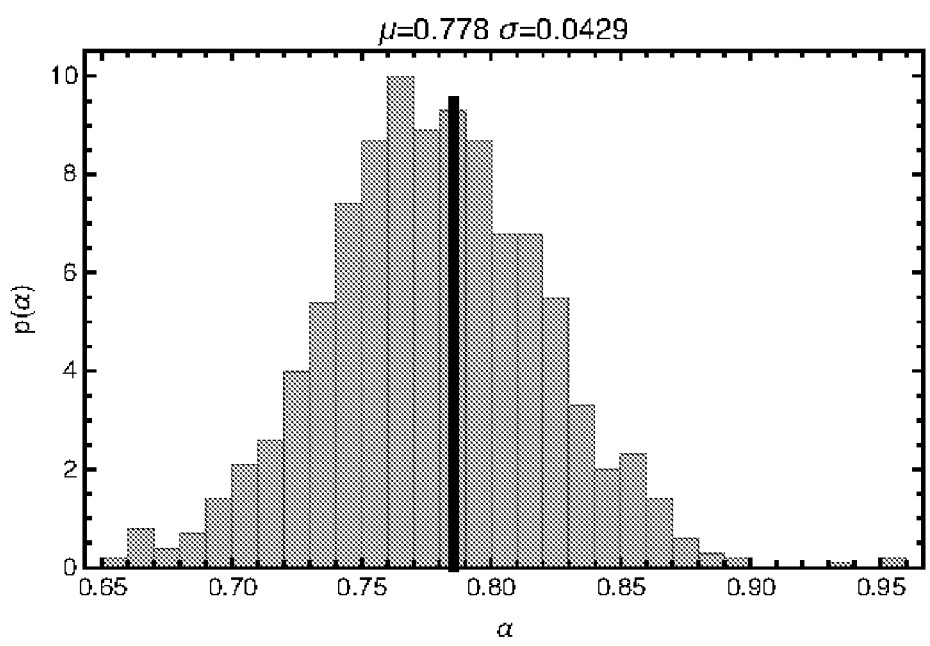

FIG. 13.3
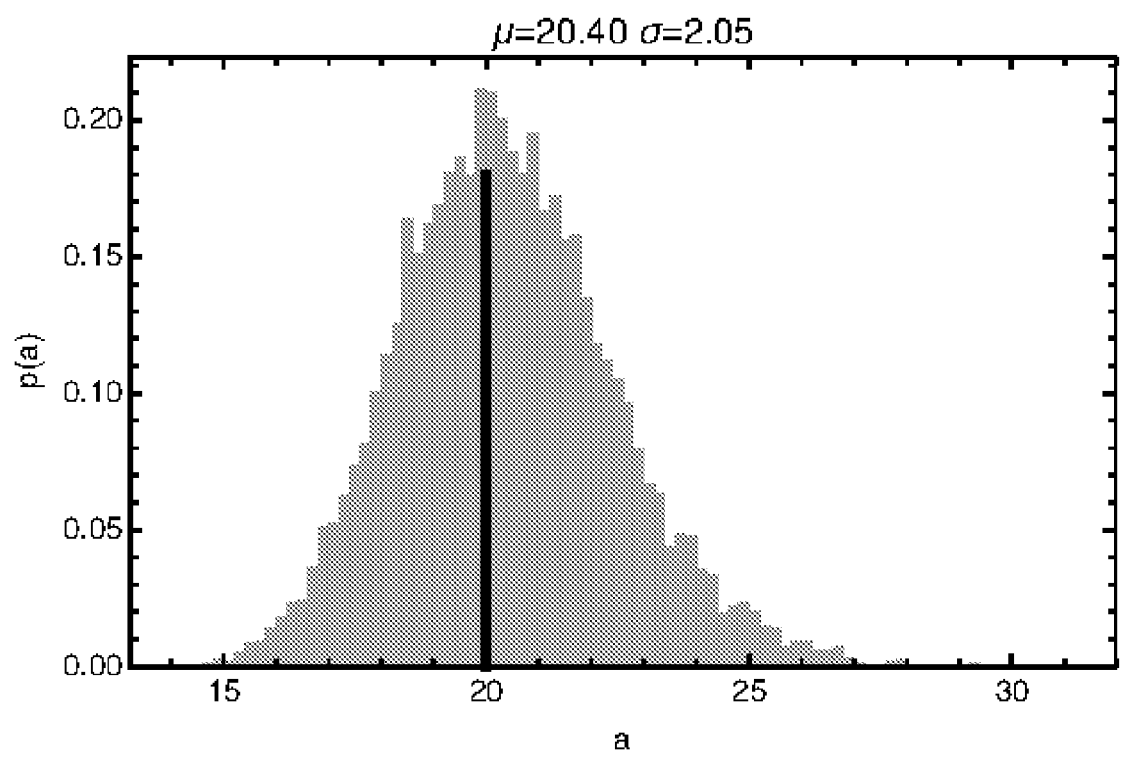

FIG. 14.1
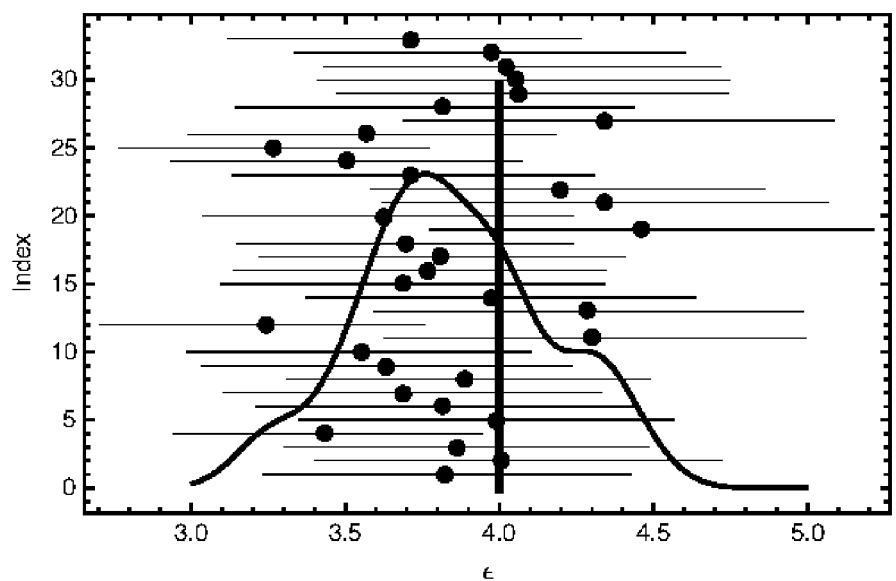
FIG. 14.2
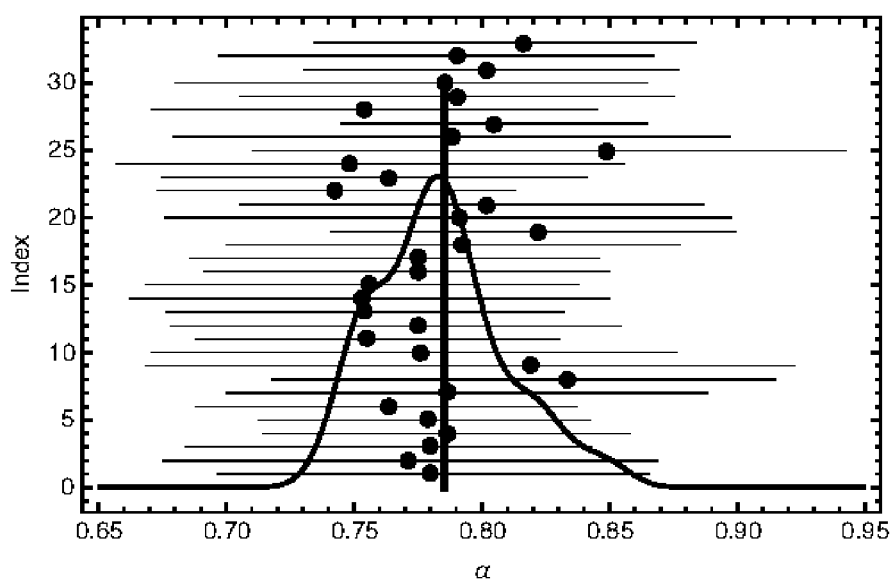

FIG. 14.3
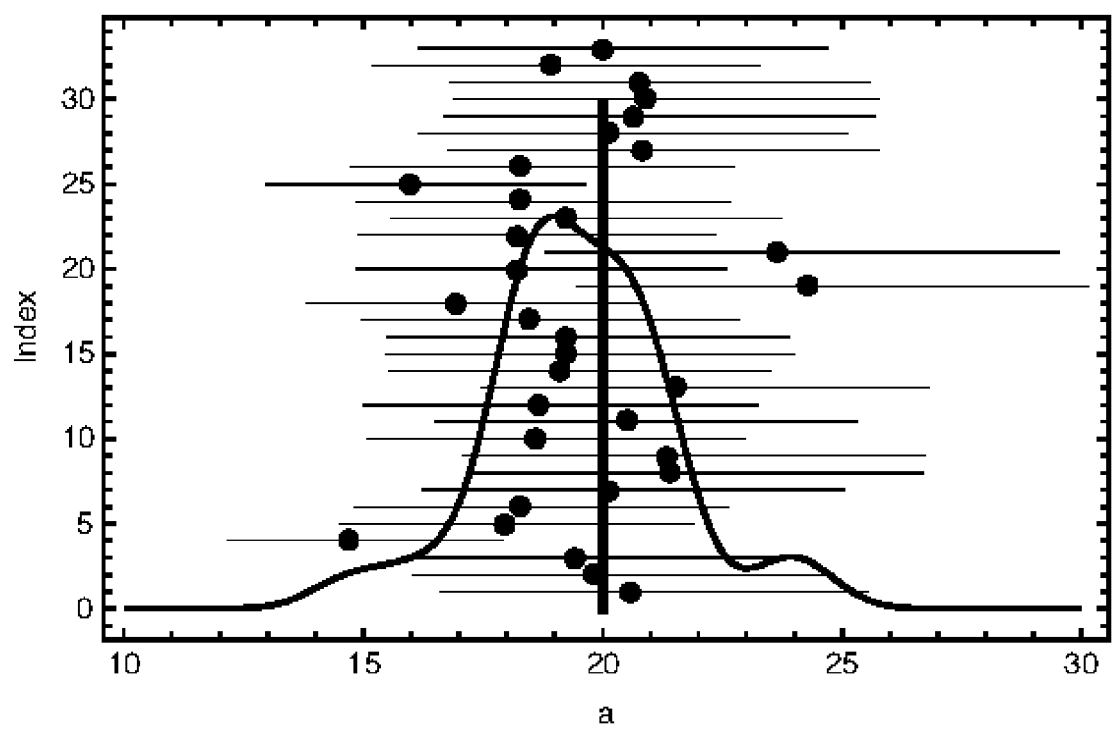

FIG. 15.1
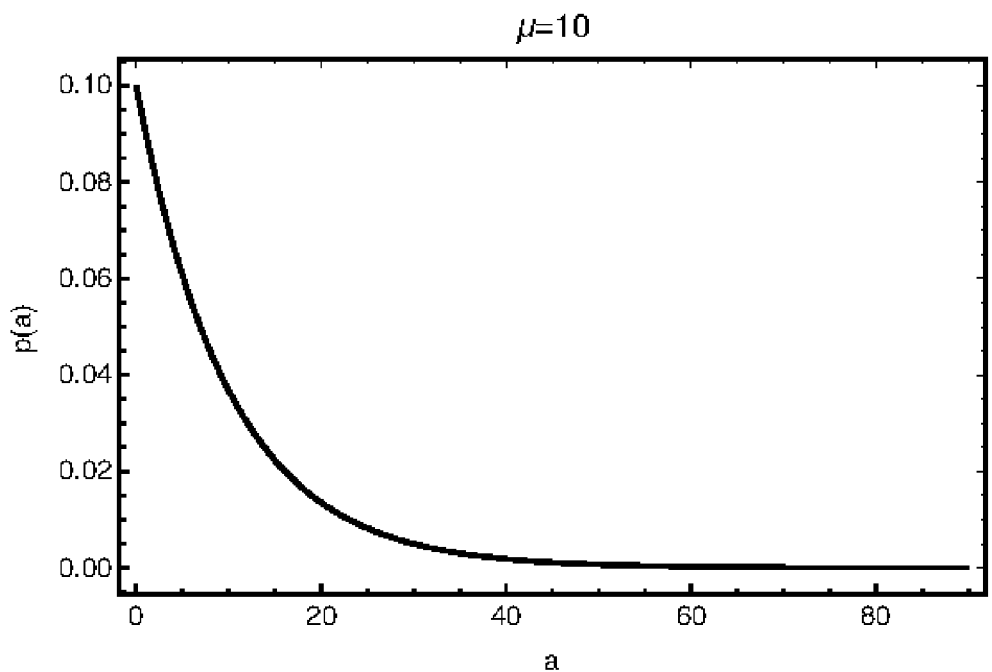
FIG. 15.2
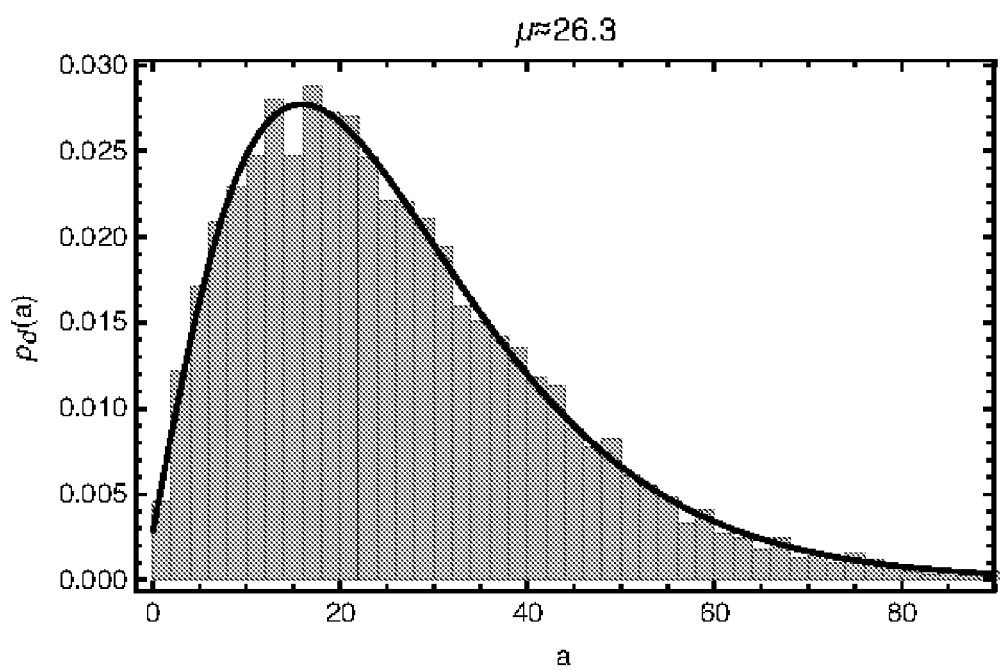

FIG. 16.1
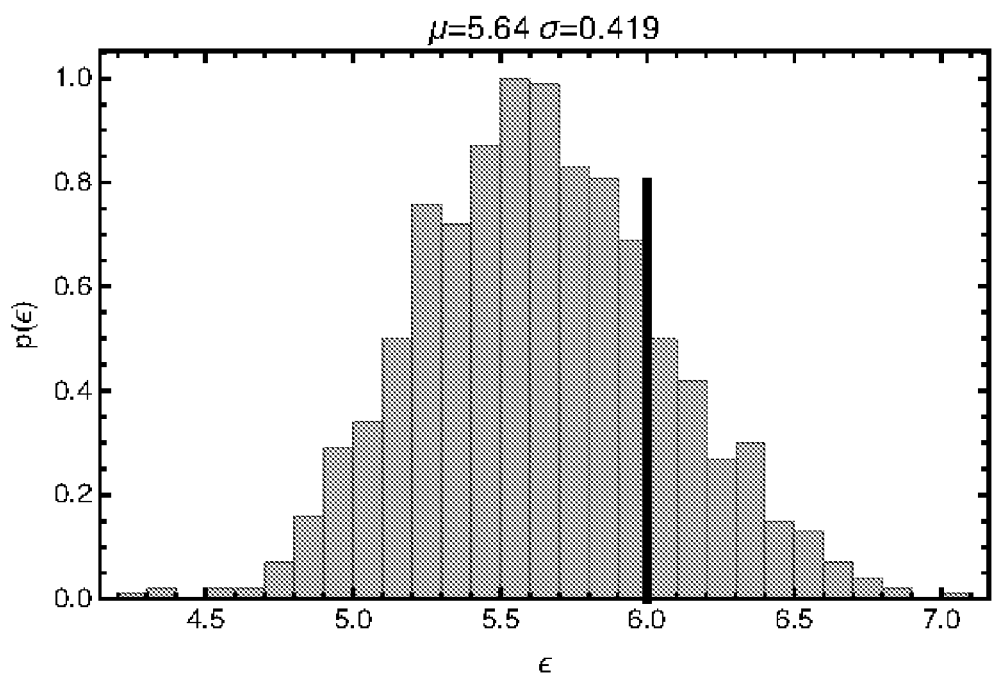
FIG. 16.2
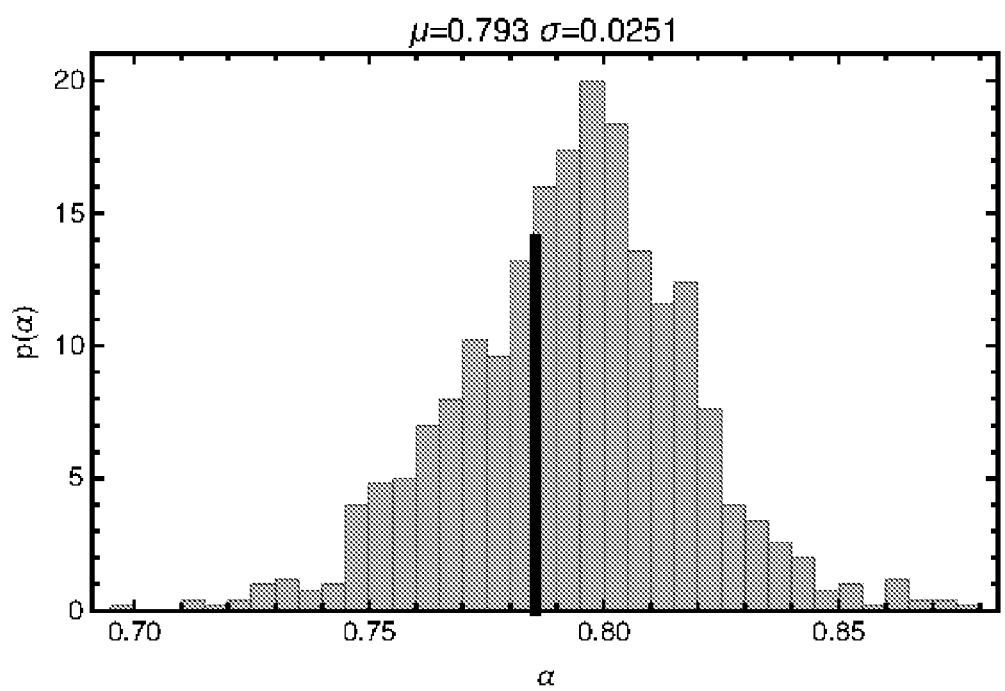

FIG. 16.3
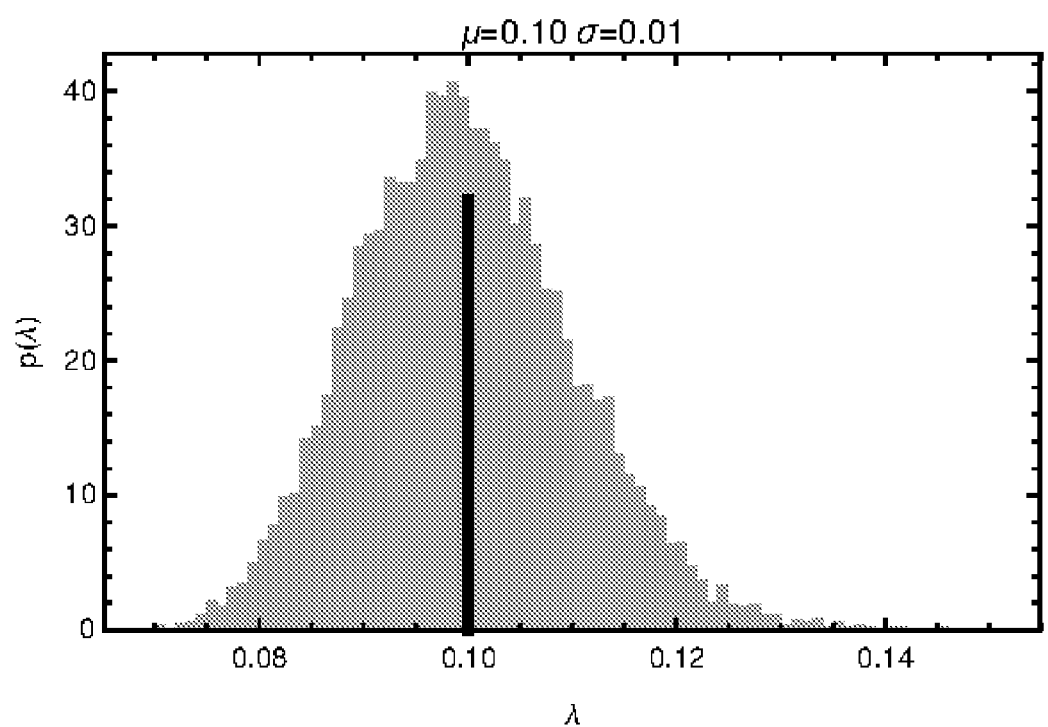

FIG. 17.1
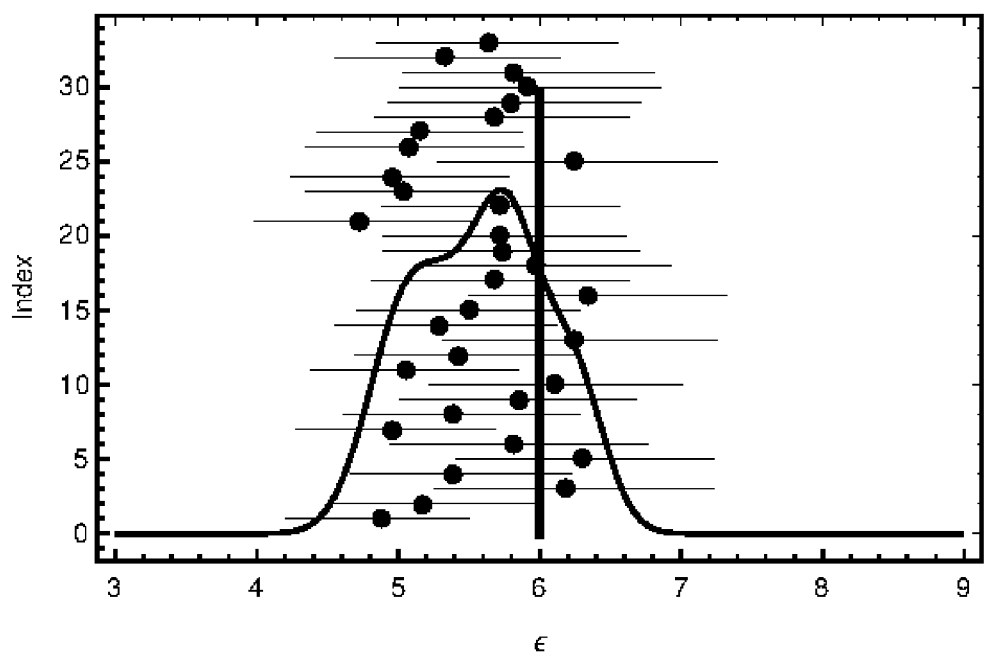
FIG. 17.2
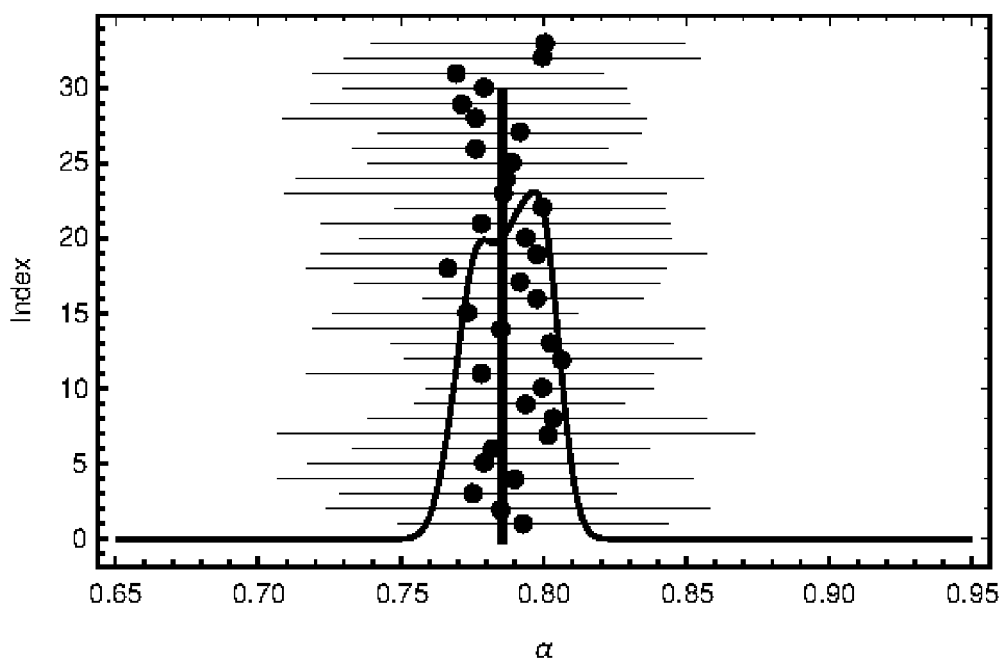

FIG. 17.3
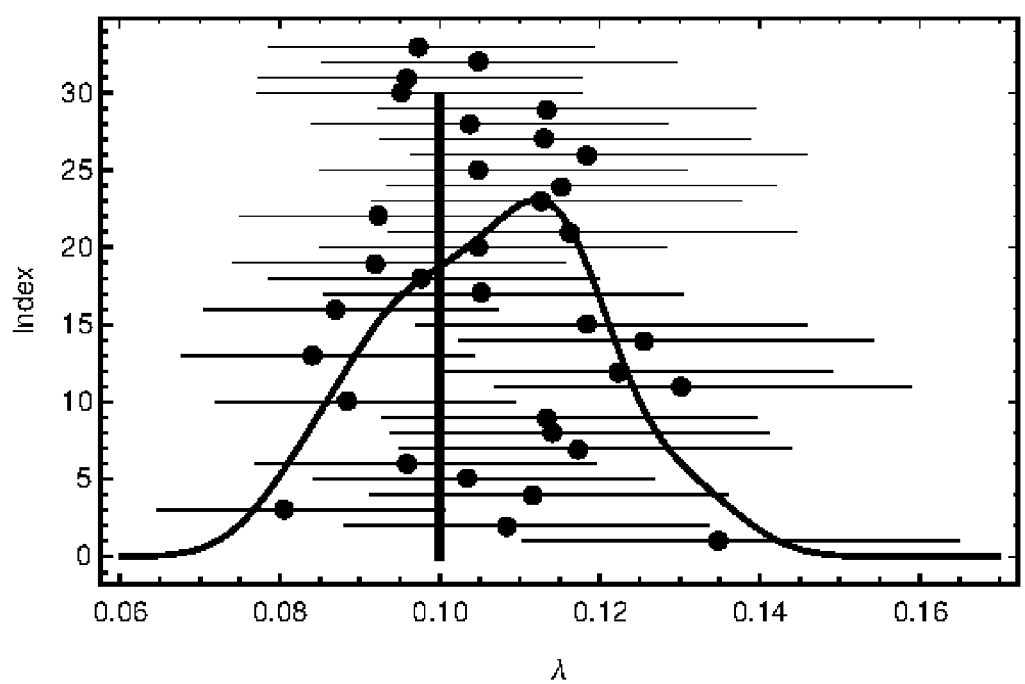

FIG. 19.1
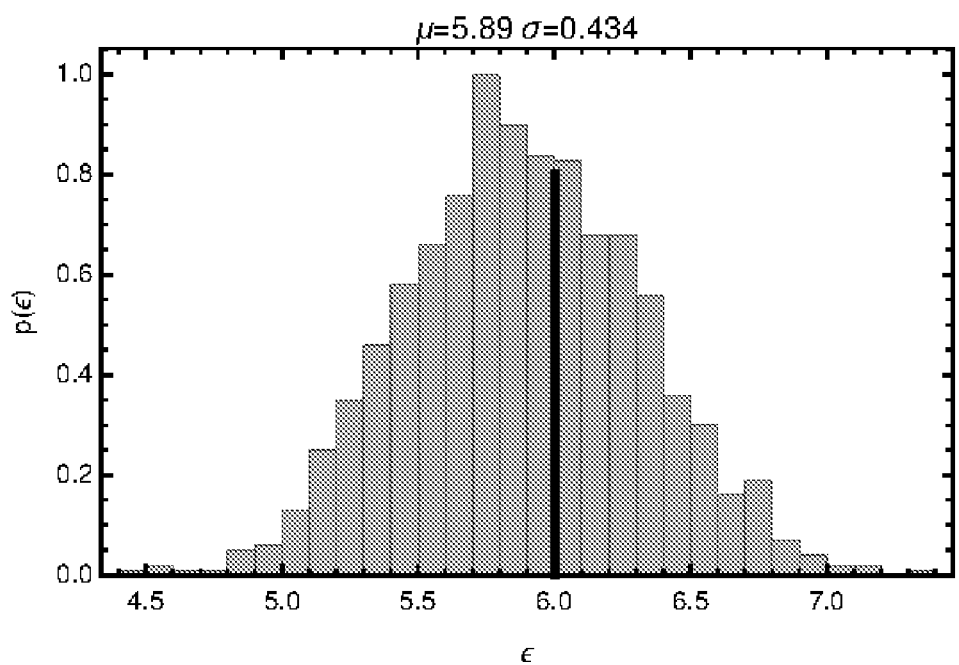
FIG. 19.2
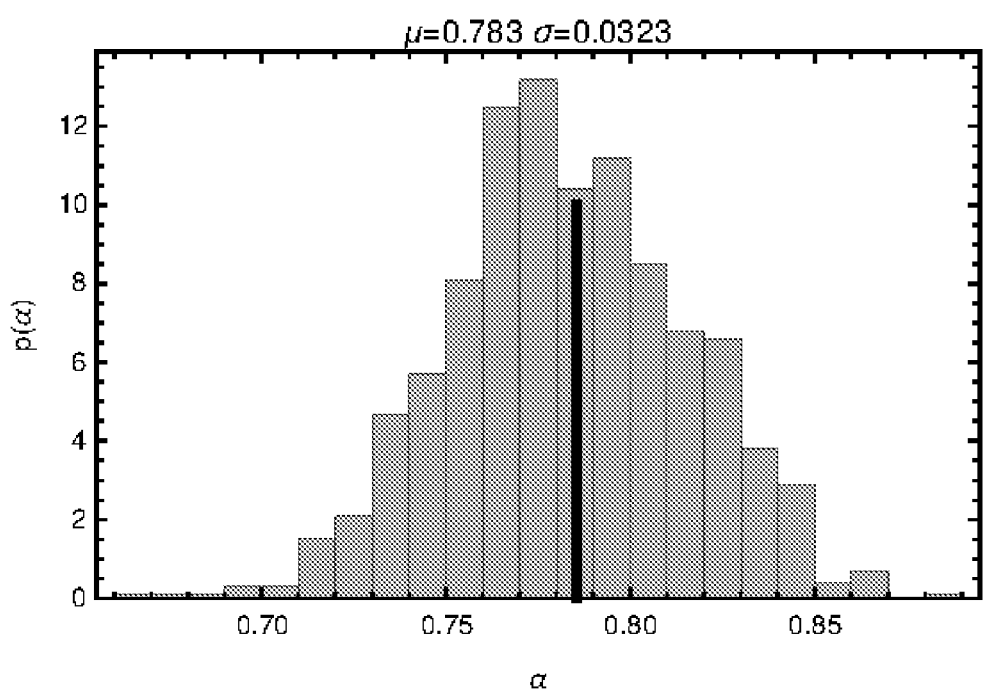

FIG. 19.3
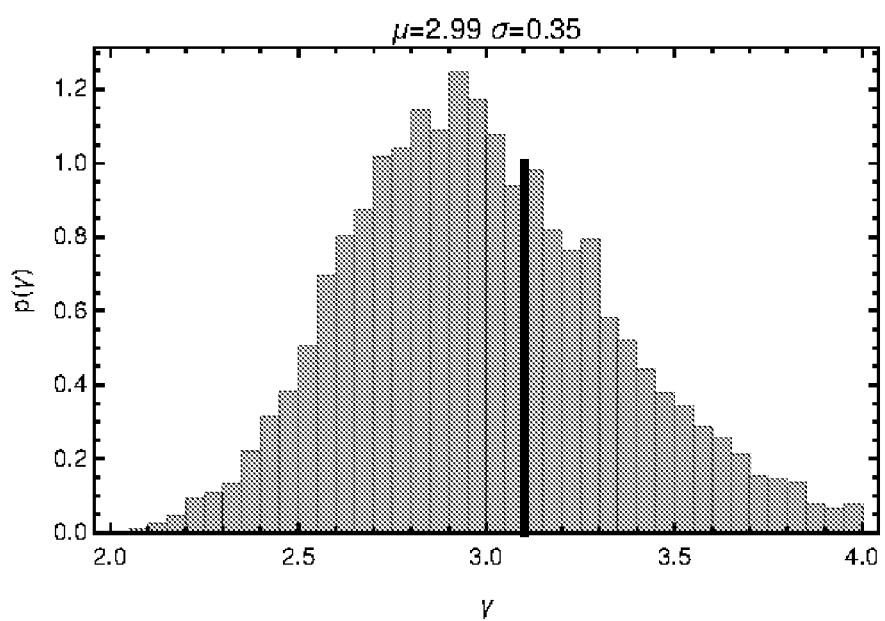
FIG. 19.4
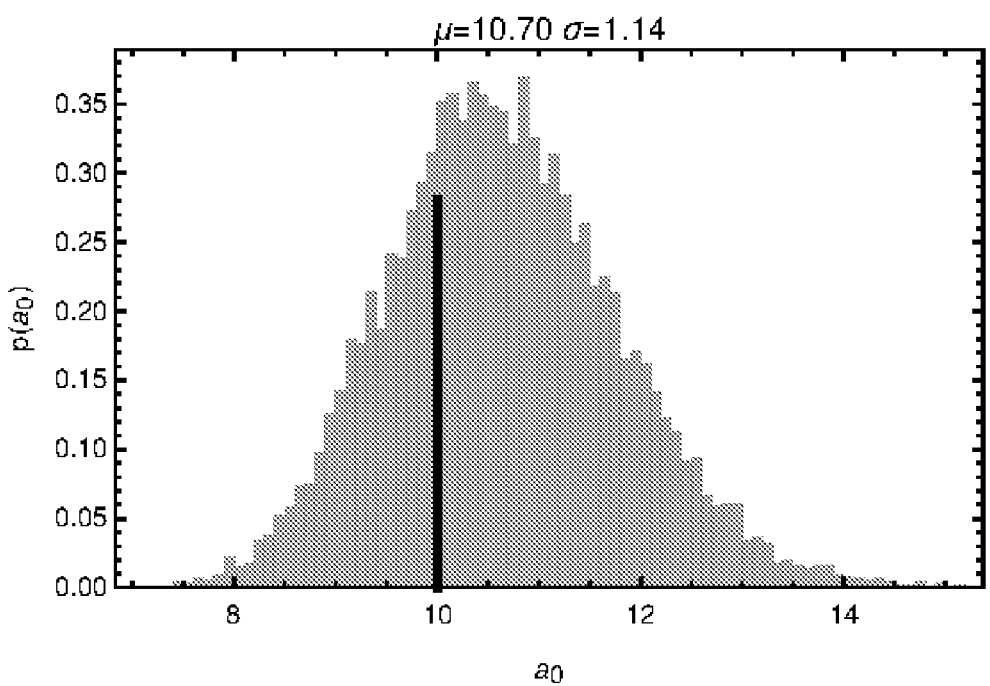

FIG. 20.1
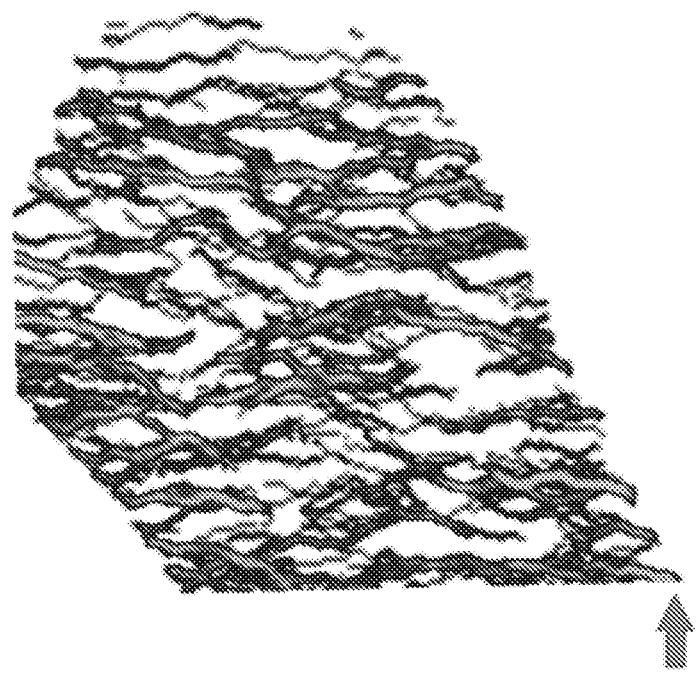
FIG. 20.2
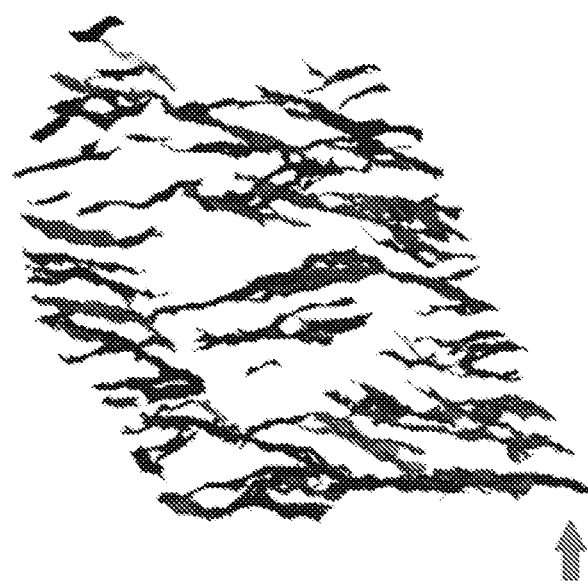

FIG. 20.3
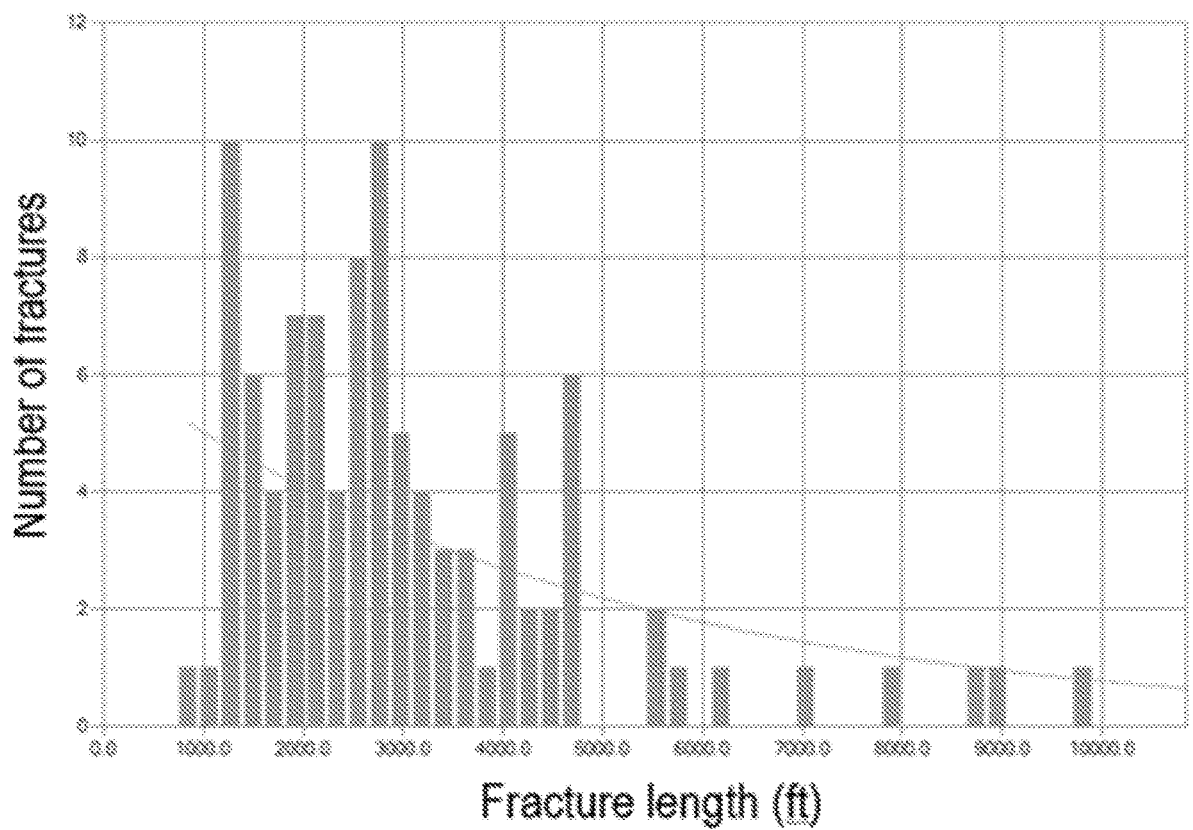

FIG. 23.1
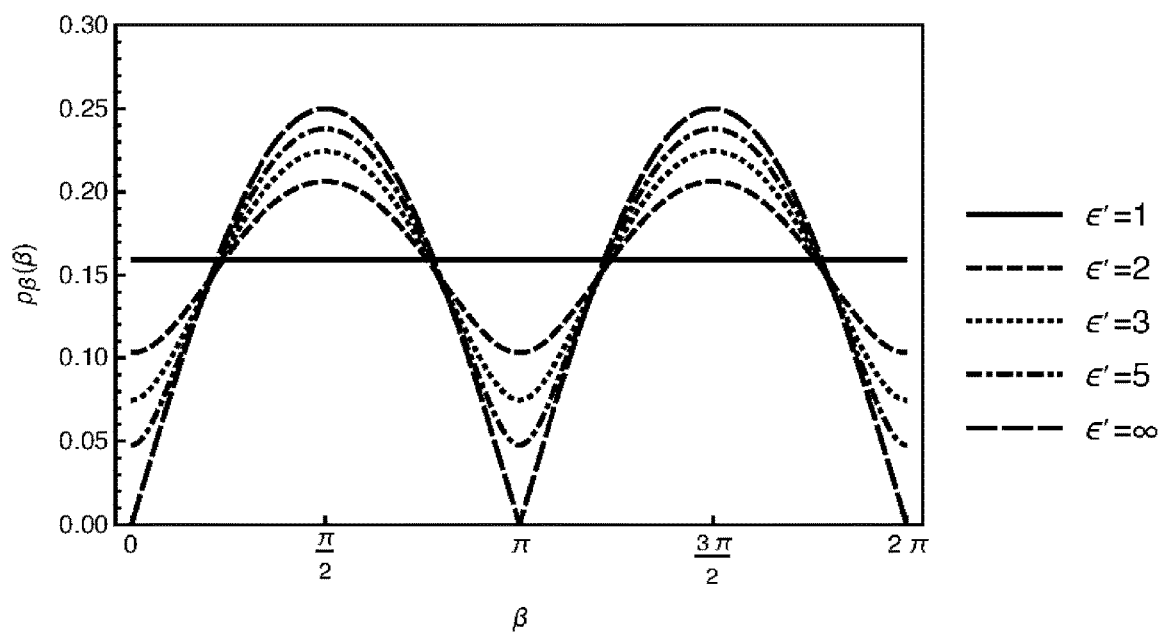
FIG. 23.2
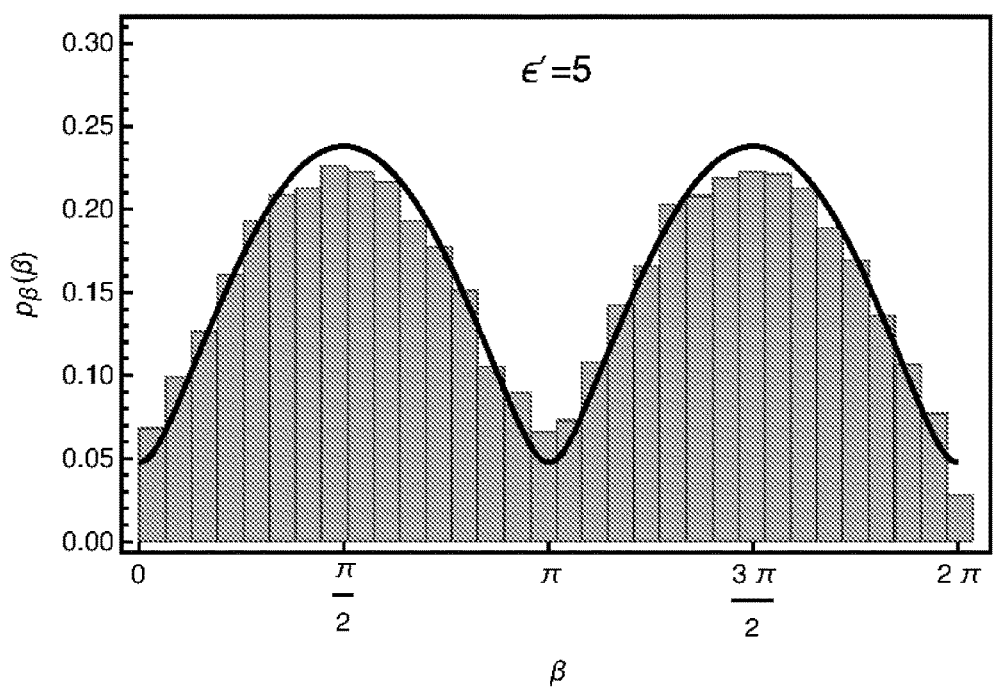

METHOD FOR CHARACTERIZING THE GEOMETRY OF SUBTERRANEAN FORMATION FRACTURES FROM BOREHOLE IMAGES

The present document is based on and claims priority to U.S. Provisional Application Ser. No. 62/510,865 filed May 25, 2017, which is incorporated herein by reference in its entirety.

BACKGROUND

Wellbore operations such as geophysical surveying, drilling, logging, well completion, and production, are performed to locate and gather valuable downhole fluids from subterranean formations. Hydrocarbon exploration continues to develop new tools for generating data from boreholes with the hope of leveraging such data by converting it into meaningful information that may lead to improved production, reduced costs, and/or streamlined operations. Borehole imagery is a major component of the wireline business, and an increasing part of the logging while drilling business. While borehole imagery provides measurements containing abundant data about the subsurface, it remains a challenge to extract the geological and petrophysical knowledge contained therein. Yet, accurately characterizing formation fracture networks within a hydrocarbon reservoir is one of the first steps in assessing its productivity index and quantity of oil therein.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment of the present disclosure a method includes: creating a fracture set from a collection of intersecting fractures in a borehole image log recorded within a subterranean formation; classifying the fracture set into groups of fully and partially intersecting fractures; calculating one or more of the elongation ratio and the rotation angle of the partially intersecting fractures; determining a probability of full intersection of fractures from the fracture set; and determining a fracture size or a parametric distribution of fracture sizes from the fracture set using the calculated one or more of the elongation ratio and the rotation angle and the determined probability of full intersection of formation fractures within the borehole.

In a further embodiment, a method includes: creating a fracture set of a collection of intersecting fractures from a borehole image log recorded within a subterranean formation; classifying the fracture set into groups of fully and partially intersecting fractures; and determining a probability of full intersection of fractures; determining a fracture size or a parametric distribution of fracture sizes from the fracture set using the calculated probability of full intersection of formation fractures within the borehole wherein the probability of full intersection of fractures $P_{full}$ is determined according to a ratio of the areas of projected fracture ellipses $A_i$ and $A_e$, given by:

$$P_{full} = \frac{A_i}{A_e}.$$

Other aspects and advantages of the disclosure will be apparent from the following description and the appended claims.

BRIEF DESCRIPTION OF FIGURES

FIG. 2.1 is a representation of a wellbore traversing a number of formation fractures in accordance with embodiments of the present disclosure;

FIG. 2.2 is a graphical depiction showing measure distance along the borehole of FIG. 2.1 as a function of the relative azimuth in accordance with embodiments of the present disclosure;

FIGS. 4.1 and 4.2 are illustrations of wellbores showing the definitions of surface areas $A_i$ and $A_e$, respectively, of projected fracture ellipses in accordance with embodiments of the present disclosure;

FIG. 5.1 is a comparison of the probability of full intersection, $P_{full}$, as computed using $A_i$ and $A_e$ in accordance with embodiments of the present disclosure;

FIG. 5.2 is an illustration of the relative error in the Ozkaya estimate of $P_{full}$, in accordance with embodiments of the present disclosure;

FIG. 6.1 is a graphical representations showing a comparison of uncertainties of the estimated fracture radius for the case of a circular fracture using a borehole image with 100 fracture traces in accordance with the embodiments of the present disclosure;

FIG. 6.2 is a graphical representations showing a comparison of uncertainties of the estimated fracture radius for the case of a circular fracture using a borehole image with 10,000 fracture traces in accordance with the embodiments of the present disclosure;

FIG. 7.1 is a graphical representation showing the intersection of an elliptical fracture overlaid with 100 borehole projections;

FIG. 7.2 depicts the uncertainty in the estimation of a for 100 elliptical-fracture intersections in accordance with embodiments of the present disclosure;

FIG. 7.3 depicts the uncertainty in the estimation of (a, α) for 100 elliptical-fracture intersections in accordance with embodiments of the present disclosure;

FIG. 7.4 depicts the uncertainty in the estimation of (a, ϵ) for 100 elliptical-fracture intersections in accordance with embodiments of the present disclosure;

FIG. 7.5 is a graphical representation of a surface created from the maximum-likelihood estimate of all three parameters a, ϵ, and α in accordance with embodiments of the present disclosure;

FIG. 8.1 is a histogram of ψ computed from $10^5$ Monte Carlo samples of partially-intersecting fractures and compared with p(ψ) for the case of fractures with a=25, ϵ=4, α=0, and a wellbore with r=1 and θ=0 in accordance with embodiments of the present disclosure;

FIGS. 8.2 is an illustration of 100 samples used in generating FIG. 8.1 plotted in the fracture plane in accordance with embodiments of the present disclosure;

FIG. 8.3 is a histogram of ψ computed from $10^5$ Monte Carlo samples of partially-intersecting fractures and compared with p(ψ) for the case of fractures with a=25, ϵ=4, $\alpha=0$, and a wellbore with $r=1$ and $\theta=7\pi/16$ in accordance with embodiments of the present disclosure;

FIG. 8.4 is an illustration of 100 samples used in generating FIG. 8.2 plotted in the fracture plane in accordance with embodiments of the present disclosure;

FIGS. 9.1-9.6 contour plots showing the relationship between two statistics extracted from $p_\psi(\psi_{max})$ and the parameters $\epsilon$ and $\alpha$ of a fracture ellipse in accordance with embodiments of the present disclosure. FIGS. 9.1 and 9.2 provide these relationships for $\theta=0$, FIGS. 9.3 and 9.4 for $\theta=\pi/4$, and FIGS. 9.5 and 9.6 for $\theta=3\pi/8$;

FIG. 10.1 is a graphical representation showing fifty fracture-borehole intersections as they appear on a fracture plane with partial borehole intersections in gray and full intersections in black in accordance with embodiments of the present disclosure;

FIG. 10.2 shows the same borehole intersections of 10.1 as the output from borehole imaging with partial borehole intersections in gray and full intersections in black in accordance with embodiments of the present disclosure;

FIG. 12.1 is a histogram describing the uncertainty in $\overline{\psi}_{max}$ from the first subset of fracture samples in accordance with embodiments of the present disclosure;

FIG. 12.2 is a histogram describing the uncertainty in $p(\overline{\psi}_{max})$ from the first subset of fracture samples in accordance with embodiments of the present disclosure;

FIG. 13.1 is a histogram showing the estimated marginal distribution for $\epsilon$ in accordance with embodiments of the present disclosure;

FIG. 13.2 is a histogram showing the estimated marginal distribution for $\alpha$ in accordance with embodiments of the present disclosure;

FIG. 13.3 is a histogram showing the estimated marginal distribution for a in accordance with embodiments of the present disclosure;

FIGS. 14.1-14.3 are graphical representations of the uncertainty estimates obtained in accordance with the present disclosure by repeating the experiment described in FIGS. 13.1-13.3 32 times on independently-sampled random fractures. FIGS. 14.1-14.3 plot variables $\epsilon$, $\alpha$, and a, respectively. The dots indicated the median value for each trial and the horizontal bars indicate the 95% confidence interval. The black curve is the kernel density estimate for the 32 median values. The thick vertical lines indicate the true values of these parameters;

FIG. 15.1 is an exponential density function p(a) with $\lambda=1/10$, used to generate fractures for an example of an embodiment of the present disclosure;

FIG. 15.2 is a histogram of a for only those fractures that intersect the borehole, overlain by density function $p_d(a)$ given by Eq. 32 in accordance with embodiments of the present disclosure;

FIGS. 16.1-16.3 are the estimated marginal distributions for $\epsilon$, $\alpha$, and $\lambda$, respectively for an example in accordance with embodiments of the present disclosure;

FIGS. 17.1-17.3 are graphical representations of the uncertainty estimates obtained in accordance with the present disclosure by repeating the experiment described in FIGS. 16.1-16.3 32 times on independently-sampled random fractures. FIGS. 17.1-17.3 plot variables $\epsilon$, $\alpha$, and a, respectively. The dots indicated the median value for each trial and the horizontal bars indicate the 95% confidence interval. The black curve is the kernel density estimate for the 32 median values. The thick vertical lines indicate the true values of these parameters;

FIGS. 19.1-19.4 are the estimated marginal distributions for $\epsilon$, $\alpha$, $\gamma$, and $a_0$, respectively, for an example in accordance with embodiments of the present disclosure. The results for $\gamma$ assume that the true value $a_0=10$ is known, and the results for $a_0$ assume that the true value $\gamma=3.1$ is known. The thick vertical lines indicate the true values of these parameters. The mean ($\mu$) and standard deviation ($\sigma$) of each distribution is provided above each plot;

FIGS. 20.1-20.3 are illustrations showing various steps to obtain fracture geometry information from seismic data in accordance with embodiments of the present disclosure. FIG. 20.1 is an illustration showing the generation of a fracture attribute volume. FIG. 20.2 is an illustration showing the extraction of seismic discontinuities representing fractures from FIG. 20.1. FIG. 20.3 is a graphical representation showing the statistical analysis of the extracted fractures/faults extracted from FIG. 20.1;

FIG. 23.1 is a graphical representation of $p_\beta(\beta)$ as a function of $\epsilon'$ in accordance with embodiments of the present disclosure;

FIG. 23.2 is an analytical result obtained for $\epsilon'=5$ in accordance with methods of the present disclosure are compared with a histogram of $10^4$ samples of partially-intersecting boreholes (with $r=1$) that were uniformly sampled on a projected ellipse with $a'=25$, verifying the analytical result;

DETAILED DESCRIPTION

Figure 1:
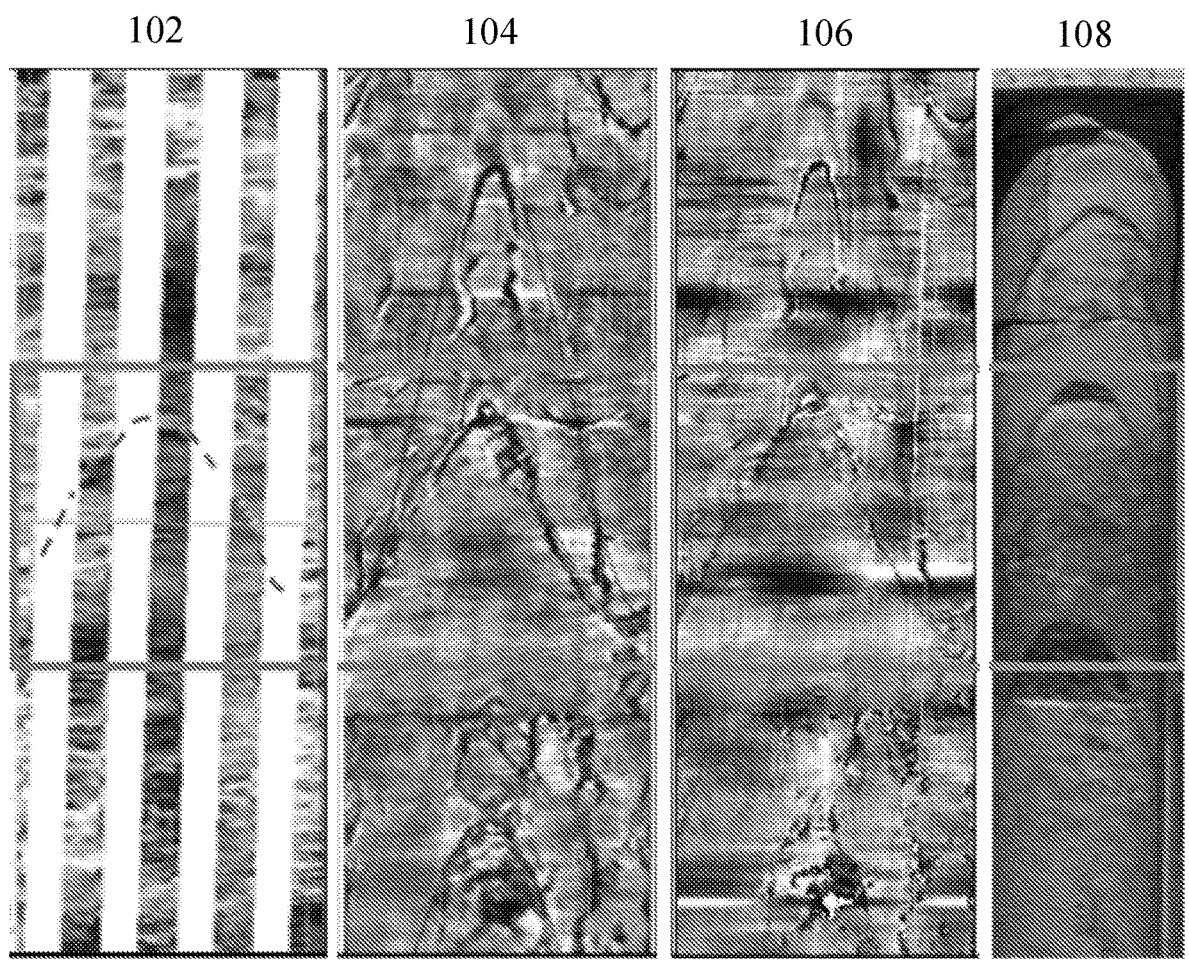
FIG. 1 is an illustration showing reconstructed images of a wellbore obtained from various downhole imaging in accordance with embodiments of the present disclosure.

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Embodiments of the present disclosure are directed to the use of borehole image logs and other measurements to describe fracture networks that intersect the borehole. In one or more embodiments, statistical analysis of fracture intersections obtained from borehole imaging may be used to determine information regarding the shape and orientation of elliptical fractures that are measurable over the entire range of relative dip.

In some embodiments, the analysis of elliptical fractures may include determining the measured distribution of relative azimuths for fracture-trace midpoints, which may be used to estimate both the elongation ratio of fracture ellipses and the rotation angle of the ellipse major axis in the fracture plane. Methods in accordance with the present disclosure may also quantify the uncertainty of estimates for variables associated with fracture network analysis, including fracture size a, elongation ratio $\epsilon$, rotation angle $\alpha$, and the like, based upon the number of factures measured in a given borehole, and may provide practical methodologies for computing these estimates. In addition, methods in accordance with the present disclosure may include using borehole image statistics of probability of full intersection to estimate parametric distributions of a single parameter.

Methods in accordance with the present disclosure may be used in fracture network analysis that accompanies the design and performance of a number of oilfield operations within formations and wellbores, including general formation survey, well placement, completions, enhance oil recovery, production, and the like. In one or more embodiments, methods may include the additional steps of generating an oilfield design in accordance with parameters determined using methods in accordance with the present disclosure including fracture size, distribution of fracture sizes, probability of full intersection of fractures, elongation ratio, rotation angle, uncertainties thereof, and the like. Methods may also include storing the oilfield design and/or performing an oilfield operation according to the oilfield design in some embodiments.

As used herein, "fracture" is used to describe naturally occurring macroscopic planar discontinuity in rock due to deformation. "Fracture" is a general term used to describe any discontinuity within a rock mass that develop as a response to stress.

As used herein, "fault" is used to describe a plane along which there has been movement within the formation parallel to the plane; a mode II failure, i.e., a fracture displaying a plane shear displacement.

As used herein, "joint" refers to an opening mode fracture in a rock formation.

As used herein, "vein" refers to a tubular mass of mineral matter, deposited in a fissure or crack in a rock, and differing in composition from the substance in which it is embedded.

As used herein, "fracture length" is the distance between the tips of the fracture. For elliptical fractures, fracture length refers to twice the semi-major axis length.

As used herein, "trace" refers to the intersection curve between a fracture surface and a rock exposure, such as a cylindrical borehole of known diameter.

As used herein, "semi-trace" refers to a portion of each trace, such as from the point where it intersects the scan line to the end of the discontinuity trace, if it is visible.

As used herein, "stereology" refers to the derivation of 3-D descriptions from 1-D and 2-D measurements. In this disclosure, stereology corresponds to the extrapolation from borehole fracture trace measurements to the hidden 3-D structures of the fractures.

As used herein, "area sampling" refers to the process of using all the traces in the available area. As used herein, "line sampling" refers to the process of drawing a suitable straight line on the exposure and to let the sample include those traces that intersect the line. As used herein, "window sampling" refers to the sampling of all traces within a defined area, "circle sampling" refers to the sampling of all traces that intersect a circle, and "scan-line sampling" refers to the sampling of all traces that intersect a straight line. These sampling techniques and their associated biases will be discussed in the following section.

As used herein, "bias" refers to selected conditions that affect the accuracy of statistical measurements. Bias in the present disclosure may be characterized as: "orientation bias" in which the probability of a discontinuity appearing in an outcrop depends on the relative orientation between the outcrop and the discontinuity; "size bias" in which large discontinuities are more likely to be sampled than small discontinuities; "truncation bias" in which very small trace lengths are difficult or sometimes impossible to measure where trace lengths below some known cutoff length are not recorded; or "censoring bias" in which long discontinuity traces may extend beyond the visible exposure so that one end or both ends of the discontinuity traces cannot be seen.

Prior approaches have provided some degree of characterization of fracture lengths in formation intervals by examining the statistics of fracture intersections, showing that the measured probability for fully intersecting fractures is related to the radius of circular fractures. For example, one such approach is described by Ozkaya in the publication "Fracture length estimation from borehole image logs," *Mathematical Geology*, 35 (6): 737-753, 2003. Methods in accordance with the present disclosure expand beyond these approaches by using information obtained from borehole imaging techniques to generate statistics about the shape and orientation of elliptical fractures in a formation under study. Methods of the present disclosure analyze intersecting fractures by approximating the fractures as elliptical fractures that are exact over the entire range of relative dip. Elliptical fracture estimates also provide a new statistic, the measured distribution of relative azimuths for fracture-trace midpoints, which may be used in some embodiments to estimate the elongation ratio of fracture ellipses and the rotation angle of the ellipse major axis in the fracture plane.

In one or more embodiments, methodologies for computing elliptical fracture estimates may quantify the uncertainty of the estimates through analysis of a number of fractures intersecting a given borehole, which increases the accuracy of estimates for fracture size, elongation ratio, and rotation angle. In some embodiments, natural fracture size distributions present in a borehole, as determined from borehole imaging statistics for example, may be used to estimate a parametric distribution of a single parameter. It is also envisioned that any suitable parametric distribution may be used including exponential, Pareto, lognormal, Gaussian, gamma, and power law distributions of fracture size in some embodiments.

In one aspect, methods in accordance with the present disclosure relate to obtaining fracture geometry, which may include size, elongation ratio, rotation angle, and the like, in addition to their respective uncertainty from characterizing cylindrical rock face data obtained from any number of techniques that measure borehole walls downhole or from core samples. Methods in accordance with the present disclosure may be used to analyze multiple types of fracture length distributions, provide direct inputs to build 3D fracture network models, and evaluate uncertainty in these techniques. Fracture length distributions in accordance with the present disclosure may also be used during well placement and to design completions and reservoir stimulation operations.

Methods in accordance with the present disclosure are directed to the 3D characterization of fracture networks from 2D measurements. In one or more embodiments, three-dimensional fracture geometry is inferred from the measurement of fracture traces, a process also known as stereology. Previous studies have applied stereology to fracture traces as they appear on a planar rock faces, including rock faces constructed from downhole imaging techniques. Stereological relationships between fracture traces and the 3D geometry of the fractures have been established based on the concept that the statistical distribution of fracture size is related to the trace length distribution (often represented by lognormal or exponential distributions). Trace length distributions have been obtained from both area and line sampling by assuming the fractures to be parallel circular discs of negligible thickness with a uniform-random spatial distribution. Other approaches include distribution-free methods, where parametric trace-length distribution where not constructed, whose main input is whether the trace length is censored.

Still other approaches have classified traces in three categories according to the number of endpoints in the mapping window, and implemented a Monte-Carlo approach, assuming circular fractures with a lognormal length distribution. The process was repeated with varying distribution parameters until a good match with the actual trace lengths is observed. By studying the intersections between an observation plane and a fracture network, others have shown that the fracture-length distribution can be inferred from the trace-length distribution for the distributions such as power law, lognormal, and exponential. Fracture lengths have also been characterized using a Wicksell distribution that studies the distributions of censored semi-trace lengths from scan lines. Stereological relations derived for circular fractures have applied for convex fracture shapes.

Some studies have shown that scan lines can provide a biased sample of trace lengths. For example, measured trace-length distributions may be biased by at least two factors: censoring, where both ends of a trace are not observable, and truncation, where traces shorter than some cutoff length are not recorded. Orientation bias and discontinuity size bias also have to be considered, and a number of methods have been proposed to correct for censoring bias, geometric bias, sampling bias, in addition to other techniques that reduce the biases resulting from limited outcrop observability, and considers three parametric procedures (maximum likelihood, stochastic estimation-maximization and Bayesian estimation) to estimate the length distribution of a set of traces.

Stereology for Borehole Images of Fractures

In one or more embodiments, the analysis of the traces observed where natural fractures intersect large exposures, such as open cuts, tunnels and drives, may be useful geological evidence. Nevertheless, in many oil and gas fields, borehole data is the prevalent data source for characterizing fractures.

Previous studies have developed theories for sampling planar circular fractures with a circular borehole (both volumetric and borehole image data cases are considered), and have proposed various correction factors when sampling with borehole image data. Methods presented include some applicable to circular fractures oriented perpendicular to the borehole axis, based on the ratio of the number of fractures that transect the borehole to the number of fractures that cut only part of it to evaluate fracture size.

Other approaches have looked at the ratio between fully and partially intersecting fractures, and attempted to derive a relationship between the relative frequency of complete fracture traces in terms of angle between the fractures and the borehole, borehole diameter, and the fracture length. In addition, previous approaches have extended beyond focusing on circular fracture sets of constant length, to variable fracture length using a linearly related secondary variable. For example, methodologies that considered variable fracture length have been used to describe the statistical characteristics of intersections between cylinders and networks of circular fractures.

In the stereological literature, fractures are usually assumed to be circular discs. However, to build a geologically realistic discrete fracture network, it may be helpful to define more general fracture geometries. For example, in most commercial software, fracture shape is defined by a polygonal approximation to an ellipse, where the ellipse is defined by a size and elongation ratio, and the level of approximation defined by the number of polygon faces. The choice of four polygon faces yields a rectangular fracture. Stereological relationships have been based on both rectangular fractures and elliptical fractures, and used to derive expressions for lognormal, negative exponential and gamma distributions of fractures. Others have also developed analytical expressions for elliptical fractures, and presented results for uniform, fractal, exponential and polynomial distributions.

The number of authors who worked on the stereological relationships between fracture traces observed on borehole walls for elliptical or rectangular fractures is more limited, and their work is more recent. Previous attempts focused on estimating the length and width of rectangular-shaped fractures from traces observed on borehole walls. Others have proposed the estimation of the fracture size distribution from multiple borehole samplings with elliptical fractures, including the derivation of formulas for estimating the mean and standard deviation of fracture size from a single borehole.

Methods in accordance with the present disclosure may be used to estimate fracture geometry from borehole images. In one or more embodiments, borehole image data may be used to estimate a fracture length distribution using elliptical fracture estimates, which may then be used to derive formulae that account for a number of fracture geometries including fracture length, elongation ratio, and rotation. In addition, formulae for estimating the length of elliptical fractures are provided, along with a methodology for estimating the ellipse elongation ratio and the rotation angle of the major axis, and their respective uncertainties. Methods in accordance with the present disclosure are applied to fractures whose lengths follow a statistical distribution of known form, and used to estimate the distribution parameters and their uncertainties. These results are considered alongside a comparative demonstration using formulae based on circular fracture estimates from borehole images for steeply-dipping fractures.

Characterization of Naturally Fractured Reservoirs

Naturally fractured reservoirs (NFRs) represent a large percentage of global oil and gas reserves, but are difficult to characterize because of the three-dimensional geometric complexity of their constituent fracture systems. The geometrical characterization of natural fractures is often focused on the estimation of their three-dimensional (3D) geometrical properties from 2D or 1D measurements of fracture-intersection traces along exposed rock faces. The inference of 3D geometry from lower-dimensional measurements is called stereology. Exposed rock faces have limited availability in reservoir applications, and many times stereology may be interpreted on manmade 2D exposure created by the drilling of a borehole. Borehole surfaces create a cylindrical exposure that may be measured by a number of commercially available borehole-imaging instruments that may be lowered into the borehole on a long cable and records an image of the borehole wall as a function of relative azimuth and distance along the borehole axis.

With particular respect to FIG. 1, borehole images derived from a number of representative techniques are illustrated. From left to right, borehole images are shown constructed from resistivity 102, acoustic amplitude 104, acoustic transit time 106, and core photograph 108. The vertical axis is borehole measured depth (horizontal lines indicate one meter) and the horizontal axis is relative azimuth.

In previous stereological approaches, fractures are often assumed to be circular discs of infinitesimal thickness. However, to build geologically realistic fracture models, it is useful to consider more general fracture geometries. Methods in accordance with the present disclosure utilize new methodologies for inferring the shape and orientation of elliptical fractures from borehole images.

Within a formation, fractures may be approximated as planar structures, which may intersect a constructed well. With particular respect to FIG. 2.1, an example formation is shown having ten randomly-located elliptical fractures are displayed intersecting borehole 200. Fully intersecting fractures 204 are displayed in black and partially intersecting fractures 202 are displayed in gray. Only fractures that intersect the borehole wall are shown, because non-intersecting fractures are undetected by a borehole image.

With particular respect to FIG. 2.2, a synthetic example of a borehole image for the set of fractures shown in FIG. 2.1 is shown. In the borehole image, the fracture-intersection traces are placed as they appear on the borehole wall, with the same coloration of black for fully intersecting fractures and gray for partially intersecting fractures. Zero relative azimuth corresponds to the upper side of the borehole, and the vertical axis is the measured distance along the borehole axis relative to some point on the axis.

The ten elliptical fractures in FIGS. 2.1 and 2.2 have a common size and orientation, and their centers are randomly located in 3D space following a uniform distribution. A uniform distribution for fracture location is assumed with the rationale that this is the least informative distribution for use in the case where the true distribution is unknown. The distinction between fully- and partially-intersecting fractures will be used throughout this study to deduce both the shape and orientation of the fracture ellipses.

FIGS. 2.1 and 2.2 also illustrate some of the assumptions used in the present analysis. The intersection of a cylinder by a plane describes a sine curve on the borehole image. By fitting a sine curve to each intersection trace in the image, the amplitude and phase of this curve provides an estimate of the orientation of the fracture plane. The orientation of a plane is denoted by strike and dip in the geological literature, and by its normal vector, n, in the mathematical literature. The estimation of n from a borehole image has been the mainstay of borehole-image analysis, for which many high-quality interpretation software packages are available. It is assumed that analysis has accurately yielded n for each fracture, and that sets of fractures with similar n will be pre-selected for analysis, and that each fracture set has a single orientation vector, n.

Further, it is assumed that all fractures in the set are ellipses with a constant, but unknown, elongation ratio $\epsilon$ and rotation angle $\alpha$. The elongation ratio is the ratio between the semi-major and semi-minor axes of an ellipse, while the rotation angle describes the orientation of the ellipse in the plane of the fracture. These two assumptions allow both of these parameters to be estimated from a borehole image.

Given the above assumptions, methods in accordance with the present disclosure may be used to estimate not only n, but also fracture size, elongation ratio, and rotation. In some embodiments, where fracture size is non-constant, but describable as random samples from a simple parametric distribution (describable by a single parameter), this size distribution may be estimated along with the elongation ratio and rotation angle.

Borehole Image Model

In the following section, the fracture model, borehole model, and method for computing synthetic intersection traces is presented. To simplify the geometrical description of a borehole intersecting an elliptical fracture, a Cartesian coordinate system is defined in which the fracture lies in the x-y plane, centered on the origin, and the borehole trajectory, t, is oriented in the x-z plane, passing through the fracture plane at the point t. In the following, bold sans-serif roman symbols indicate tensors, with lowercase for vectors and uppercase for matrices. The borehole is assumed to be a circular cylinder long enough to pass through all of the fractures in the set. The normal to the fracture plane is denoted by n. The intersection angle between the borehole and the normal to the fracture plane is denoted by $\theta$, where $\cos(\theta)=\hat{n}\cdot\hat{t}$. The hat notation on a vector indicates that the vector has been normalized to unit length. It is always possible to convert the original coordinates of a model into these coordinates by means of translation and rotation. In the case of a borehole that is perpendicular to a fracture ($|\hat{t}\cdot\hat{n}|=1$), the rotation around n is undefined, but this can be resolved by applying a preferred rotation, e.g., the x axis points North. The semi-major and semi-minor axis lengths of the fracture ellipse are denoted a and b, respectively. The ellipse elongation ratio, $\epsilon$, is defined by $\epsilon=a/b$. The ellipse rotation angle, $\alpha$, is the counter clockwise angle of the semi-major axis with respect to the x axis.

Figure 3:
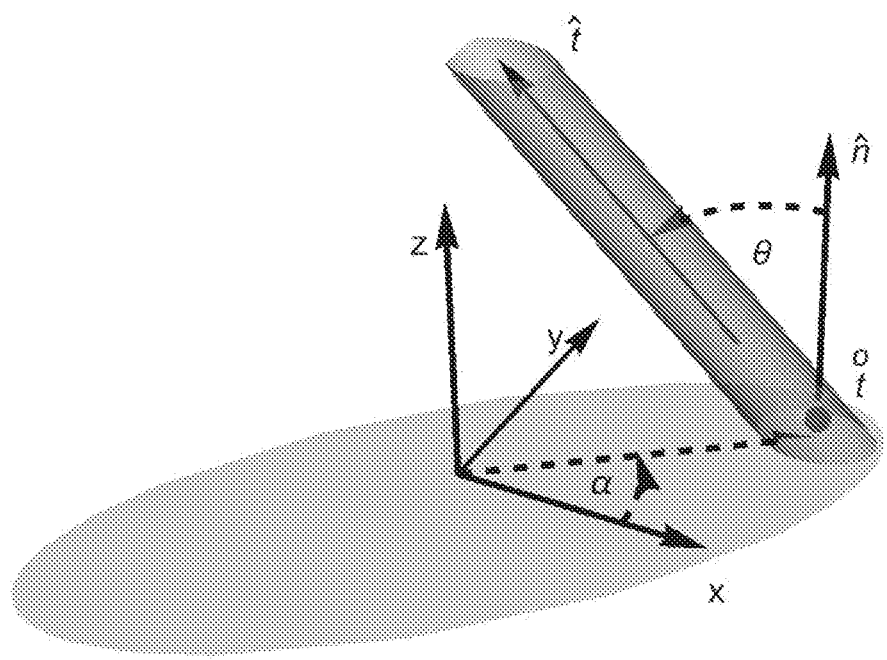
FIG. 3 is a representation of a wellbore traversing a formation fracture, which highlights the coordinate system and relevant variables used in embodiments in accordance with the present disclosure.

An illustration of this rotated fracture coordinate system is provided in FIG. 3, in which the fracture lies in the x-y plane, centered on the origin, and the borehole trajectory vector, t, is oriented in the x-z plane, passing through the fracture plane at point t. The semi-major axis of the fracture ellipse is rotated by angle $\alpha$ from the x axis in the counterclockwise direction. The angle between the fracture normal, n, and the borehole trajectory, t, is denoted by $\theta$. The semi-major and semi-minor axis lengths of the ellipse, not plotted, are denoted a and b, respectively.

The intersection between the fracture ellipse and the borehole may be evaluated as a 2D intersection problem in the x-y plane. In this plane, the fracture ellipse is described in vector notation by Eq. 1, where $R(\alpha)$ is the rotation matrix that rotates counterclockwise by angle $\alpha$, and $\xi\in[0, 2\pi)$ is the parameter used in constructing the ellipse.

$$f(\xi) = R(\alpha)\begin{bmatrix} a\cos(\xi) \\ b\sin(\xi) \end{bmatrix} \quad (1)$$

The borehole projects onto the fracture plane as an ellipse of the form given by Eq. 2, where r is the borehole radius and $\psi\in[0, 2\pi)$ is the relative azimuth within the borehole, measured counterclockwise with respect to the upper side of the borehole. Note that $\psi$ is the horizontal coordinate of the borehole image.

$$b(\psi) = \overset{\circ}{t} + \begin{bmatrix} r\cos(\psi)\sec(\theta) \\ r\sin(\psi) \end{bmatrix} \quad (2)$$

The points of intersection between the borehole cylinder and the fracture ellipse are the solutions to $f(\xi)=b(\psi)$ for the parameters $\xi$ and $\psi$. This system of transcendental equations can be reduced to a quartic-polynomial root-finding problem through the substitutions given by Eqs. 3 and 4, which enforce the constraints $\cos^2(\psi)+\sin^2(\psi)=1$ and $\cos^2(\xi)+\sin^2(\xi)=1$ $$\cos(\psi) = \frac{1-p^2}{1+p^2}, \sin(\psi) = \frac{2p}{1+p^2} \quad (3)$$

$$\cos(\xi) = \frac{1-q^2}{1+q^2}, \sin(\xi) = \frac{2q}{1+q^2}, \quad (4)$$

Fast numerical solvers are available for finding the real roots for p and q. Only the real roots correspond to intersections. The number of real roots can vary from zero to four. The parameters p and q can then be converted back into their corresponding angles by the formulae Eq. 5 and Eq. 6, where $\tan^{-1}(,)$ uses its two arguments for angular disambiguation.

$$\psi = \tan^{-1}\left(\frac{1-p^2}{1+p^2}, \frac{2p}{1+p^2}\right) \quad (5)$$

$$\xi = \tan^{-1}\left(\frac{1-q^2}{1+q^2}, \frac{2q}{1+q^2}\right) \quad (6)$$

The emphasis here is on generating a synthetic borehole image, thus only the roots for $\psi$ are needed. The $\psi$ roots are sorted, and the midpoints of consecutive pairs (with periodic boundary conditions) are tested for whether they are inside the ellipse. If so, then such a pair constitutes the azimuthal midpoints of a fracture-intersection trace on the borehole wall. If there are no intersections, then the borehole is either entirely within or outside the ellipse. This can be resolved by testing whether $b(\psi)$ is inside the ellipse for any value of $\psi$, e.g., $\psi=0$. If the borehole is inside, then the pair of $\psi$ midpoints are set to zero and $2\pi$.

The above intersection procedure was repeated for many randomly-located fracture ellipses in order to create the synthetic fracture-intersection datasets used in the following examples. Note that methods in accordance with the present disclosure may be performed without plotting the intersection traces in the form of a borehole image. However, if a plot is desired for visualization purposes, e.g., for the creation of FIG. 2.2, $\xi_0$ may be the intersection between the fracture plane and the borehole axis, expressed in as a measured distance, $\xi$, along the borehole from some point on the borehole axis. Then a fracture trace in the $(\psi,\xi)$ coordinates of the borehole image is described by Eq. 7, where $\psi \in [\psi_{min}, \psi_{max}]$, with $\psi_{min}$ and $\psi_{max}$ being a pair of roots that bound an intersection trace, and each valid root pair being plotted.

$$\xi(\psi)=\xi_0+r\sec(\theta)\cos(\psi) \quad (7)$$

Stereology from the Probability of Full Intersection

The next section discusses the analysis of the information contained in a single statistic of the fracture traces in a borehole image, namely, the probability of measuring a fully intersecting fracture. While previous approaches have used probabilities of measuring fully intersecting fractures to estimate the size of circular fractures, formulae used in those estimates are approximate, resulting in underestimates of fracture size when the borehole intersects fractures at non-normal angles. Methods in accordance with the present disclosure compensate for this by using an exact formula that estimates fracture size for elliptical fractures, combined with a probabilistic inversion for fracture size that assigns confidence bounds on the fracture-size estimate, based on the uncertainty in estimating the probability of full intersection from a borehole image. However, further knowledge is required when measuring elliptical fractures, where the elongation ratio and rotation angle are needed in order to generate a useful estimate of fracture size.

Stereological relationships have been developed to estimate the length of circular fractures based on the statistics of partially and fully intersecting fracture traces observed on borehole images. While previous approaches were only valid for circular fractures and approximate except for $\theta=0$, methods in accordance with the present disclosure extend the application to elliptical fractures with an exact formulation for the full $\theta$ range.

Consider a borehole with radius r intersected by many elliptical fractures with radius, elongation ratio, rotation and normal given by a, $\epsilon$, $\alpha$, and n, respectively. The fractures are assumed to be randomly located, with a uniform random distribution in 3D. A number, $N_f$, of these fractures will fully intersect the borehole, while some, $N_p$, will only partially intersect it. In this section, a single statistic of these fractures is set forth, the probability that a fracture will fully intersect the borehole. An estimate of this probability is measurable from the borehole image as Eq. 8.

$$\overline{P}_{full} = \frac{N_f}{N_f + N_p}. \quad (8)$$

As used herein, capital P always denotes a probability, and lowercase p denotes a probability density function. Moreover, the fracture traces used in this estimate describe a binomial distribution, because they can only belong to one of two classes, full or partial intersections, with a fixed but unknown probability. The estimated mean of this distribution is given by the measured value of $\overline{P}_{full}$, and its variance is given by Eq. 9.

$$\overline{\sigma}_{full}^2 = \overline{P}_{full}(1-\overline{P}_{full})/N_f+N_p. \quad (9)$$

The geometrical problem of computing whether a fracture is fully or partially intersected can be reduced from 3D to 2D by projecting the fracture onto a plane perpendicular to the borehole trajectory. In this plane, an elliptical fracture is projected onto an ellipse whose semi-major and semi-minor axis lengths equal a' and b'. To obtain a' and b' from a and b, return to the above described fracture-centric coordinate system in which the fracture lies on the x-y plane centered on the origin. Let a and b denote vectors pointing in the directions of the semi-major and semi-minor ellipse axes, whose lengths equal a and b, respectively. These vectors are projected onto the borehole-normal plane as shown in Eq. 10.

$$a_p=a-(a\cdot\hat{t})\hat{t} \text{ and } b_p=b-(b\cdot\hat{t})\hat{t}. \quad (10)$$

These two vectors need not be orthogonal, and thus may not represent the major and minor axes of the projected ellipse. However, they do define two points on the projected ellipse, and may be used to define the projected ellipse by the formula Eq. 11, where $g(\beta)$, $\beta \in [0, 2\pi)$, is the locus of points defining the projected ellipse.

$$g(\beta) = a_p \cos(\beta) + b_p \sin(\beta), \quad (11)$$

Eq. 11 is in the form an ellipse even though a' and b', are not orthogonal.

The semi-major and semi-minor axis lengths of this projected ellipse, a' and b', may then be evaluated by finding the angle $\beta_0$ that minimizes $\|g(\beta)\|$, yielding Eq. 12.

$$b' = \|g(\beta_0)\| \text{ and } a' = \|g(\beta_0 + \pi/2)\|. \quad (12)$$

The minimization problem for $\beta_0$ may be solved by means of a root finder. Alternatively, a related problem, finding the $\beta_0$ that extremizes $\|g(\beta)\|$, may be evaluated in closed form, yielding Eq. 13.

$$\beta_0 = \begin{cases} \frac{1}{2}\tan^{-1}\left(\frac{2 a_p \cdot b_p}{\|a_p\|^2 - \|b_p\|^2}\right), & \|a_p\| \neq \|b_p\| \\ 0, & \text{Otherwise} \end{cases} \quad (13)$$

The projected axis lengths are then given by Eq. 14.

$$\{b', a'\} = \text{sort}\left(\left\{\|g(\beta_0)\|, \left\|g\left(\beta_0 + \frac{\pi}{2}\right)\right\|\right\}\right) \quad (14)$$

The values for a' and b' describe the major- and minor-axis lengths of the projection of the fracture ellipse onto the borehole-normal plane and may be used to compute the probability of a full intersection.

Previous approaches, such as that described by Ozkaya, express the probability of a full intersection as a ratio of areas expressed in the borehole-normal plane. When the borehole circle in this plane is fully contained within the projected-fracture ellipse, the fracture fully intersects the borehole. Any borehole-circle location whose center lies within a region described by a circle of radius $\gamma$ as it rolls around the interior surface of the projected fracture ellipse will be a fully intersecting fracture. The area contained within this region is denoted $A_i$. A probability of full intersection is formed by computing the ratio of this area with the area of the region corresponding to both full and partial intersections. This region is described by a circle of radius r as it rolls around the exterior surface of the projected fracture ellipse, is denoted by $A_e$.

FIGS. 4.1 and 4.2 provide an illustration of the definitions of $A_i$ and $A_e$. With particular respect to FIG. 4.1, circle 400 represents the borehole and the projected fracture ellipse is drawn as a black curve 402. The dashed line 406, indicated in the legend as "true $A_i$" is created by rolling circle 400 around the perimeter of the projected ellipse 402. When circle 400 lies entirely within the projected ellipse 402, the fracture is fully intersecting, which happens when the center of circle 400 lies within the shape created by the true $A_i$ 406. The gray region illustrates $A_i$ which is defined by the area within true $A_i$ 406 and excluding the "fishtails" extending outside of the area defined by 406. As shown, the Ozkaya estimate, indicated by dotted line 404, overestimates $A_i$. The "fishtails" at the ends of the true $A_i$ 406 extend beyond the left and right extremes of $A_i$ and result when the borehole circle 400 does not fit entirely within the projected ellipse 402 at its extremes along the x axis. This overestimation is illustrated in FIG. 5.1, FIG. 6.1 AND FIG. 6.2, which quantify the mismatch between the Ozkaya $A_i$ and the "true" fracture size for selected examples.

With particular respect to FIG. 4.2, another possible scenario is shown in which borehole circle 400 only touches the projected ellipse 402, where the fracture intersection may be full or partial. The gray region, denoting the area created by rolling borehole circle 400 around the exterior perimeter of the projected ellipse, illustrates $A_e$. Again, when comparing the true $A_e$, denoted by dashed line 408, to the Ozkaya estimate indicated by dotted line 404, the area within the Ozkaya estimate underestimates $A_e$. As demonstrated, the Ozkaya estimation introduces error in both $A_i$ and $A_e$, which introduces error in the calculation of probability of fully intersecting fractures $P_{full}$ as discussed in the next section.

The probability that an intersected fracture will be fully intersecting, $P_{full}$, can be computed as a ratio of $A_i$ and $A_e$ as shown in Eq. 14, where $A_i$ and $A_e$ are the areas within the perimeter of a line traced on the interior and exterior, respectively, of a given projected ellipse by a borehole.

$$P_{full} = \frac{A_i}{A_e} \quad (15)$$

According to Ozkaya, the formula for $A_e$ is given by Eq. 16, which has been generalized for use with elliptical fractures.

$$A_e = \pi(a'+r)(b'+r) \quad (16)$$

Eq. 16 represents the area of the projected fracture ellipse whose semi-major and semi-minor axes have been extended by r. However, the assumption that $A_e$ is described by an ellipse is approximate, and underestimates $A_e$, as is illustrated in FIG. 4.2. The correct formula for $A_e$ is given by Eq. 17, where E( ) is the complete elliptic integral of the second kind, defined by Eq. 18.

$$A_e = a'b'\pi + \pi r^2 + 4a'rE\left(1 - \frac{b'^2}{a'^2}\right) \quad (17)$$

$$E(v) = \int_0^{\pi/2} \sqrt{1 - v\sin^2(\eta)}\, d\eta \quad (18)$$

According to Ozkaya, the formula for $A_i$ is given by Eq. 19, which makes the same assumption that the bounding region is an ellipse, but with the semi-major and semi-minor axes reduced by r. This approximation always overestimates $A_i$, as is illustrated in FIG. 4.1.

$$A_i = \pi(a'-r)(b'-r) \quad (19)$$

The correct formula for $A_i$ is shown in Eq. 20, where $\xi_{min}$ is defined by Eq. 21.

$$A_i = a'b'(\pi - 2\xi_{min}) + \pi r^2 + 4b'r\left(E\left(\xi_{min}, 1 - \frac{a'^2}{b'^2}\right) - E\left(1 - \frac{a'^2}{b'^2}\right)\right) + \frac{b'}{a'}(a'^2 - b'^2)\sin(2\xi_{min}) - 2r^2\tan^{-1}\left(\frac{a'}{b'}\tan(\xi_{min})\right) \quad (20)$$

$$\xi_{min} = \begin{cases} \dfrac{\sqrt{b^4 - a^2 r^2}}{\sqrt{2ab\sqrt{(a^2-b^2)(b^2-r^2)} + a^2(r^2-2b^2) + b^4}}, & a > \dfrac{b^2}{r} \\ \phantom{\dfrac{\sqrt{b^4}}{a^2(b^2-r^2) - ab\sqrt{(a^2-b^2)(b^2-r^2)}}} & \\ 0, & \text{Otherwise} \end{cases} \quad (21)$$

E(,) is the incomplete elliptic integral of the second kind, defined by Eq. 22.

$$E(\phi, v) = \int_0^\phi \sqrt{1 - v\sin^2(\eta)} d\eta \quad (22)$$

Fast numerical implementations of both the complete and incomplete elliptic integral of the second kind are commonly available in scientific computation libraries.

With particular respect to FIG. 5.1, a comparison is provided of the probability of full intersection, $P_{full}$, as computed by Eq. 15 using $A_i$ and $A_e$ using methods in accordance with the present disclosure and the comparative solution from the Ozkaya formulae. In FIG. 5.1, the borehole of radius r=1 is intersecting a circular fracture of radius a=5 at various intersection angles, θ. Here, Ozkaya formulas overestimate $A_i$ and underestimate $A_e$, with the result that the final probability is overestimated. The relative error of this overestimation is examined in FIG. 5.2, where elliptical fractures are examined by varying the semi-minor axis, b, expressed in units of borehole radii, and the different curves representing various ellipse elongations, ϵ. The Ozkaya formulae consistently overestimate $p_{full}$, and the relative error grows with decreasing b and increasing ϵ.

The impact of error in the approximation of $P_{full}$ appears when it is used in the estimation of a. For a circular fracture, the joint probability density function representing uncertainty in the estimation of α is given by the likelihood function given by Eq. 23 where it is assumed that θ is already known from interpretation of the borehole image.

$$p(a) \propto \exp\left[-\dfrac{1}{2\bar{\sigma}_{full}^2}\left(P_{full}(a) - \bar{P}_{full}\right)^2\right] \quad (23)$$

As an example application of Eq. 23, consider a circular fracture set with a=25 and θ=7π/16, intersected by a borehole with r=1. A random sample of fractures with 100 borehole intersections yielded 55 full intersections and 45 partial intersections, corresponding to $\bar{P}_{full}$=0.55 and $\bar{\sigma}_{full}$≈0.0497. Plots of p(a) comparing use of the correct formulas for $A_i$ and $A_e$ with their Ozkaya approximations are illustrated in FIGS. 6.1 and 6.2, which provide a comparison of uncertainties of the estimated fracture radius for the case of a circular fracture with a=25 and θ=7π/16, intersected by a borehole with r=1. Estimates made using the Ozkaya approximate formula always underestimate a.

With particular respect to FIG. 6.1, an estimate is made from a borehole image with 100 fracture traces, both distributions cover the true value of a because of the large uncertainty in the estimate. Although both distribution estimates encompass the true value of a, the Ozkaya estimate is biased downward. With particular respect to FIG. 6.2, an estimate is made from a borehole image with 10,000 fracture traces to reduce estimation uncertainty. As can be observed, when the number of measured fractures is increased, the Ozkaya distribution clearly fails to cover the true value, while the distribution calculated in accordance with the present disclosure performs well.

The example shown in of FIGS. 6.1 and 6.2 is modified to account for elliptical fractures in FIGS. 7.1-7.5. Here the fracture parameters are a=25, ϵ=5, α=π/4, and θ=7π/16, and the borehole radius is r=1. With particular respect to FIG. 7.1, a plot of an elliptical fracture is shown overlaid with a random sample of 100 fracture-containing borehole projections plotted in fracture-centric coordinates. In fracture-centric coordinates, the x-y axes lie in the fracture plane with the fracture centered on the origin, so all of the fractures overlay as a single ellipse, and a cloud of borehole projections onto this plane are plotted as smaller ellipses. Boreholes that fully intersect are plotted in black, while those with partial intersections are plotted in gray. In the sample illustrated in FIG. 7.1 there are 8 full intersections and 92 partial intersections, yielding $\bar{p}_{full}$=0.08 and $\bar{\sigma}_{full}$≈0.0271.

The fracture parameters θ and n are assumed to be known from standard interpretation of the borehole image, leaving a, ϵ, and α to be determined here. These three degrees of freedom cannot be determined from the single statistic of the probability of full intersection. This is examined in FIGS. 7.2-7.4. FIG. 7.2 shows the calculation of uncertainty in a, where the true values of ϵ and α are known. FIG. 7.3 plots the joint uncertainty in (α,α), while FIG. 7.4 plots the joint uncertainty in (a, ϵ), with each plot assuming the true value of the remaining parameter is known. Black dots indicating the true values lie within these distributions, but these plots indicate a broad range of other values that also satisfy this one statistic. With particular respect to FIG. 7.5, a maximum-likelihood estimate of all three parameters as the surface shown with the true values indicated by a black dot on the surface, where the maximum-likelihood estimate is the solution to $p_{full}(a, \epsilon, \alpha) = \bar{p}_{full}$.

Stereology from the Relative Azimuths of Partial Intersections

The next section considers how additional information contained in borehole images, namely, the histogram of the relative azimuths of fracture-trace midpoints, can be used to deduce the ellipse elongation ratio and rotation angle. With this additional information, fracture ellipse geometry and orientation can be fully estimated from a borehole image.

To extract additional information on the shape and orientation of elliptical fractures, the information contained in the probability distribution of fracture-trace midpoint azimuth is analyzed as measured in a given borehole image. In one or more embodiments, methods of analyzing the shape and orientation of elliptical fractures using midpoint azimuth analysis may consider only partially intersecting fractures, where the midpoint azimuth is actually defined. In some embodiments, the distribution of trace midpoint azimuth may be determined from a borehole image by extracting the midpoints of each partially intersecting fracture trace, averaging these azimuth midpoints for each fracture trace, and then evaluating the histogram of these midpoint azimuths.

In one or more embodiments, methods of determining the distribution of trace midpoint azimuth may be simplified by estimating the probability density function (PDF) for ψ for the projection of the fracture ellipse onto the borehole-normal plane. Starting with Eq. 11 to describe the projected ellipse, the basis vectors are redefined to correspond to the axes of the projected ellipse, yielding Eq. 24, where $$a'_p = g\left(\beta_0 + \dfrac{\pi}{2}\right) \text{ and } b'_p = g(\beta_0).$$

$$g(\beta) = a'_p \cos(\beta) + b'_p \sin(\beta) \quad (24)$$

These basis vectors are orthogonal. In the plane of this ellipse, the borehole is a circle of radius r. If this circle intersects the ellipse, its center can be defined in terms of $\beta$ as shown in Eq. 25, where $n(\beta)$ is the normal to the ellipse, given by Eq. 26, where t is the borehole trajectory vector, and $-r \leq v \leq r$.

$$c(\beta) = g(\beta) - v\hat{n}(\beta) \tag{25}$$

$$n(\beta) = \frac{dg}{d\beta} \times \hat{t} \tag{26}$$

The relative azimuth to the midpoint of the intersection trace can then be approximated by Eq. 25 using the angle of $n(\beta)$ with respect to the vector directions of the zero and $\pi/2$ relative azimuth vectors, given by $n_c^T = [\cos(\theta), 0, -\sin(\theta)]$ and $n_s^T = [0, 1, 0]$, respectively. The relative azimuth is then given by Eq. 27, where only the sign of v influences $\psi$ by indicating whether the borehole center is inside or outside the ellipse.

$$\psi(\beta) \approx \tan^{-1}[v \, \hat{n}(\beta) \cdot n_c, v \, \hat{n}(\beta) \cdot n_s] \tag{27}$$

In the following, this approximate expression for the trace-midpoint azimuth is assumed to be the true value of $\psi$. The usefulness of this approximation is demonstrated in numerical experiments later in this section.

The PDF for $\psi$, denoted $p(\psi)$, is related to the PDF for $\beta$, denoted $p(\beta)$, through Eq. 27. This is the classic problem of finding the distribution of a function of a random variable. The solution is given in Eq. 28, where $\beta(\psi)$ is the inverse of the monotonic function $\psi(\beta)$.

$$p(\psi) = p(\beta) \left| \frac{d\beta}{d\psi} \right| \bigg|_{\beta=\beta(\psi)} \tag{28}$$

The factor $$\frac{d\beta}{d\psi}$$

is derived from Eq. 27 as Eq. 29.

$$\left| \frac{d\beta}{d\psi} \right| = \left( \left| \frac{d\psi}{d\beta} \right| \right)^{-1} = \frac{(\hat{n}(\beta) \cdot n_c)^2 + (\hat{n}(\beta) \cdot n_s)^2}{(\hat{n}(\beta) \cdot n_c)\left(n_s \cdot \frac{d\hat{n}(\beta)}{d\beta}\right) - (\hat{n}(\beta) \cdot n_s)\left(n_c \cdot \frac{d\hat{n}(\beta)}{d\beta}\right)} \tag{29}$$

The factor $p(\beta)$ is defined such that it is consistent with the borehole-circle centers being uniformly distributed within the region of intersection with the ellipse, i.e., within the internal and external curves associated with $A_i$ and $A_e$. These constraints yield Eq. 30, where $$\epsilon'^2 = \frac{a'^2}{b'^2}.$$

The distribution $p_\psi(\psi)$ can then be plotted parametrically as $(\psi(\beta), p(\beta))$.

$$p(\beta) = \frac{\sqrt{\cos^2(\beta) + \epsilon'^2 \sin^2(\beta)}}{4E(1 - \epsilon'^2)} \tag{30}$$

Formula 28 was validated for the case of fractures with a=25, $\epsilon$=4, and $\alpha$=0, and a wellbore with r=1. Two cases were considered: $\theta$=0 and $\theta$=7$\pi$/16. With particular respect to FIG. 8.1, a histogram of $\psi$ was computed from $10^5$ Monte Carlo samples of partially-intersecting fractures and compared with $p(\psi)$ for the case of fractures with a=25, $\epsilon$=4, $\alpha$=0 and a wellbore with r=1 and $\theta$=0. FIG. 8.3 is a histogram of W under substantially the same conditions as FIG. 8.1, but with $\theta$=7$\pi$/16. In both cases, the analytical and Monte Carlo results compare well. FIGS. 8.2 and 8.4 show intersections of the borehole onto the fracture plane for the first 100 samples for the cases plotted in FIGS. 8.1 and 8.3, respectively. These fracture plane diagrams aid in understanding some general features of the distributions. For example, it is clear that $p(\psi)$ should be periodic of period $\pi$ because of the symmetry of intersections around the ellipse.

Another feature apparent in these distributions is the location of the peak. In FIG. 8.1 this occurs at $\psi=\pi/2$ and $\psi=3\pi/2$. Examination of the sample borehole intersections in FIG. 8.2 shows that the upper and lower surfaces of the ellipse offer more opportunities for intersections than the left and right surfaces. Intersections with these surfaces will yield $\psi$ values in the neighborhoods of $\psi=\pi/2$ and $\psi=3\pi/2$, respectively, which explains the peak locations. Conversely, in FIG. 8.3 the peaks occur at $\psi=0$ and $\psi=\pi$. Examination of the sample borehole intersections in FIG. 8.4 shows that, because the borehole intersections with the fracture plane are elongated in the direction of the major axis of the ellipse, the probability of intersection is much greater along the left and right surfaces of the ellipse than along the upper and lower surfaces. Clearly, peak location alone is not an indication of the ellipse rotation angle $\alpha$.

A significant aspect of Eq. 28 is that the ellipse parameters a and b only appear as the ratio $\epsilon$=a/b. This means that $p(\psi)$ is independent of the scale of the fracture. This feature can be used to extract $\epsilon$ and $\alpha$ from a measured histogram of trace-midpoint relative azimuth.

Here we consider two statistics from this histogram, the location of the histogram peak, $\psi_{max}$, and the histogram amplitude at this peak, is $p(\psi_{max})$. Contour plots of these two statistics are plotted versus $\epsilon$ and $\alpha$ in FIGS. 9.1-9.6 for several values of $\theta$. For FIGS. 9.1 and 9.2, $\theta$=0; for FIGS. 9.3 and 9.4, $\theta$=$\pi$/4; and for FIGS. 9.5 and 9.6, $\theta$=3$\pi$/8. In order to evaluate $\epsilon$ and $\alpha$, refer to the two plots associated with the measured value of 0, and then find the contour in each plot corresponding to the measured values of $\psi_{max}$ and $p(\psi_{max})$. The intersection of these two contours yields values for $\epsilon$ and $\alpha$. Uncertainty in the estimation of $\epsilon$ and $\alpha$ can be quantified by estimating the uncertainty in extracting $\psi_{max}$ and $p(\psi_{max})$ from the measured histogram.

Estimation of Fracture Length, Elongation Ratio, and Rotation

In the previous sections, methods were established to estimate fracture size a from the probability of full intersection (requiring knowledge of rotation $\alpha$ and elongation ratio $\epsilon$), and to estimate $\alpha$ and $\epsilon$ from the histogram of the relative azimuths of trace midpoints for partially intersecting fractures, independent of a. In the next section, a method in accordance with the present disclosure is set forth using example calculations to estimate fracture ellipse geometry and orientation from a borehole image.

In the following example, the previously introduced methodologies are combined by way of example to estimate a, $\epsilon$, and $\alpha$. A wellbore is established in which r=1, $\theta=\pi/4$, a=20, $\epsilon$=4 and $\alpha=\pi/2$. After Monte Carlo simulation of $10^4$ uniformly-distributed fractures, 5052 are fully intersecting and 4948 are partially-intersecting. Subsets of this fracture set will be used to analyze uncertainty in the estimation of a, $\epsilon$, and $\alpha$.

An image of 50 fracture-borehole intersections as they appear on the fracture plane is provided in FIG. 10.1. The fracture is illustrated as the large black ellipse 1002, and the borehole intersections with the fracture plane in gray for partial intersections 1004 and black for full intersections 1006. With respect to FIG. 10.2, a simulated borehole image for these fractures is shown, again with gray for partial intersections and black for full intersections.

In order to estimate $\epsilon$ and $\alpha$ from the probability density function for the fracture-trace midpoint relative azimuths, the density function is estimated from a number of samples. From the $10^4$ fracture samples generated above, subsets (300 in size) are considered here. In the first subset, 158 fractures are fully intersecting and 142 are partially intersecting. With particular respect to FIG. 11, a histogram of the fracture-trace midpoint relative azimuths is shown overlaid with p($\psi$) as a black curve for the true fracture parameters as estimated by Eq. 28, while the dashed curve is a kernel-based estimate of p($\psi$). The bin width $\Delta\psi$ used in this histogram was determined by the Silverman rule, designed to minimize the difference between the estimated true probability distributions in Eq. 31, where N is the total number of samples and $\sigma$ is their standard deviation.

$$\Delta\psi = \frac{0.9\sigma}{N^{\frac{1}{5}}} \quad (31)$$

Figure 11:
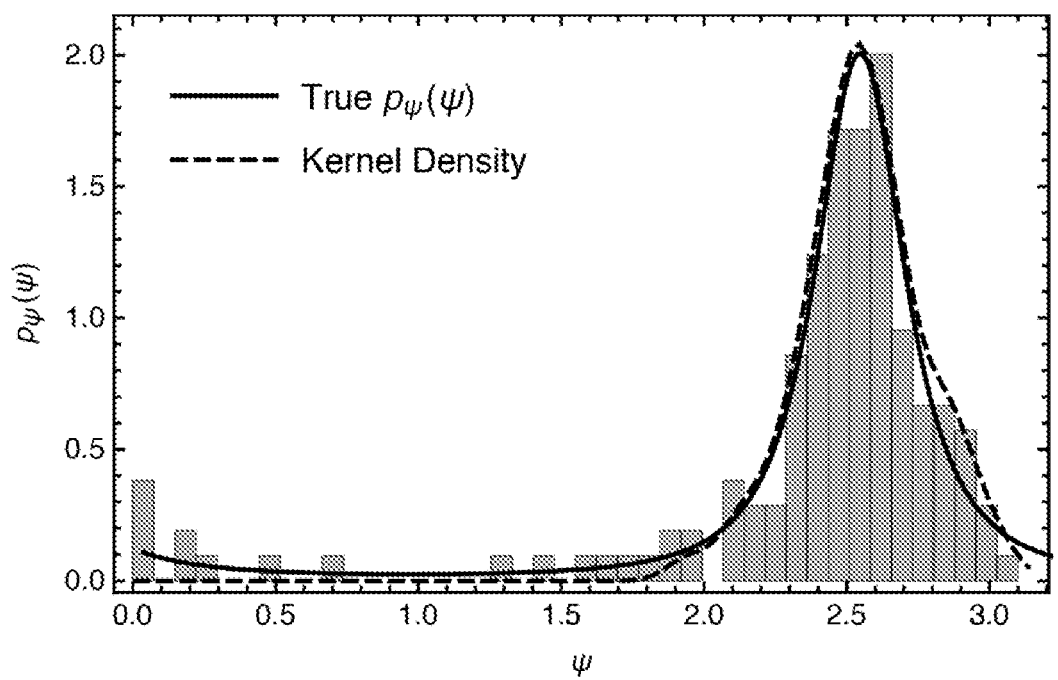
FIG. 11 is a histogram of fracture-trace midpoint relative azimuths obtained in accordance with embodiments of the present disclosure.

This histogram is one estimate of the density function. For comparison, the black curve in FIG. 11 provides the density function, $p_\psi(\psi)$ from Eq. 28, for the true fracture parameters. The noise in this histogram estimate would affect estimates of both $\psi_{max}$ and p($\psi_{max}$). However, the smooth-kernel estimation with a Gaussian kernel, the dashed curve, provides a more stable density estimate.

As a processing step before kernel estimation, outliers are removed using Tukey's test which identifies outliers as those samples that lie outside the range [$Q_{0.25}$−1.58($Q_{0.75}$−$Q_{0.25}$), $Q_{0.75}$+($Q_{0.75}$−$Q_{0.25}$)], where $Q_p$ is the p-th quantile. With these outliers removed, the kernel bandwidth is computed from Eq. 31 and used to estimate $p_\psi(\psi)$. As shown in the dashed curved in FIG. 11, much of the histogram noise has been eliminated in this kernel estimate, providing a significantly better estimate of $\psi_{max}$ and p($\psi_{max}$). An estimate of the uncertainty in $\bar{p}_\psi(\psi)$ as an estimator of $p_\psi(\psi)$ is needed in order to quantify the reliability in the estimates of $\psi_{max}$ and p($\psi_{max}$).

In order to estimate $\epsilon$ and $\alpha$ from $\bar{p}_\psi(\psi)$, the values of $\psi_{max}$ and $\bar{p}(\bar{\psi}_{max})$ are first extracted from $\bar{p}_\psi(\psi)$. Then these values are equated with the values of $\psi_{max}$ and p($\psi_{max}$) as computed from Eq. 28, adjusting the values of $\epsilon$ and $\alpha$ until equality is reached. This regression is efficiently performed using a Newton iteration.

Uncertainty in $\bar{p}(\psi)$, and hence the uncertainty in $\epsilon$ and $\alpha$, may be estimated using the bootstrap method in some embodiments. In this approach, an initial $\bar{p}_0(\psi)$ is estimated from the N azimuth samples using the kernel approach described above, which is then used to calculate $\epsilon_0$ and $\alpha_0$. Density estimate $\bar{p}_0(\psi)$ is then used to generate N new azimuth samples, from which a new density function $\bar{p}_1(\psi)$, and associated $\epsilon_1$ and $\alpha_1$, are estimated. This iteration is continued, always using $\bar{p}_0(\psi)$ to generate the new azimuth samples, until sufficient samples of $\epsilon$ and $\alpha$ are available for the estimation of uncertainty in these parameters.

After 1000 iterations of the bootstrap method on the subset of 300 fracture samples, the resulting range of $\bar{\psi}_{max}$ and $\bar{p}(\bar{\psi}_{max})$ values are illustrated as histograms in FIGS. 12.1 and 12.2. With particular respect to FIG. 12.1, a histogram showing the probability density of is shown for the first subset of fracture samples. The thick vertical lines indicate the true values of these parameters. The mean ($\mu$) and standard deviation ($\sigma$) of each distribution is provided above each plot. FIG. 12.2 shows the probability density for $\bar{p}(\bar{\psi}_{max})$. These histograms both cover the true values of $\psi_{and}$ p($\psi_{max}$).

Histograms of the 1000 values of $\epsilon$, $\alpha$, and a estimated from these parameters are provided in FIGS. 13.1, 13.2, and 13.3, respectively. The thick vertical lines indicate the true values of these parameters. The mean ($\mu$) and standard deviation ($\alpha$) of each distribution is provided above each plot. Once again, the true values of $\epsilon$ and $\alpha$ are covered by these histograms.

In one or more embodiments, to estimate the uncertainty in a from these 1000 samples of $\epsilon$ and $\alpha$, Eq. 23 may be applied to each sample of $\epsilon$ and $\alpha$ and then average these distributions to form p(a). In some embodiments, the uncertainty of a may be estimated by sampling a number of values of a, ten in this case, from each of these 1000 distributions and then histogram this ensemble. This histogram of p(a) is provided in FIG. 12.3. The true value of a is covered by this distribution.

The reliability of the uncertainty estimates for $\epsilon$, $\alpha$, and a is explored in FIGS. 14.1-14.3 by repeating the synthetic experiment 32 times on independently-sampled random fractures and comparing the uncertainty estimates. Results are plotted for $\epsilon$, $\alpha$, and a in FIGS. 14.1, 14.2, and 14.3, respectively. The vertical axes in the figures indicate the index of each of the 32 trials. The dots indicated the median value for each trial and the horizontal bars indicate the 95% confidence interval. The black curve is the kernel density estimate for the 32 median values. The thick vertical lines indicate the true values of these parameters. The 95% confidence intervals cover the true values about 95% of the time, and the median values do not exhibit any significant bias.

Estimating Fracture-Size Distribution

In previous sections, it was shown that the estimation of $\epsilon$ and $\alpha$ from p($\psi$) is independent of a, and that knowledge of $\epsilon$ and $\alpha$ is used to estimate a from the probability of full intersection $P_{full}$. In this section, a method is shown in accordance with the present disclosure in which a fracture-size distribution is estimated for the case of a simple parametric distribution.

The above methods focused in part on the estimation of $\epsilon$, $\alpha$, and a when all of the fractures have similar values of these parameters. In a formation, natural fractures tend to vary in size, and it may be useful to examine whether the distribution of fracture size, p(a), can be estimated from a borehole image.

In one or more embodiments, distribution p(a) may be estimated from $P_{full}$, to understand how fracture size distribution impacts the measured value of $P_{full}$. $P_{full}$ for a distribution of fracture size depends on two factors, once $\epsilon$ and $\alpha$ are known. The first factor, that has already been considered, is the dependence of $P_{full}$ on fracture size. The second factor is the probability of intersection with the borehole. For example, for a spatial domain of fixed volume, a large fracture is more likely to intersect the borehole than a small fracture. This second probability did not need to be considered in the earlier analysis for a constant value of a, because all fractures then have the same probability of intersection.

The probability of intersection is proportional to $A_e$. For example, consider two fractures, one of $A_e$ and a second of $2A_e$. Twice the $A_e$ value means twice the possible area of intersection with the borehole, and thus twice the probability of detection. Denoting a detected fracture by d, the probability of detection for a fracture of size a is given by Eq. 32, where c is a constant of proportionality, and $A_e(a)$ is defined by Eq. 17, with r, $\epsilon$ and, $\alpha$ being dropped for notational simplicity.

$$P(d|a)=cA_e(a), \tag{32}$$

Scaling c so that $P(d)=1$ when the full distribution of a is considered gives Eq. 33.

$$P(d \mid a) = \frac{A_e(a)}{\int_0^\infty A_e(a')p(a')da'} \tag{33}$$

The joint density for a that includes only detected fractures is then given by Eq. 34, where p(a,d) is abbreviated to $p_d(a)$.

$$p_d(a)=P(d|a)p(a), \tag{34}$$

The expected value of $P_{full}$ must be computed with respect to the distribution of detected fractures $p_d(a)$, not the true fracture distribution p(a), and is thus given by Eq. 35.

$$E_{p_d}(P_{full}) = \int_0^\infty \frac{A_i(a)}{A_e(a)} p_d(a)da. \tag{35}$$

Exponential Distribution

In the next section, an example is considered in the specific case of a being exponentially distributed using Eq. 36, where $\lambda>0$.

$$p(a)=\lambda \exp(-\lambda a) \tag{36}$$

As a first synthetic case, consider a that is exponentially distributed with $\lambda=1/10$, as illustrated in FIGS. 15.1-15.2. With particular respect to FIG. 15.1, an exponential density function is p(a) with $\lambda=1/10$ is used to generate fractures for the example. With particular respect to FIG. 15.2, a histogram of a for only those fractures that intersect the borehole is overlaid by density function $p_d(a)$ given in Eq. 33. While the mean of p(a) is 10, the mean for detected fractures jumps to $p_d(a)\approx 26.3$.

The mean of this distribution is a=10. To experimentally compute $p_d(a)$, fractures were generated with a sampled from p(a) until $10^4$ fractures were found that intersect the borehole. The other parameters used in this experiment are r=1, $\epsilon=6$, $\alpha=\pi/4$ and $\theta=\pi/4$. A histogram of the a values for these intersecting fractures is provided in FIG. 15.2. Overlaid on this histogram is the theoretical prediction of Eq. 33, demonstrating good agreement. Comparing p(a) with this experimental $p_d(a)$, it is clear that the fractures detected in a borehole image have sizes that are biased upward from the true size distribution.

As a demonstration of estimating $\lambda$, consider the above synthetic case of FIG. 15.2 when 300 fractures are detected. The random sample yielded 123 full intersections and 177 partial intersections, corresponding to $P_{full}=0.41$ and $\overline{\sigma}_{full}\approx 0.0284$. As before in estimating a, it is first beneficial to estimate $\epsilon$ and $\alpha$. Histograms of 1000 of these estimates are provided in FIGS. 14.1 and 14.2.

They are in good agreement with the true parameter values. In order to estimate a distribution for $\lambda$, a similar approach to that used above may be followed to estimate the distribution of a from distributions of $\overline{P}_{full}$, $\epsilon$ and $\alpha$. The only difference is that instead of drawing ten samples of a from Eq. 23 for each $(\epsilon,\alpha)$ pair, we draw ten samples of $\lambda$ from Eq. 36, where $E_{p_d}(P_{full}(\lambda))$ is defined by Eq. 34.

$$p(\lambda) \propto \exp\left[-\frac{1}{2\overline{\sigma}_{full}^2}\left(E_{p_d}(P_{full}(\lambda)) - \overline{P}_{full}\right)^2\right], \tag{36}$$

With particular respect to FIGS. 16.1, 16.2, and 16.3, the estimated marginal distributions are shown for $\epsilon$, $\alpha$, and $\lambda$, respectively. The thick vertical lines indicate the true values of these parameters. The mean ($\mu$) and standard deviation ($\sigma$) of each distribution is provided above each plot A histogram of the resulting $10^4$ samples of $\lambda$ is provided in FIG. 16.3. The distribution of $\lambda$ covers the true value of $\lambda$.

The reliability of the uncertainty estimates for $\epsilon$, $\alpha$, and $\lambda$ from FIGS. 16.1-16.3 is shown in FIGS. 17.1, 17.2, and 17.3, respectively. The histograms were generated by repeating the synthetic experiment 32 times on independently-sampled random fractures and comparing the uncertainty estimates. The black curve is the kernel density estimate for the 32 median values. The thick vertical lines indicate the true values of these parameters. The dots indicated the median value for each trial and the horizontal bars indicate the 95% confidence interval. The 95% confidence intervals cover the true values about 95% of the time, and the median values do not exhibit any significant bias.

Power-Law Distribution Methodology

In the next section, fracture distributions of fracture size a are fit using a Pareto power law distribution, with p(a) given by Eq. 37, $a \geq a_0$, where $\gamma>1$ is the shape factor and $a_0>0$ is the scale factor.

$$p(a) = \frac{\gamma-1}{a_0}\left(\frac{a}{a_0}\right)^{-\gamma} \tag{37}$$

Figure 18:
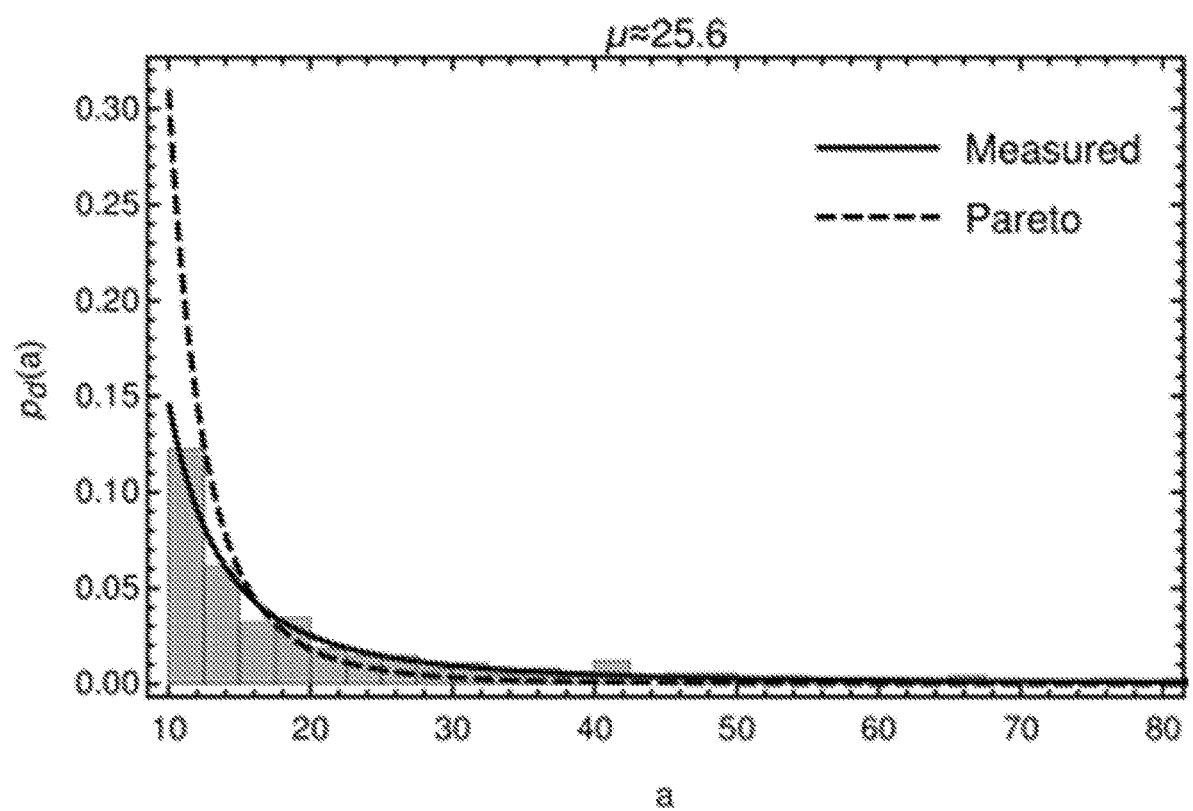
FIG. 18 is a histogram of 300 fractures generated in accordance with embodiments of the present disclosure and fit using a Pareto density function p(a) with $a_0=10$ and $\gamma=3.1$.

In a first example, 300 fractures are fit to a Pareto density function p(a) with $a_0=10$ and $\gamma=3.1$, which is illustrated by the dashed curve in FIG. 18. A histogram of the a values for only those fractures that intersect the borehole is overlain by density function $p_d(a)$ given in Eq. 34, demonstrating good agreement. While the mean of p(a) is about 14.8, the mean $\mu$ for detected fracture size jumps to about 25.6.

The other parameters in this example are r=1, $\epsilon=6$, $\alpha=\pi/4$, and $\theta=\pi/4$. To experimentally compute p(a), fractures were generated with a sampled from p(a) until 300 fractures were found that intersect the borehole. A histogram of the a values for these intersecting fractures is provided in FIG. 18. Overlaid on this histogram is the theoretical prediction of Eq. 33, demonstrating good agreement. Comparing p(a) with this experimental $p_d(a)$, the fractures detected in a borehole image have sizes that are biased upward from the true size distribution, with the mean of $p_d(a)$ being about 25.6 compared with 14.8 for p(a).

Of the 300 fractures that intersect the borehole, 198 are partially intersecting. Inverting the distribution of relative azimuths for these trace midpoints for $\epsilon$ and $\alpha$ yields the marginal distributions illustrated in FIGS. 19.1, 19.2, 19.3, and 19.4, which correspond to $\epsilon$, $\alpha$, $\gamma$, and $a_0$, respectively. The results for $\gamma$ assume that the true value $a_0=10$ is known, and the results for $a_0$ assume that the true value $\gamma=3.1$ is known. The thick vertical lines indicate the true values of these parameters. The mean ($\mu$) and standard deviation ($\sigma$) of each distribution is provided above each plot.

These distributions cover the true values for these parameters. In the next step, these distributions are used to estimate the size distribution p(a) from $P_{full}$ using Eq. 37. However, since the Pareto distribution is a function of two parameters, $a_0$ and $\gamma$, additional information may be beneficial to form a well-posed inverse problem. Methods in accordance with the present disclosure may use a number of approaches to determine $a_0$ and $\gamma$ including using prior knowledge of $a_0$ to estimate $\gamma$, and using prior knowledge of $\gamma$ to estimate $a_0$. With particular respect to FIG. 19.3, the true value $a_0=10$ is used to estimate $\gamma$. While the true value of $\gamma$ is covered by p($\gamma$), the uncertainty on this estimate is too large for this estimate to be useful. Turning to FIG. 19.4, the prior knowledge of $\gamma=3.1$ is used to estimate p($a_0$), which covers the true value with small enough uncertainty to be useful. In practical applications, prior knowledge of $\gamma$ may be available from observed fracture-scaling laws.

Multiscale Approach for Shape Factor Estimation

Figure 25:
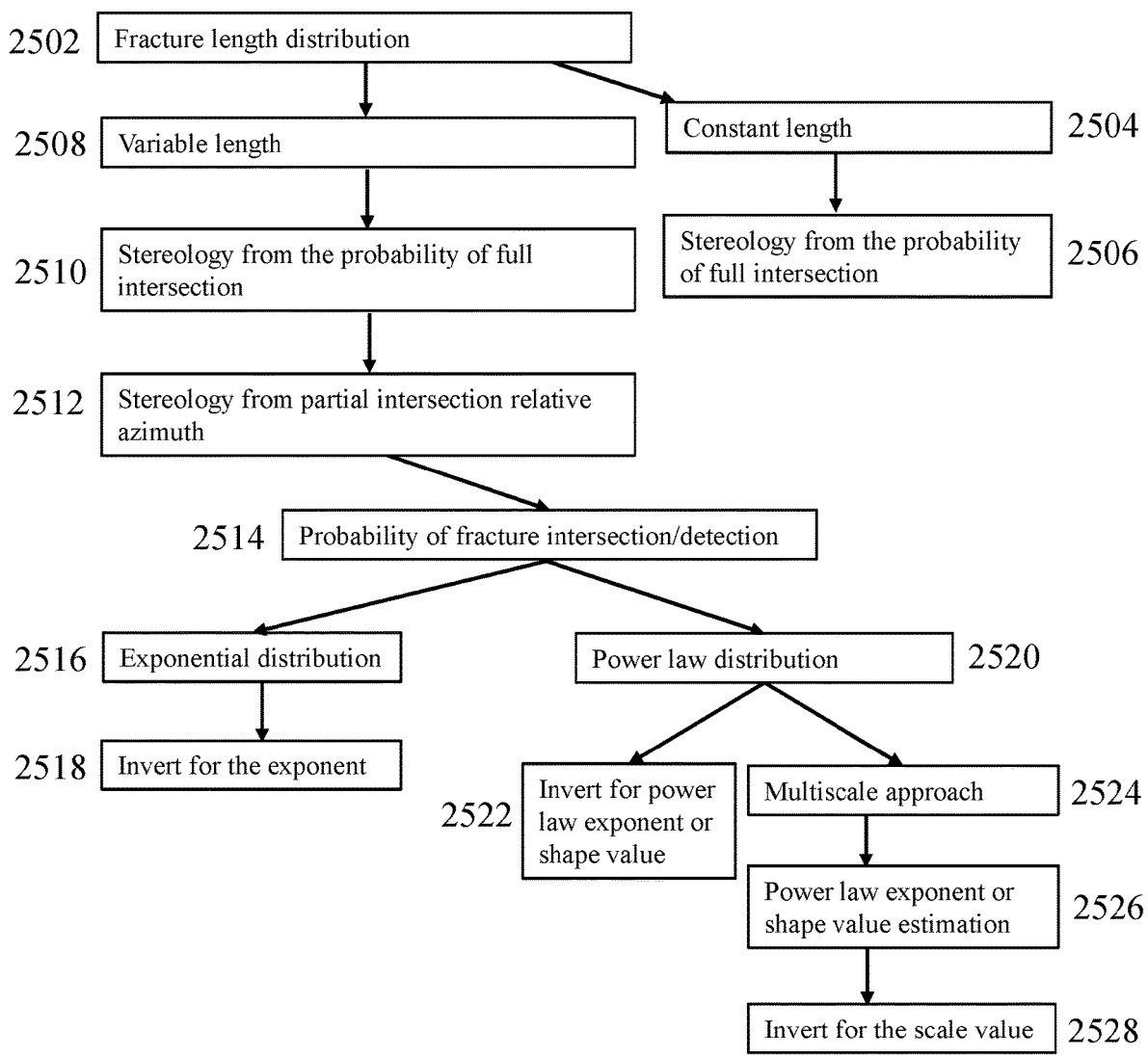
FIG. 25 is a flow diagram depicting methods in accordance with embodiments of the present disclosure.

As the Pareto power law distribution presents two unknown parameters $a_0$ and $\gamma$, methods in accordance with the present disclosure may estimate $a_0$ and $\gamma$ based on a multiscale approach. Once $a_0$ and $\gamma$ are known, a scale factor methodology may be used to estimate $a_0$, known as the scale factor. The overall workflow is illustrated in FIG. 25, which is discussed in greater detail in the examples below.

(1) Fracture Extraction from Seismic Data

Various techniques exist to extract geological structures such as fractures from 3D seismic-data volumes. These methods can be based on edge enhancement or chromatic extraction techniques, and the results may be presented as structural attribute volumes. Fracture-extraction tools allow the direct extraction of structural features that can be analyzed statistically. All three ellipse attributes: axis length, elongation ratio, and rotation, can be computed for each extracted patch, along with the values of strike and dip.

With particular respect to FIGS. 20.1-20.3, various steps in accordance with an embodiment of the present disclosure are illustrated to obtain fracture geometry information from an example of seismic data. FIG. 20.1 shows the generation of a fracture attribute (edge) volume. FIG. 20.2 demonstrates the extraction of seismic discontinuities representing the fractures. FIG. 20.3 shows a statistical analysis of the extracted fractures/faults.

(2) Shape Factor Estimation

Figure 21:
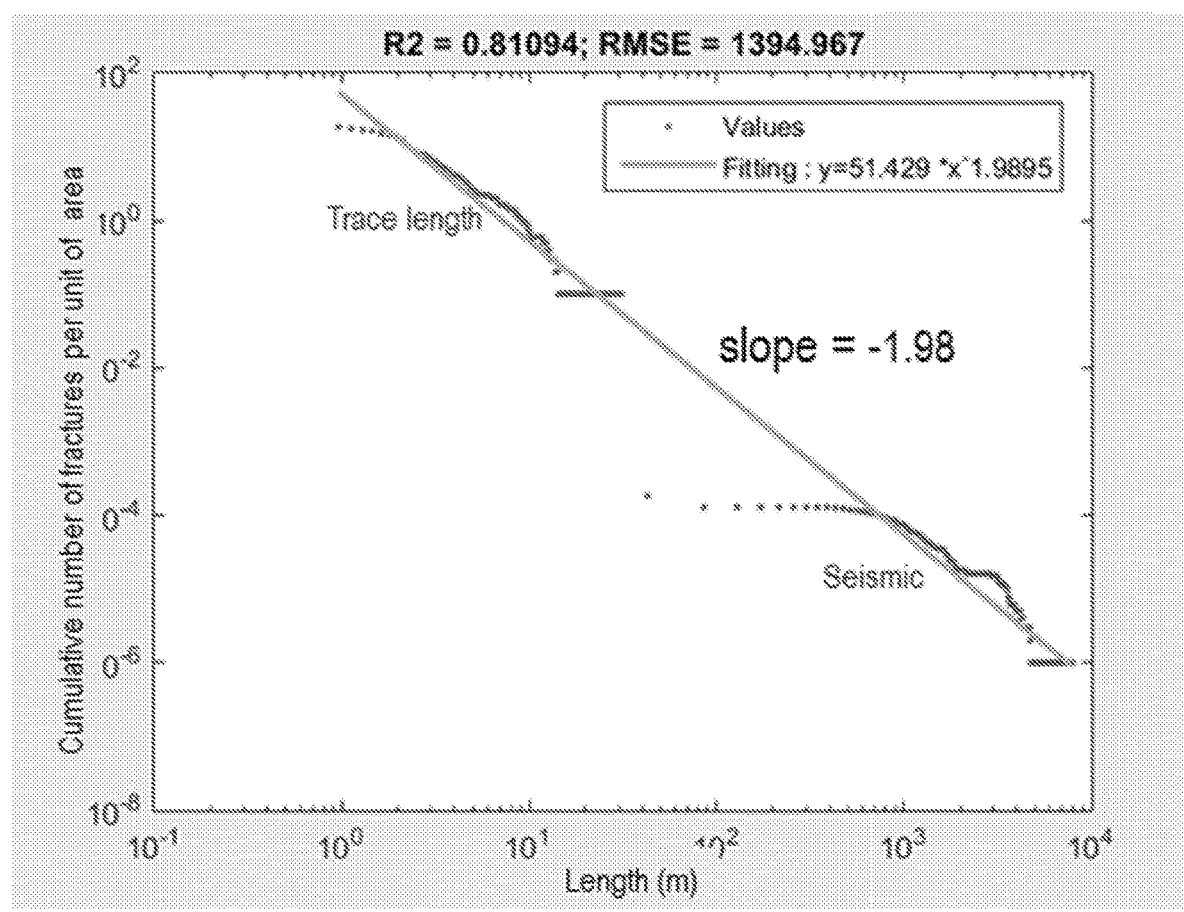
FIG. 21 is a graphical representation of multiscale integration data of fracture length from 3D seismic data and trace length from borehole images for data obtained in accordance with embodiments of the present disclosure.

Once the fractures are characterized from borehole images, cores, outcrops and seismic data, the multi-scale data may be integrated. Power laws and fractal geometry are useful descriptive tools for fracture geometry characterization. Others have applied this multi-scale approach in proterozoic basement of Yemen and Tamariu granite in Spain. By plotting the normalized cumulative frequency distributions for fracture lengths from maps ranging from regional to micro-block scales, they demonstrated an overall power-law behavior, even if the individual datasets showed mostly exponential length distributions. Using information about fracture length from seismic data and trace-length information from borehole images from above example shown in FIGS. 20.1-20.3, the normalized cumulative frequency distributions for these datasets are plotted in FIG. 21, which shows multiscale integration data of fractures length from 3D seismic data and trace length from borehole images. Fracture lengths are displayed as a cumulative frequency divided by area of the sampling. In this log-log plot, the slope is directly linked to the exponent of the power law ($\gamma$), and the value found in this example agrees with that reported for the same field, based mostly on satellite imagery. This method is proven and applicable for fracture lengths following a power law distribution. Once $a_0$ and $\gamma$ is estimated from this multiscale approach, the methodology may be applied to estimate $a_0$ and its range of uncertainty in some embodiments.

Derivation of $A_e$ and $A_i$

This next section discusses the derivation of $A_e$, and the application of the derivation approach to finding a formula for $A_i$.

A circular fracture projects onto a plane perpendicular to the borehole trajectory as an ellipse. Letting this ellipse have semi-major axis length a and semi-minor axis lengths b, an expression may be written in vector notation as Eq. 38.

$$p(\xi) = \begin{bmatrix} a\cos(\zeta) \\ b\sin(\xi) \end{bmatrix} \tag{38}$$

Given a circular borehole of radius r, the bounding curve for $A_e$ is found by rolling the circle around this ellipse and tracing the center of this circle. Since the circle is tangent to the ellipse for all values of $\xi$, the position of circle center as it rolls around the exterior of the ellipse is defined by Eq. 39, where n($\xi$) is the outward-pointing unit normal vector for the ellipse, defined by Eq. 40.

$$f_e(\xi) = p(\xi) + r\hat{n}(\xi) \tag{39}$$

$$n(\xi) = \begin{bmatrix} 0 & 1 \\ -1 & 0 \end{bmatrix} \frac{dp(\xi)}{d\xi} \tag{40}$$

In order to compute $A_e$, Eq. 40 is extended to describe the family of curves filling the interior of $f_e(\xi)$ given by Eq. 41, where $0 \le v \le 1$.

$$f(v, \xi) = v f_e(\xi) \tag{41}$$

The area is then given by Eq. 42, where J is the Jacobian of the transformation, defined by Eq. 43.

$$A_e = 4 \int_0^{\pi/2} d\xi \int_0^1 |J| dv, \tag{42}$$

$$J = \left\| \begin{matrix} \partial_v f_1 & \partial_v f_2 \\ \partial_\xi f_1 & \partial_\xi f_2 \end{matrix} \right\| \tag{43}$$

Note that symmetry allows us to integrate just the first quadrant and then multiply by four. The integrals in Eq. 42 can be evaluated analytically to yield Eq. 44.

$$A_e = \pi ab + \pi r^2 + 4arE\left(1 - \frac{b^2}{a^2}\right) \tag{44}$$

The derivation of a formula for $A_i$ follows the same approach, but the bounding curve is now defined by Eq. 45, where the negative sign indicates that the circle is rolling along the interior of the ellipse.

$$f_i(\xi) = p(\xi) - r\,n(\xi) \tag{45}$$

Figure 22:
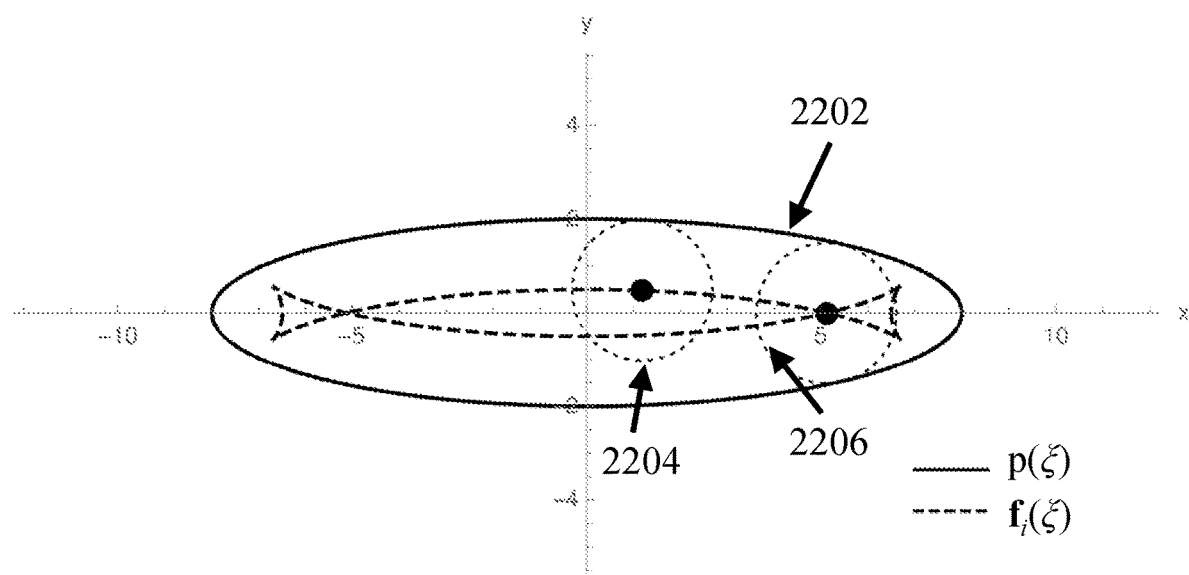
FIG. 22 is an illustration of the geometrical features in the definition of $A_i$ used in accordance with embodiments of the present disclosure.

With particular respect to FIG. 22, an illustration of the geometrical features in the definition of $A_i$ are shown. The solid curve 2202 represents the projected ellipse represented by solid line representing $p(\xi)$, while the dotted borehole circles 2204 and 2206 represent two possible positions for the borehole circle as it rolls about the interior of the ellipse to create a dashed line representing $f_i(\xi)$. The value of $\xi$ corresponding to this position is the value of $\xi$ for which the second component of $f_i(\xi)$ equals zero, or $\xi_{min}$. A closed-form solution for $\xi_{min}$ is given by Eq. 46.

$$\xi_{min} = \begin{cases} \dfrac{\sqrt{b^4-a^2r^2}\sqrt{2ab\sqrt{(a^2-b^2)(b^2-r^2)}+a^2(r^2-2b^2)+b^4}}{a^2(b^2-r^2)-ab\sqrt{(a^2-b^2)(b^2-r^2)}}, & a > \dfrac{b^2}{r} \\ 0, & \text{Otherwise} \end{cases} \quad (46)$$

With the family of curves interior to $f_i(\xi)$ defined by where $0 \leq \xi \leq 1$, and the Jacobian defined as before but with respect to Eq. 47, the area $A_i$ is given by Eq. 48.

$$f(v,\xi) = v f_i(\xi) \quad (47)$$

$$A_i = 4\int_{\xi_{min}}^{\pi/2} d\xi \int_0^1 |J| dv \quad (48)$$

This integral can be analytically evaluated to yield Eq. 49.

$$A_i = ab(\pi - 2\xi_{min}) + \pi r^2 + 4br\left(E\left(\xi_{min}, 1 - \frac{a^2}{b^2}\right) - E\left(1 - \frac{a^2}{b^2}\right)\right) + \frac{b}{a}(a^2 - b^2)\sin(2\xi_{min}) - 2r^2 \tan^{-1}\left(\frac{a}{b}\tan(\xi_{min})\right). \quad (49)$$

Derivation of $p(\beta)$

In this section, $p(\beta)$ is defined so that it is consistent with a uniform distribution of circle centers, a functional relation is needed between a circle center c and its specification in terms of the ellipse angle $\beta$ and the offset of c from the ellipse $\eta$. This problem can be reduced to two dimensions by rotating coordinates so that the projected fracture is contained in the x-y plane with the x axis is aligned with the major axis of the ellipse. In this case, the circle center is related to $\beta$ and $\eta$ by Eq. 50, where $-r < \eta < r$ constrains the circle center to lie within intersection distance from the ellipse, and $\hat{n}$ is the outward normal to the ellipse, defined by Eq. 51.

$$c(\beta, \eta) = \begin{bmatrix} a' \cos(\beta) \\ b' \sin(\beta) \end{bmatrix} + \eta \hat{n}(\beta) \quad (50)$$

$$n(\beta) = \begin{bmatrix} a' \cos(\beta) \\ b' \sin(\beta) \end{bmatrix} \quad (51)$$

$p(\beta)$ is obtained by applying the transformation in Eq. 50 to the distribution on c, denoted $p(c)$, yielding Eq. 53, where the integral is a marginalization over $\eta$.

$$p(\beta) = \int_{-r}^{r} p(c) |J| d\eta \quad (53)$$

The symbol J is the Jacobian of the transformation from c to $(\beta, \eta)$ parameters, given by Eq. 54.

$$|J| = \frac{a'b'\eta}{b'^2\cos^2(\beta)+a'^2\sin^2(\beta)} + \sqrt{b'^2\cos^2(\beta)+a'^2\sin^2(\beta)} \quad (54)$$

Since a uniform distribution on c means that $p(c)$ is constant, Eq. 54 reduces to Eq. 55.

$$p(\beta) \propto 2r\sqrt{b'^2\cos^2(\beta)+a'^2\sin^2(\beta)} \quad (55)$$

When normalized such that it integrates to unity over $\beta \in [0, 2\pi)$, this has the form of Eq. 56, where $$\epsilon'^2 = \frac{a'^2}{b'^2}.$$

$$p(\beta) = \frac{\sqrt{\cos^2(\beta)+\epsilon'^2\sin^2(\beta)}}{4E(1-\epsilon'^2)} \quad (56)$$

The distribution $p_\beta(\beta)$ is dependent on fracture and borehole parameters only through the parameter $\epsilon'$, and is periodic with period $\pi$. With particular respect to FIG. 23.1, plots of $p(\beta)$ for several values of $\epsilon'$ are presented. A Monte Carlo verification of Eq. 53 is provided in FIG. 23.2, where the analytical distribution for $\epsilon'=5$ is compared with a histogram of $10^4$ samples of partially-penetrating boreholes (with r=1) that were uniformly sampled on a projected ellipse with a'=25.

Application

Figure 24:
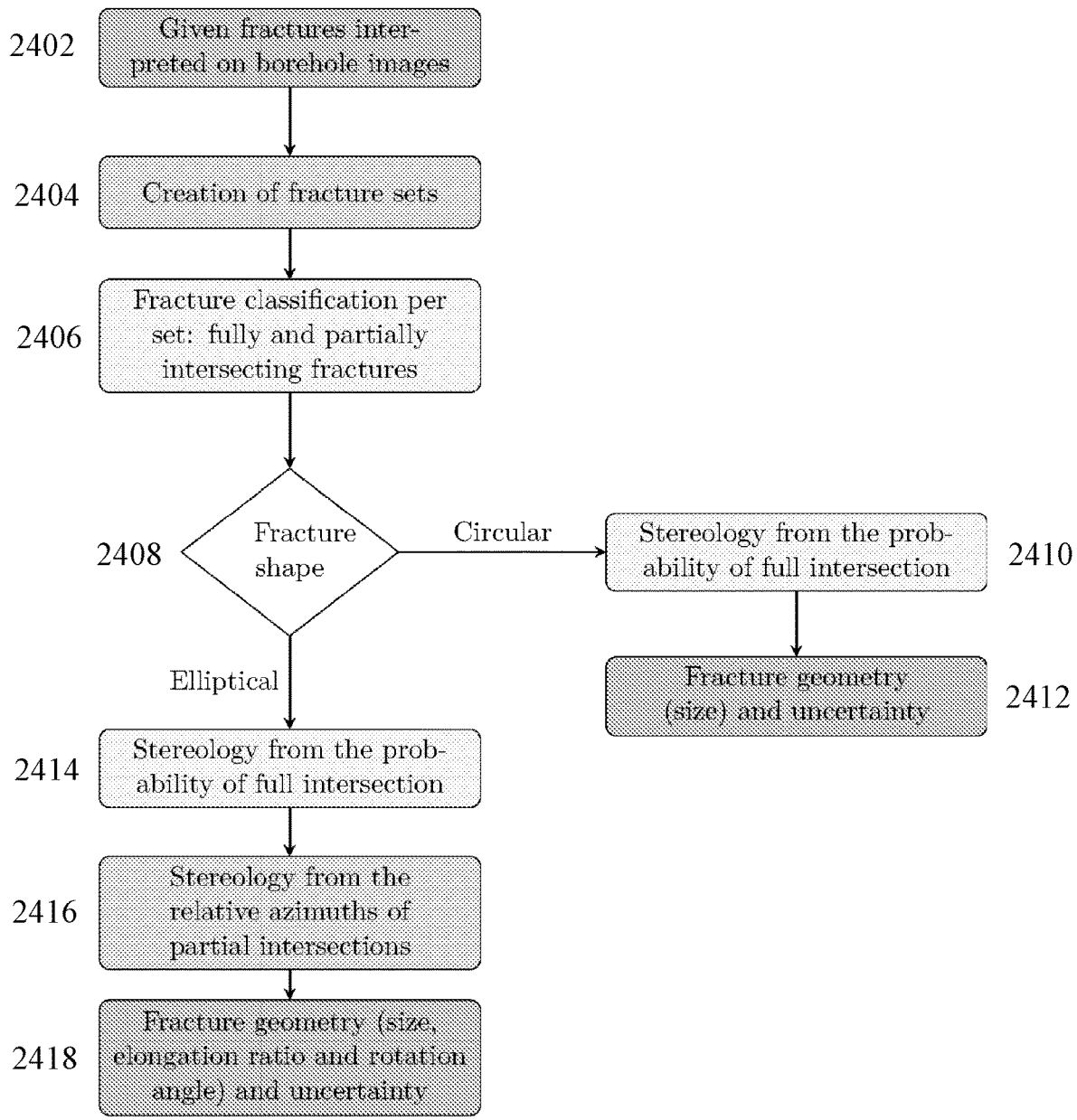
FIG. 24 is a flow diagram depicting methods in accordance with embodiments of the present disclosure.

The following section discusses methods of employing elliptical fracture calculations in a number of practical applications. In one or more embodiments, methods in accordance with the present disclosure may be performed as shown in the flow diagram provided in FIG. 24. Following the installation and logging of one or more boreholes, a 2D borehole image is obtained at 2402 using one or more suitable techniques, including conductivity, acoustics, and visual mapping. At 2404, the borehole images are analyzed to record all instances of fractures, which are then combined into a fracture set. The fracture set is then analyzed to classify measured fractures present in the borehole images into groups of fully and partially intersecting fractures at 2406.

At 2408, assumptions about the shape of the intersecting fractures are made before further processing. Previous approaches approximated fractures intersecting a borehole under study as circular, with the associated drawbacks discussed in prior sections. At 2410, the circular fractures are converted using stereological techniques based on the probability of full intersection of the fracture with the borehole. The stereological information is then processed at 2412 to determine overall fracture geometry, and associated uncertainty of the calculations.

Methods in accordance with the present disclosure assume elliptical shapes for intersecting fractures, which are converted at 2414 using stereological techniques based on the probability of full intersection of the fracture with the borehole. Features of elliptical fractures such as the relative azimuth may then be collected at 2416 to provide information regarding the dip and rotation angle of the elliptical fractures. In addition, fracture geometry may also be determined at 2418, including determination of size, elongation ratio, and rotation angle, and statistical treatments may yield uncertainty for each of the determined variables.

In another example, analysis of elliptical fracture information obtained from a borehole under study may be processed according to the flow diagram shown in FIG. 25. Starting at 2502, a fracture length distribution is obtained for a fracture set using methods in accordance with the present disclosure. While Pareto and exponential distributions are discussed in the examples above it is envisioned that any parametric distribution may be used including lognormal, Gaussian, gamma, power law, and the like.

The method may continue at 2504 for fracture sets that assume a constant length, which may be converted to stereological information for the probability of full intersection at 2506. For fracture length distributions that assume variable length fractures at 2508, the obtained data may be converted to determine stereology from the probability of full intersection at 2510. Stereology may be enhanced by considering partial intersection relative to the midpoint trace azimuth at 2512. At 2514, the probability of fracture intersection and/or detection may be calculated from the stereological data, which may be treated in a number of different ways, depending on the quality of fit. For example, methods in accordance with the present disclosure may utilize an exponential distribution at 2516, which may be solved for fracture length by inverting the exponent obtained for the exponential distribution at 2518. Other possibilities include fitting the probability of fraction intersection using a power law distribution at 2520, which may be solved in one embodiment by inverting the power law exponent or shape value at 2522. In some embodiments, a multiscale approach may be used to solve for multiple variables at 2524. Variables may then be solved for by using the power law exponent or using shape value estimation at 2526, and inverting the exponent for the scale value at 2528. However, depending on the application, one or more fitting techniques may be used depending on the goodness of fit from the known variables.

Figure 26:
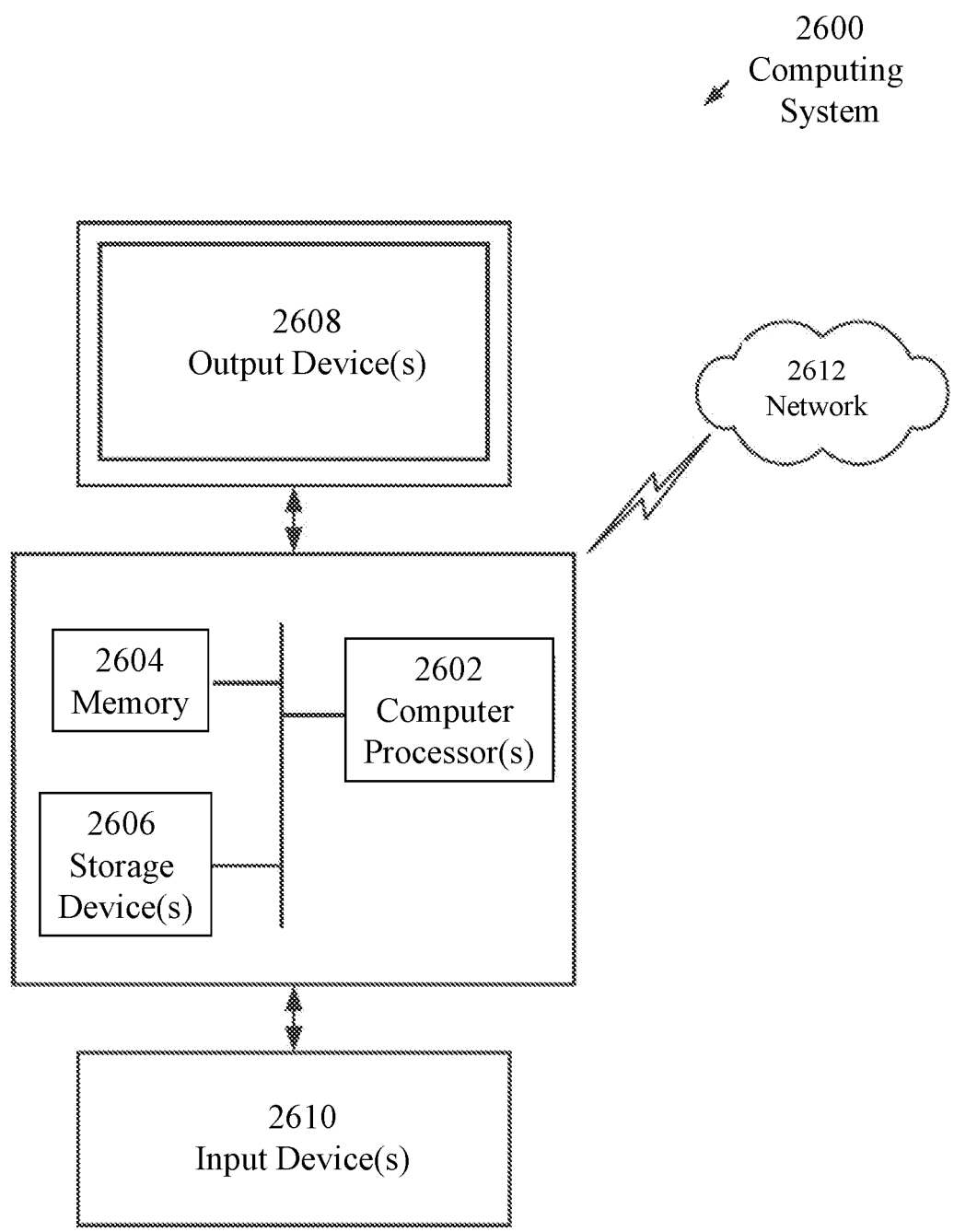
FIG. 26 is a schematic depicting a computer system in accordance with embodiments of the present disclosure.

Embodiments of the present disclosure may be implemented on a computing system. Any combination of mobile, desktop, server, embedded, or other types of hardware may be used. For example, as shown in FIG. 26, the computing system (2600) may include one or more computer processor(s) (2602), associated memory (2604) (e.g., random access memory (RANI), cache memory, flash memory, etc.), one or more storage device(s) (2606) (e.g., a hard disk, an optical drive such as a compact disk (CD) drive or digital versatile disk (DVD) drive, a flash memory stick, etc.), and numerous other elements and functionalities. The computer processor(s) (2602) may be an integrated circuit for processing instructions. For example, the computer processor(s) may be one or more cores, or micro-cores of a processor. The computing system (2600) may also include one or more input device(s) (2610), such as a touchscreen, keyboard, mouse, microphone, touchpad, electronic pen, or any other type of input device. Further, the computing system (2600) may include one or more output device(s) (2608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (2600) may be connected to a network (2612) (e.g., a local area network (LAN), a wide area network (WAN) such as the Internet, mobile network, or any other type of network) via a network interface connection (not shown). The input and output device(s) may be locally or remotely (e.g., via the network (2612)) connected to the computer processor(s) (2602), memory (2604), and storage device(s) (2606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (2600) may be located at a remote location and connected to the other elements over a network (2612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed:

1. A method, comprising:
creating a fracture set from a collection of intersecting fractures in a borehole image log recorded within a subterranean formation;
classifying the fracture set into groups of fully and partially intersecting fractures;
calculating one or more of an elongation ratio and a rotation angle of the partially intersecting fractures;
determining a probability of full intersection of fractures from the fracture set; and
determining a fracture size or a parametric distribution of fracture sizes from the fracture set using the calculated one or more of the elongation ratio and the rotation angle and the determined probability of full intersection of fractures within the borehole.

2. The method of claim 1, wherein calculating one or more of the elongation ratio and the rotation angle comprises:
generating a distribution of relative azimuths for fracture trace midpoints for the partially intersecting fractures.

3. The method of claim 2, wherein calculating a distribution of relative azimuths for fracture trace midpoints for the partially intersecting fractures further comprises:
computing the uncertainty of the distribution of relative azimuths for fracture trace midpoints for the partially intersecting fractures.

4. The method of claim 3, further comprising:
computing an uncertainty of the one or more of elongation ratio and rotation angle from the uncertainty of the distribution of relative azimuths for fracture trace midpoints for the partially intersecting fractures.

5. The method of claim 1, wherein calculating the one or more of the elongation ratio and the rotation angle comprises:
using one or more of seismic data, satellite images, cores, analogs or outcrops to determine the one or more of elongation ratio and rotation angle.

6. The method of claim 1, comprising:
determining a fracture size from the fracture set, and wherein the method further comprises:
computing an uncertainty of the fracture size from an uncertainty of the one or more of the elongation ratio and the rotation angle and an uncertainty for the probability of full intersection of fractures.

7. The method of claim 1, wherein the method further comprises:
estimating a single parameter of the parametric distribution of fracture sizes from one or more of the elongation ratio and the rotation angle; and
using a multiscale approach, elongation ratio and rotation angle to estimate multiple parameters of the parametric distribution.

8. The method of claim 7, wherein the parametric distribution of fracture sizes is one or more selected from a group consisting of: single parameter parametric distribution and multiple parameters parametric distribution.

9. The method of claim 8 where the single parameter parametric distribution is an exponential distribution.

10. The method of claim 8 wherein the multiple parameters parametric distribution is selected from a group consisting of: power law, Gaussian, lognormal and gamma distribution.

11. The method of claim 7, further comprising computing the uncertainty of the parameter estimate for the parametric distribution of fracture size.

12. The method of claim 7, further comprising:
generating an oilfield design based on at least one of fracture size, distribution of fracture sizes, elongation ratio, or rotation angle; and
storing the oilfield design.

13. The method of claim 12, further comprising:
performing an oilfield operation according to the oilfield design.

14. The method of claim 1, wherein the borehole image log recorded within a subterranean formation is obtained using one or more selected from a group consisting of: acoustic tools, electric tools, optical tools, and core sampling.

15. A method, comprising:
creating a fracture set of a collection of intersecting fractures from a borehole image log recorded within a subterranean formation;
classifying the fracture set into groups of fully and partially intersecting fractures;
determining a probability of full intersection of fractures $P_{full}$; and
determining a fracture size or a parametric distribution of fracture sizes from the fracture set using the calculated probability of full intersection of fractures within the borehole,
wherein the probability of full intersection of fractures $P_{full}$ is determined according to a ratio of the areas of projected fracture ellipses $A_i$ and $A_e$, given by:

$$P_{full} = \frac{A_i}{A_e}$$

wherein $A_i$ is an area contained within a region described by a circle of radius y as it rolls around the interior surface of the projected fracture ellipse, and wherein $A_e$ is an area contained in a region described by a circle of radius r as it rolls around the exterior surface of the projected fracture ellipse.

16. A non-transitory computer readable medium comprising computer readable program code for:
creating a fracture set from a collection of intersecting fractures in a borehole image log recorded within a subterranean formation;
classifying the fracture set into groups of fully and partially intersecting fractures;
calculating one or more of an elongation ratio and a rotation angle of the partially intersecting fractures;
determining a probability of full intersection of fractures within the borehole from the fracture set;
determining a fracture size or a parametric distribution of fracture sizes from the fracture set using the calculated one or more of the elongation ratio and the rotation angle and the determined probability of full intersection of fractures within the borehole;
generating an oilfield design based on the determined fracture size; and
storing the oilfield design, wherein the non-transitory computer readable medium is executed by at least one processor.

* * * * *